(12) United States Patent
Yamaga et al.

(10) Patent No.: US 11,610,604 B2
(45) Date of Patent: *Mar. 21, 2023

(54) MAGNETIC RECORDING MEDIUM, CARTRIDGE, AND RECORDING AND REPRODUCING DEVICE

(71) Applicant: Sony Corporation, Tokyo (JP)

(72) Inventors: Minoru Yamaga, Miyagi (JP); Futoshi Sasaki, Miyagi (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/649,400

(22) PCT Filed: Oct. 2, 2019

(86) PCT No.: PCT/JP2019/038960
§ 371 (c)(1),
(2) Date: Mar. 20, 2020

(87) PCT Pub. No.: WO2021/033334
PCT Pub. Date: Feb. 25, 2021

(65) Prior Publication Data
US 2022/0270642 A1 Aug. 25, 2022

(30) Foreign Application Priority Data
Aug. 21, 2019 (JP) .............................. JP2019-151590

(51) Int. Cl.
*G11B 5/73* (2006.01)
*G11B 5/71* (2006.01)
(Continued)

(52) U.S. Cl.
CPC ........ *G11B 5/70678* (2013.01); *G11B 5/5928* (2013.01); *G11B 5/71* (2013.01);
(Continued)

(58) Field of Classification Search
CPC .............. G11B 5/7022; G11B 5/70678; G11B 5/70689; G11B 5/71; G11B 5/712;
(Continued)

(56) References Cited

FOREIGN PATENT DOCUMENTS

| JP | 2004087000 A | 3/2004 |
|----|--------------|--------|
| JP | 20060-065953 | 3/2006 |

(Continued)

OTHER PUBLICATIONS

Notice of Reasons for Refusal dated Oct. 10, 2019 in corresponding Japanese Application No. 2019-151590.
(Continued)

*Primary Examiner* — Holly Rickman
*Assistant Examiner* — Linda N Chau
(74) *Attorney, Agent, or Firm* — K&L Gates LLP

(57) ABSTRACT

A magnetic recording medium is a magnetic recording medium in the form of a tape and includes a substrate, a foundation layer provided on the substrate, and a magnetic layer provided on the foundation layer and containing a magnetic powder. The foundation layer and the magnetic layer each contain a lubricant. A squareness ratio of the magnetic layer in a perpendicular direction is equal to or higher than 65%, an average thickness of the magnetic recording medium is equal to or smaller than 5.6 μm, a plurality of recessed portions each having a depth corresponding to 20% or higher of the average thickness of the magnetic layer is provided on a surface of the magnetic layer, and the number of the recessed portions per unit area of 1,600 μm² of the surface of the magnetic layer is equal to or greater than 20 and equal to or smaller than 200, and an amount of exudation of the lubricant per unit region of 12.5 μm×9.3 μm on the surface of the magnetic layer in a vacuum is equal to or greater than 3.0 μm² and equal to or smaller than 6.5 μm².

19 Claims, 17 Drawing Sheets

(51) Int. Cl.
  *G11B 5/706*   (2006.01)
  *G11B 5/714*   (2006.01)
  *G11B 5/735*   (2006.01)
  *G11B 5/592*   (2006.01)

(52) U.S. Cl.
  CPC ............ *G11B 5/714* (2013.01); *G11B 5/7358* (2019.05); *G11B 5/73927* (2019.05)

(58) Field of Classification Search
  CPC ... G11B 5/714; G11B 5/7358; G11B 5/73927; G11B 5/73935
  See application file for complete search history.

(56) References Cited

FOREIGN PATENT DOCUMENTS

| | | |
|---|---|---|
| JP | 2006-099919 | 4/2006 |
| JP | 2007-273036 | 10/2007 |
| JP | 2009-087468 | 4/2009 |
| JP | 2017-228328 | 12/2017 |
| WO | 2019/159466 | 8/2019 |
| WO | 2019159666 | 8/2019 |

OTHER PUBLICATIONS

Decision to Grant a Patent dated Nov. 13, 2019 in corresponding Japanese Application No. 2019-151590.

A

B

A

B

A

B

MAGNETIC RECORDING MEDIUM, CARTRIDGE, AND RECORDING AND REPRODUCING DEVICE

TECHNICAL FIELD

The present disclosure relates to a magnetic recording medium, a cartridge including a magnetic recording medium, and a recording and reproducing device for recording and reproducing data in and from a magnetic recording medium.

BACKGROUND ART

A magnetic recording medium in the form of a tape has been widely used for storing electronic data. PTL 1 describes smoothing a surface of a magnetic layer to improve electromagnetic conversion characteristics of a magnetic recording medium. In addition, PTL 1 describes adding a lubricant to the magnetic layer to suppress friction generated by contact between a magnetic recording medium and a head.

CITATION LIST

Patent Literature

[PTL 1]
Japanese Patent Laid-Open No. 2006-65953

SUMMARY

Technical Problem

However, in a case in which the magnetic recording medium gets thinner and smoothing of the surface of the magnetic layer is required, it is difficult to stably supply the lubricant between the magnetic recording medium and the head after repeated recording or reproducing, possibly resulting in an increase in dynamic friction coefficient.

An object of the present disclosure is to provide a magnetic recording medium that can obtain favorable electromagnetic conversion characteristics and can suppress an increase in dynamic friction coefficient even after repeated recording or reproducing, a cartridge including the magnetic recording medium, and a recording and reproducing device that records and reproduces data in and from the magnetic recording medium.

Solution to Problem

To solve the problem, according to a first disclosure, there is provided a magnetic recording medium in the form of a tape, including:
a substrate;
a foundation layer provided on the substrate; and
a magnetic layer provided on the foundation layer and containing a magnetic powder, in which
the foundation layer and the magnetic layer each contain a lubricant,
a squareness ratio of the magnetic layer in a perpendicular direction is equal to or higher than 65%,
an average thickness of the magnetic recording medium is equal to or smaller than 5.6 μm,
a plurality of recessed portions each having a depth corresponding to 20% or higher of the average thickness of the magnetic layer is provided on a surface of the magnetic layer, and the number of the recessed portions per unit area of 1,600 μm$^2$ of the surface of the magnetic layer is equal to or greater than 20 and equal to or smaller than 200, and
an amount of exudation of the lubricant per unit region of 12.5 μm×9.3 μm on the surface of the magnetic layer in a vacuum is equal to or greater than 3.0 μm$^2$ and equal to or smaller than 6.5 μm$^2$.

According to a second disclosure, there is provided a cartridge including the magnetic recording medium according to the first disclosure.

According to a third disclose, there is provided a recording and reproducing device recording and reproducing data in and from the magnetic recording medium according to the first disclosure.

DESCRIPTION OF EMBODIMENTS

Embodiments of the present disclosure will be described in the following order. It is noted that same or corresponding parts are denoted by same reference signs in all drawings according to the following embodiments.
1 First embodiment 2 Second embodiment
3 Modifications

1 First Embodiment

[Configuration of Recording and Reproducing System]

Figure 1:
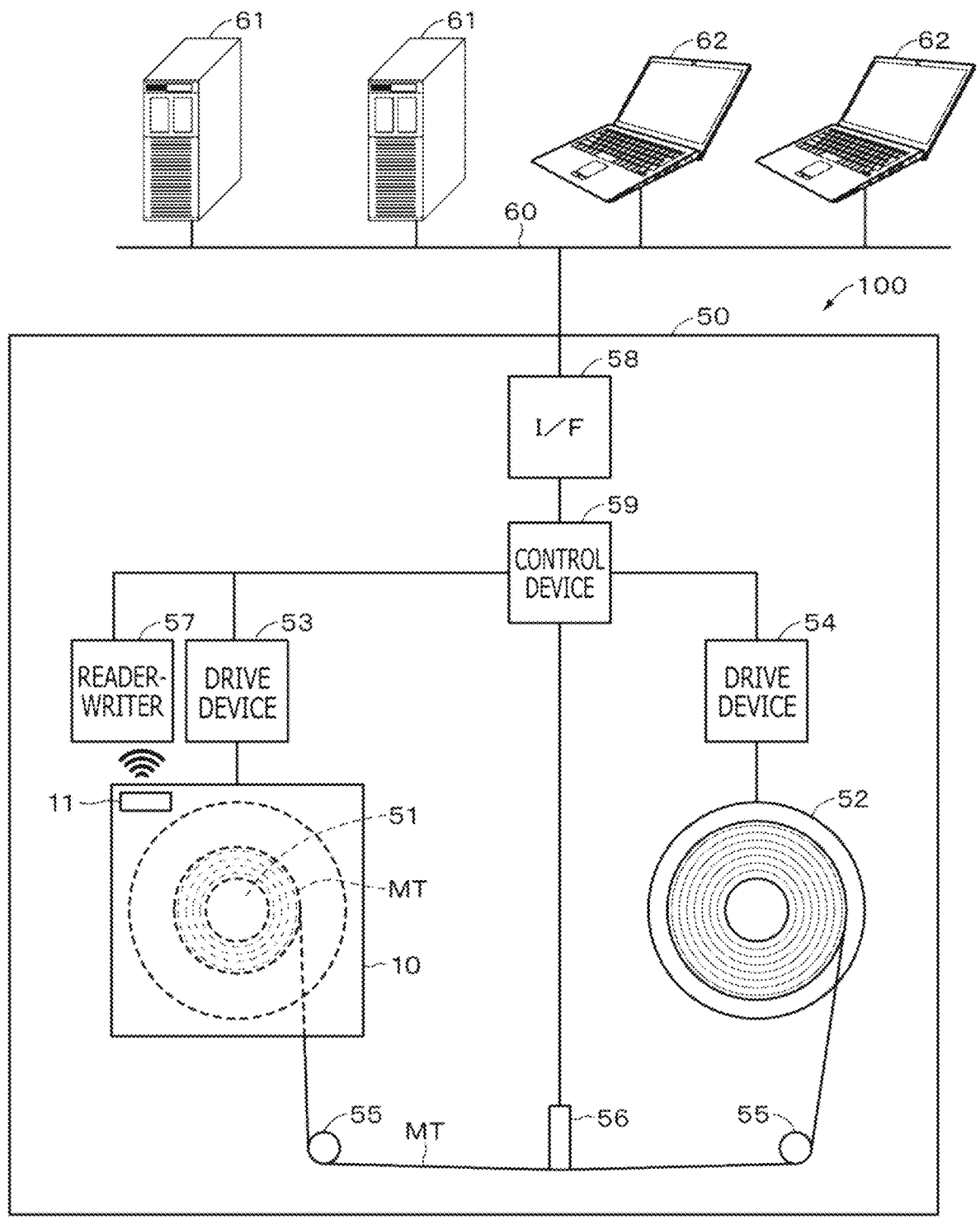
FIG. 1 is a schematic diagram depicting an example of a configuration of a recording and reproducing system according to a first embodiment of the present disclosure.

FIG. 1 is a schematic diagram depicting an example of a configuration of a recording and reproducing system 100 according to a first embodiment of the present disclosure. The recording and reproducing system 100, which is a magnetic tape recording and reproducing system, includes a cartridge 10 and a recording and reproducing device 50 that is configured to be capable of loading and unloading the cartridge 10.

[Configuration of Cartridge]

Figure 2:
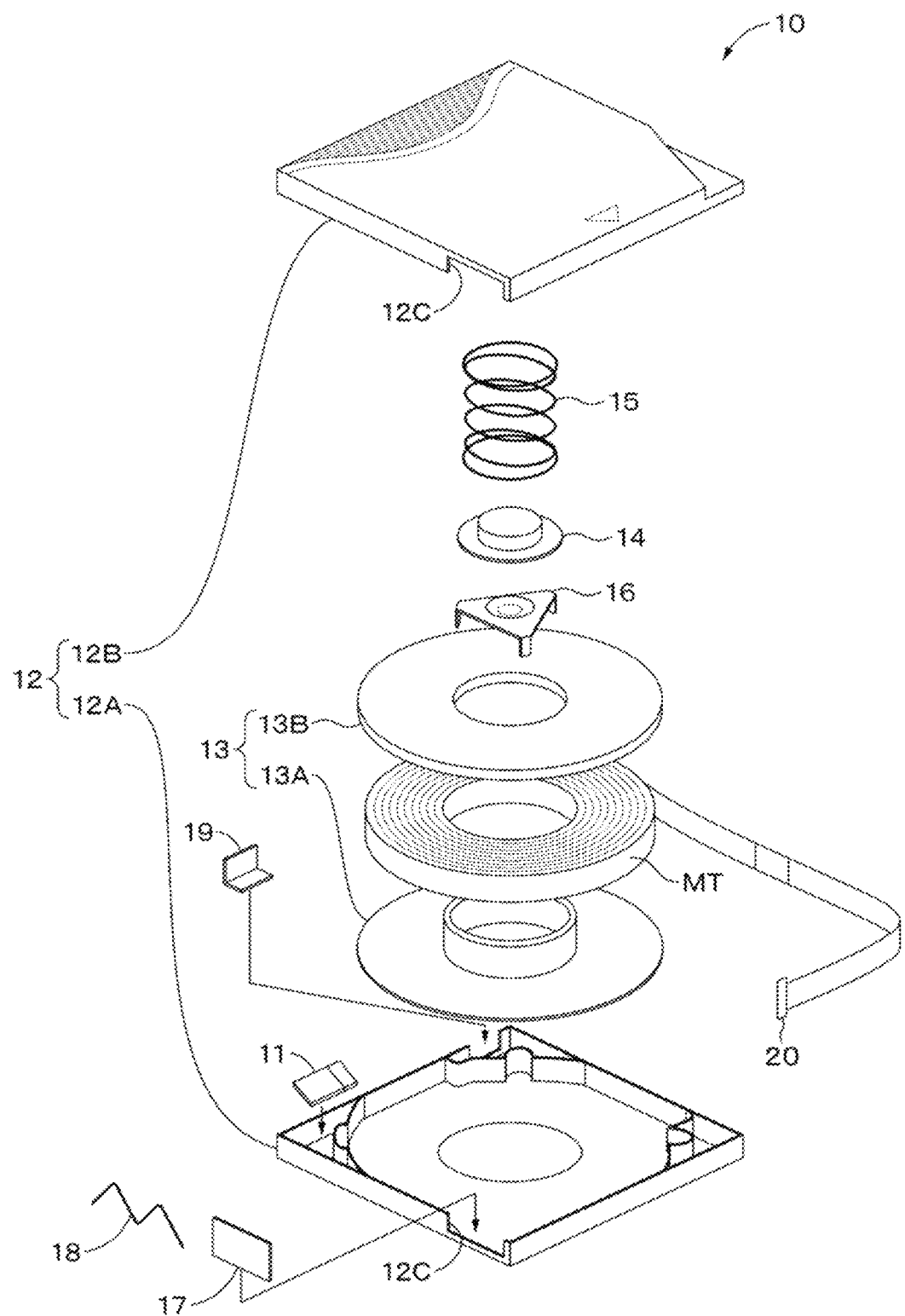
FIG. 2 is an exploded perspective view depicting an example of a configuration of a cartridge.

FIG. 2 is an exploded perspective view depicting an example of a configuration of the cartridge 10. The cartridge 10 is a magnetic tape cartridge compliant with LTO (Linear Tape-Open) standards, and includes a reel 13 around which a magnetic tape (magnetic recording medium in the form of a tape) MT is wound, a reel lock 14 and a reel spring 15 for locking rotation of the reel 13, a spider 16 for releasing a locked state of the reel 13, a slide door 17 for opening/closing a tape outlet 12C that is provided in a cartridge case 12, which includes a lower shell 12A and an upper shell 12B, to spread across the lower shell 12A and the upper shell 12B, a door spring 18 for urging the slide door 17 to a closed position of the tape outlet 12C, a write protect 19 for preventing accidental erasure, and a cartridge memory 11, which are provided within the cartridge case 12. The reel 13 is substantially of a disk shape having an opening in a central portion, and includes a reel hub 13A and a flange 13B including a hard material such as plastic. A reader pin 20 is provided in one end portion of the magnetic tape MT.

The cartridge memory 11 is provided near one corner portion of the cartridge 10. In a state in which the cartridge 10 is loaded to the recording and reproducing device 50, the cartridge memory 11 is disposed to face a reader-writer 57 of the recording and reproducing device 50. The cartridge memory 11 holds communication with the recording and reproducing device 50, specifically holds communication with the reader-writer 57 in accordance with a wireless communication standard compliant with the LTO standards.

[Configuration of Cartridge Memory]

Figure 3:
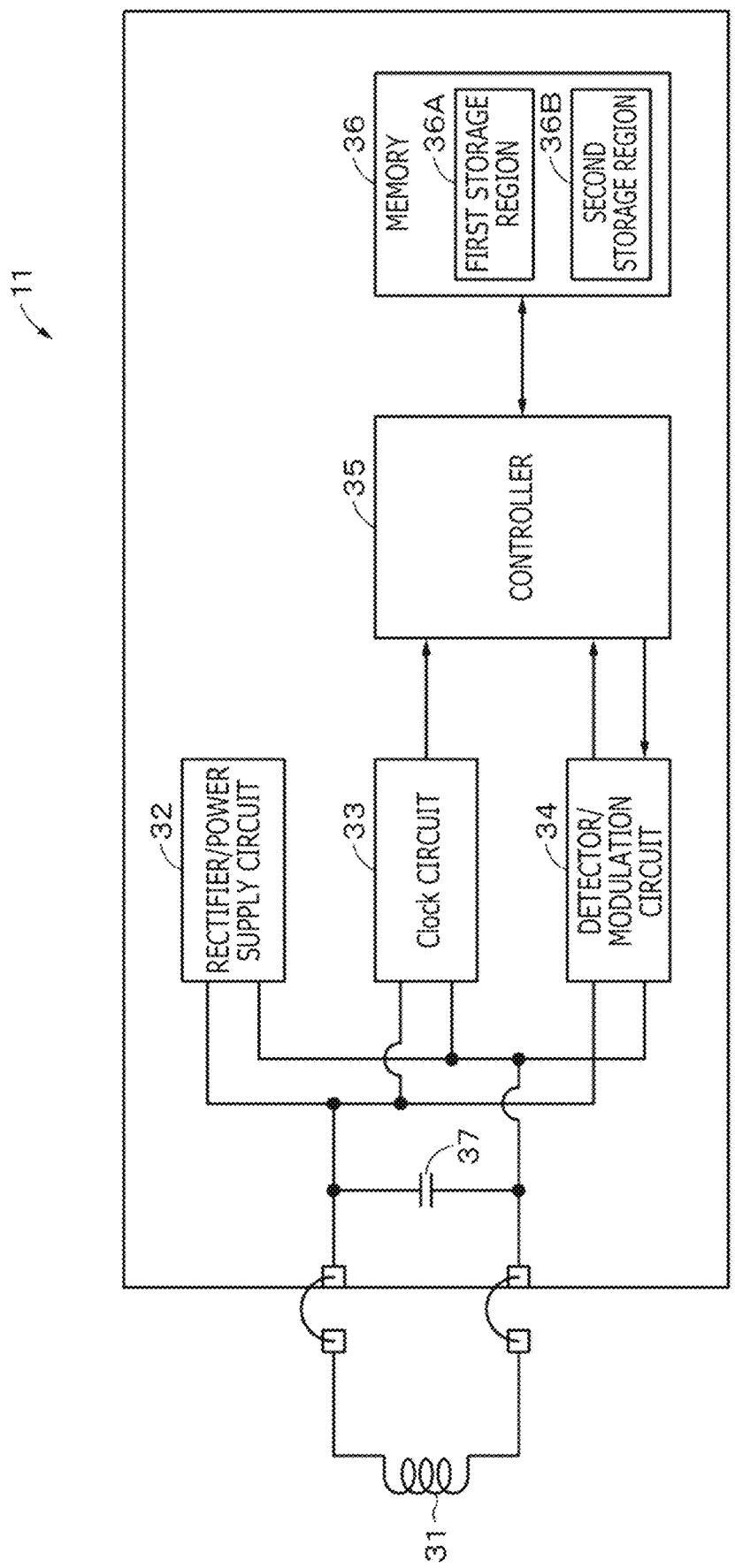
FIG. 3 is a block diagram depicting an example of a configuration of a cartridge memory.

FIG. 3 is a block diagram depicting an example of a configuration of the cartridge memory 11. The cartridge memory 11 includes an antenna coil (communication section) 31 that communicates with the reader-writer 57 in accordance with a specified communication standard, a rectifier/power supply circuit 32 that generates a power supply by generating electric power using an induced electromotive force from a radio wave received by the antenna coil 31 and rectifying the electric power, a clock circuit 33 that generates a clock using the induced electromotive force from the radio wave received by the antenna coil 31 similarly, a detector/modulation circuit 34 that detects the radio wave received by the antenna coil 31 and that modulates a signal to be transmitted by the antenna coil 31, a controller (control section) 35 including a logical circuit for discriminating a command and data from a digital signal extracted from the detector/modulation circuit 34 and for processing the command and the data, and the like, and a memory (storage section) 36 that stores information. Furthermore, the cartridge memory 11 includes a capacitor 37 connected in parallel to the antenna coil 31, and the antenna coil 31 and the capacitor 37 configure a resonant circuit.

The memory 36 stores information and the like associated with the cartridge 10. The memory 36 is a nonvolatile memory (NVM). A storage capacity of the memory 36 is preferably equal to or higher than approximately 32 KB.

The memory 36 has a first storage region 36A and a second storage region 36B. The first storage region 36A is a region that corresponds to a storage region of a cartridge memory compliant with LTO standards before LTO8 (hereinafter, referred to as "conventional cartridge memory"), and that stores information compliant with the LTO standards before LTO8. Examples of the information compliant with the LTO standards before LTO8 include manufacturing information (for example, a unique number of the cartridge 10) and a use history (for example, a tape pullout count (Thread Count)).

The second storage region 36B corresponds to an extended storage region with respect to the storage region of the conventional cartridge memory. The second storage region 36B is a region for storing additional information. The additional information means herein information that is not specified in the LTO standards before LTO8 and that is associated with the cartridge 10. While examples of the additional information include tension adjustment information, management ledger data, Index information, and thumbnail information regarding a motion video stored in the magnetic tape MT, the additional information is not limited to these pieces of data. The tension adjustment information is information for adjusting a tension applied to the magnetic tape MT in a longitudinal direction. The tension adjustment information includes a distance between adjacent servo bands (distance between servo patterns recorded in the adjacent servo bands) at a time of recording data in the magnetic tape MT. The distance between the adjacent servo bands is an example of width related information associated with a width of the magnetic tape MT. The distance between the servo bands will be described later in detail. In the following description, the information stored in the first storage region 36A is often referred to as "first information," and the information stored in the second storage region 36B is often referred to as "second information."

The memory 36 may have a plurality of banks. In this case, part of the plurality of banks may configure the first storage region 36A and remaining banks may configure the second storage region 36B.

The antenna coil 31 induces an induced voltage by electromagnetic induction. The controller 35 holds communication with the recording and reproducing device 50 via the antenna coil 31 in accordance with a specified communication standard. Specifically, for example, the controller 35 communicates with the recording and reproducing device 50 for mutual authentication, and transmits and receives commands or data to and from the recording and reproducing device 50.

The controller 35 stores the information received from the recording and reproducing device 50 via the antenna coil 31 in the memory 36. The controller 35 stores, for example, the tension adjustment information received from the recording and reproducing device 50 via the antenna coil 31 in the second storage region 36B of the memory 36. The controller 35 reads information from the memory 36 in response to a request from the recording and reproducing device 50, and transmits the information to the recording and reproducing device 50 via the antenna coil 31. For example, the controller 35 reads the tension adjustment information from the second storage region 36B of the memory 36 in response to the request from the recording and reproducing device 50, and transmits the tension adjustment information to the recording and reproducing device 50 via the antenna coil 31.

[Configuration of Magnetic Tape]

Figure 4:
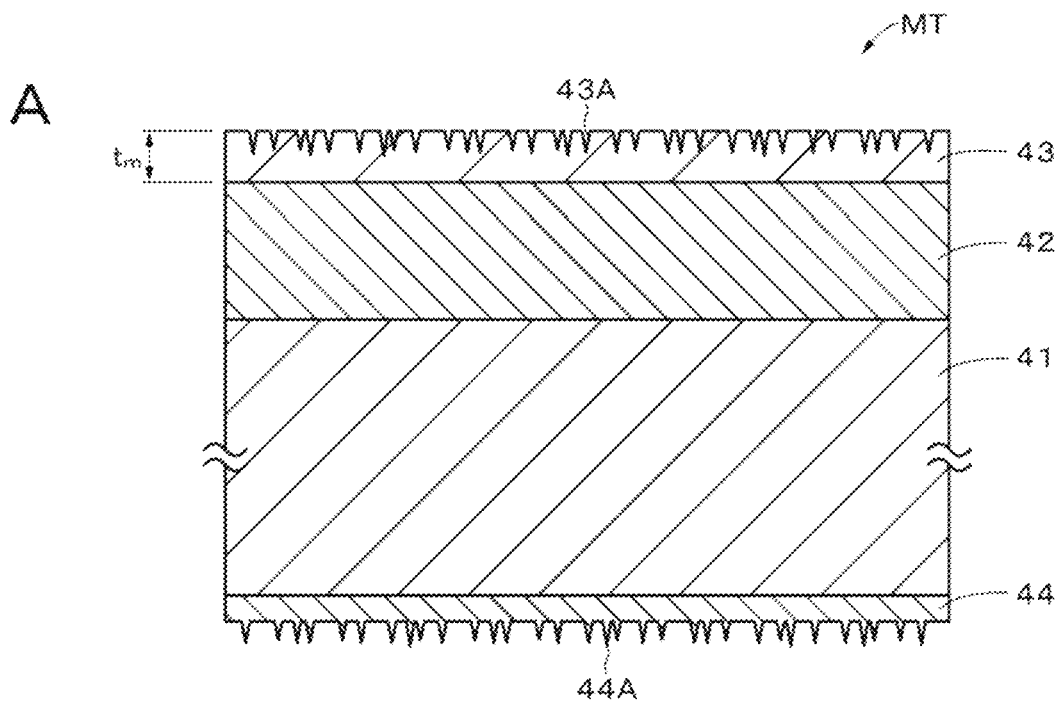
FIG. 4A is a cross-sectional view depicting an example of a configuration of a magnetic tape.
FIG. 4B is a partially enlarged cross-sectional view of a magnetic layer.
Figure 4:
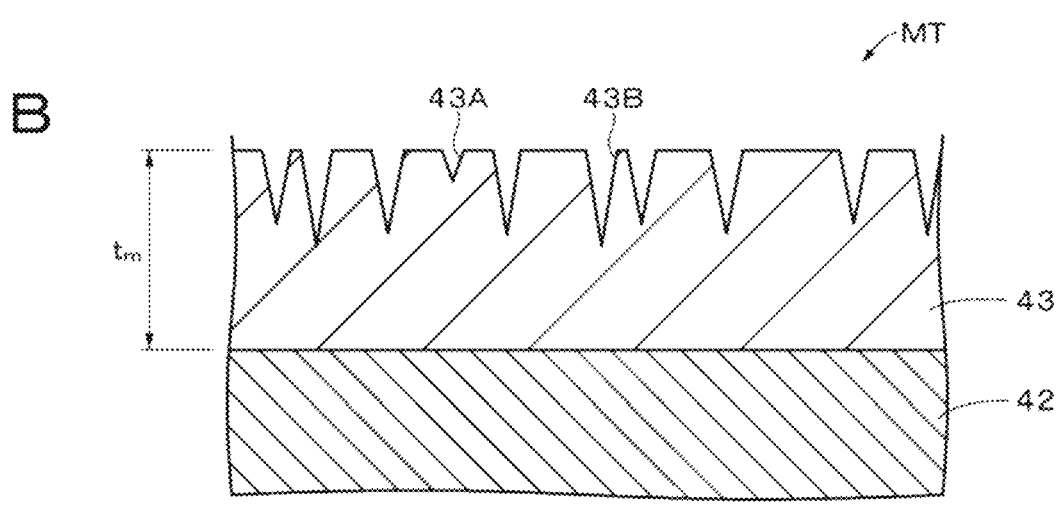

FIG. 4A is a cross-sectional view depicting an example of a configuration of the magnetic tape MT. The magnetic tape MT, which is a magnetic recording medium in the form of a tape, includes a long substrate 4, a foundation layer 42 provided on one principal surface (first principal surface) of the substrate 41, a magnetic layer 43 provided on the foundation layer 42, and a back layer 44 provided on the other principal surface (second principal surface) of the substrate 41. It is noted that the foundation layer 42 and the back layer 44 are provided as needed and not always provided. The magnetic tape MT may be a vertical recording type magnetic recording medium or a longitudinal recording type magnetic recording medium.

The magnetic tape MT has a long shape and is run in a longitudinal direction at times of recording and reproducing. It is noted that a surface of the magnetic layer 43 serves as a surface on which a magnetic head of the recording and reproducing device 50 is run. The magnetic tape MT is preferably used in a recording and reproducing device including a ring head as a recording head. The magnetic tape MT is preferably used in a recording and reproducing device configured to be capable of recording data at a data track width equal to or smaller than 1,500 nm or equal to or smaller than 1,000 nm.

(Substrate)

The substrate 41 is a non-magnetic support medium that supports the foundation layer 42 and the magnetic layer 43. The substrate 41 has a long film shape. An upper limit of an average thickness of the substrate 41 is preferably equal to or smaller than 4.2 μm, more preferably equal to or smaller than 3.8 μm, further more preferably equal to or smaller than 3.4 μm. With the upper limit of the average thickness of the substrate 41 equal to or smaller than 4.2 μm, it is possible to enhance a recording capacity by which data can be recorded in one data cartridge, compared with an ordinary magnetic tape. A lower limit of the average thickness of the substrate 41 is preferably equal to or greater than 3 μm, more preferably equal to or greater than 3.2 μm. With the lower limit of the average thickness of the substrate 41 equal to or greater than 3 μm, it is possible to suppress a reduction in a strength of the substrate 41.

The average thickness of the substrate 41 is obtained as follows. First, the magnetic tape MT at a width of ½ inch is prepared and cut by a length of 250 mm, and a sample is produced. Next, the layers (which are, in other words, the foundation layer 42, the magnetic layer 43, and the back layer 44) other than the substrate 41 of the sample are removed by a solvent such as MEK (methyl ethyl ketone) or diluted hydrochloric acid. Next, a thickness of the sample (substrate 41) is measured at positions of five or more points using a laser hologage (LGH-110C) manufactured by Mitutoyo Corporation as a measurement device, measurement values at the five or more positions of the thickness are simply averaged (arithmetically averaged), and the average thickness of the substrate 41 is calculated. It is noted that the measurement positions are selected at random from the sample.

The substrate 41 preferably contains polyester. Causing the substrate 41 to contain polyester enables a reduction in a Young's modulus of the substrate 41 in the longitudinal direction. Therefore, it is possible to maintain the width of the magnetic tape MT either constant or substantially constant by adjusting the tension of the magnetic tape MT in the longitudinal direction at the time of running by the recording and reproducing device 50.

As polyester, the substrate 41 contains at least one type of, for example, polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bis(phenoxy) carboxylate. In a case in which the substrate 41 contains two or more types of polyesters, those two or more types of polyesters may be mixed, copolymerized, or laminated. At least one of a terminal or a side chain of polyester may be modified.

It is confirmed that the substrate 41 contains polyester by, for example, the following method. First, similarly to the method of measuring the average thickness of the substrate 41, the layers other than the substrate 41 of the sample are removed. Next, an IR spectrum of the sample (substrate 41) is acquired by Infrared Absorption Spectrometry (IR). It can be confirmed that the substrate 41 contains polyester on the basis of this IR spectrum.

The substrate 41 may further contain, for example, at least one type of polyamide, polyimide, or polyamide-imide, and may further contain at least one type of polyamide, polyimide, polyamide-imide, polyolefins, cellulose derivatives, vinyl resins, or other polymer resins, in addition to polyester. Polyamide may be aromatic polyamide (aramid). Polyimide may be aromatic polyimide. Polyamide-imide may be aromatic polyamide-imide.

In a case in which the substrate 41 contains a polymer resin other than polyester, it is preferable that a main component of the substrate 41 is polyester. The main component means herein a component at a highest content (mass ratio) among polymer resins contained in the substrate 41. In the case in which the substrate 41 contains a polymer resin other than polyester, polyester and the polymer resin other than polyester may be mixed or copolymerized.

The substrate 41 may be biaxially stretched in the longitudinal direction and the width direction. It is preferable that the polymer resin contained in the substrate 41 is oriented in an oblique direction with respect to the width direction of the substrate 41.

(Magnetic Layer)

The magnetic layer 43 is a recording layer for recording a signal by a magnetization pattern. The magnetic layer 43 may be a vertical recording type recording layer or a longitudinal recording type recording layer. The magnetic layer 43 contains, for example, a magnetic powder, a binder, and a lubricant. The magnetic layer 43 may further contain at least one type of additive among an antistatic agent, an abrasive, a curing agent, an anticorrosive agent, non-magnetic reinforcement particles, and the like, as needed.

A plurality of recessed portions 43A is provided on a surface of the magnetic layer 43. The lubricant may be accumulated in these plurality of recessed portions 43A. It is preferable that the plurality of recessed portions 43A is provided to extend in a perpendicular direction with respect to the surface of the magnetic layer 43. This is because a supply performance for supplying the lubricant to the surface of the magnetic layer 43 can be improved. It is noted that part of the plurality of recessed portions 43A may be provided to extend in the perpendicular direction.

Figure 5:
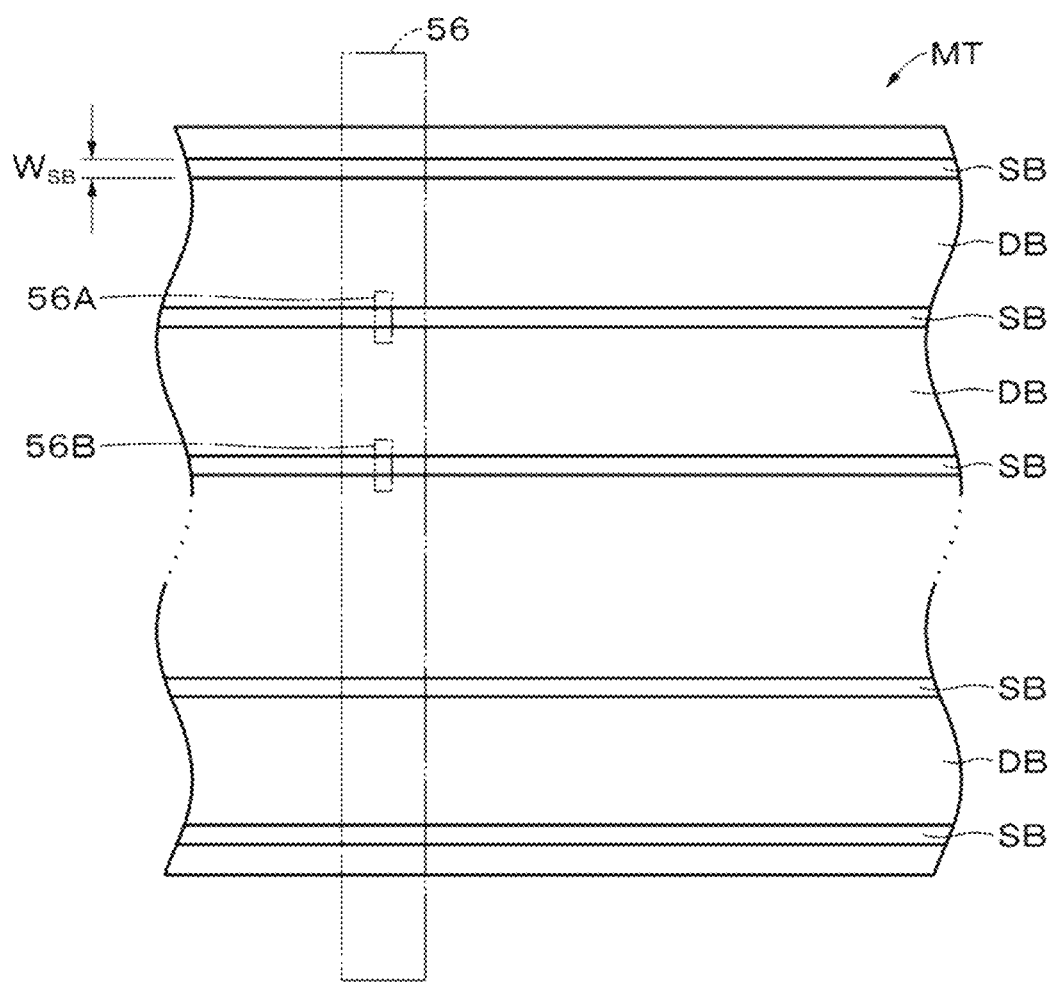
FIG. 5 is a schematic diagram depicting an example of a layout of data bands and servo bands.

As depicted in FIG. 5, the magnetic layer 43 has a plurality of servo bands SB and a plurality of data bands DB in advance. The plurality of servo bands SB is provided equidistantly in the width direction of the magnetic tape MT. One data band DB is provided between the adjacent servo bands SB. The servo bands SB guide a magnetic head 56 (specifically, servo read heads 56A and 56B) at the time of recording or reproducing data. A servo pattern (servo signal) for controlling tracking of the magnetic head 56 is written in each of the servo bands SB in advance. User data is recorded in the data bands DB.

An upper limit of a ratio $R_S$ (=($S_{SB}$/S)×100) of a gross area $S_{SB}$ of the servo bands SB to an area S of the surface of the magnetic layer 43 is preferably equal to or lower than 4.0%, more preferably equal to or lower than 3.0%, further more preferably equal to or lower than 2.0% from the viewpoint of ensuring a high recording capacity. On the other hand, a lower limit of the ratio $R_S$ of the gross area $S_{SB}$ of the servo bands SB to the area S of the surface of the magnetic layer 43 is preferably equal to or higher than 0.8% from the viewpoint of ensuring five or more servo bands SB.

The ratio $R_S$ of the gross area $S_{SB}$ of the servo bands SB to the area S of the entire surface of the magnetic layer 43 is obtained as follows. The magnetic tape MT is developed using a ferri-colloid developing solution (Sigmarker Q manufactured by Sigma Hi-Chemical Inc.), the developed magnetic tape MT is then observed with an optical microscope, and a servo band width $W_{SB}$ and the number of servo bands SB are measured. Next, the ratio $R_S$ is obtained from the following equation.

Ratio $R_S$ [%]=((servo band width $W_{SB}$)×(number of servo bands SB)/(width of magnetic tape MT))×100

The number of servo bands SB is preferably equal to or greater than 5, more preferably equal to or greater than 5+4n (where n is a positive integer). If the number of servo bands SB is equal to or greater than 5, it is possible to suppress an influence of a dimensional change in the width direction of the magnetic tape MT on the servo signals, and to ensure stable recording and reproducing characteristics with fewer offtrack errors. While an upper limit of the number of servo bands SB is not limited to a specific value, the upper limit thereof is, for example, equal to or smaller than 33.

The number of servo bands SB is obtained similarly to a method of calculating the ratio $R_S$ described above.

An upper limit of the servo band width $W_{SB}$ is preferably equal to or smaller than 95 µm, more preferably equal to or smaller than 60 µm, further more preferably equal to or smaller than 30 µm from the viewpoint of ensuring the high recording capacity. A lower limit of the servo band width $W_{SB}$ is preferably equal to or greater than 10 µm. The recording head 56 capable of reading a servo signal written in the servo band SB at the servo band width $W_{SB}$ smaller than 10 µm is difficult to manufacture.

The servo band width $W_{SB}$ is obtained similarly to the method of calculating the ratio $R_S$ described above.

Figure 6:
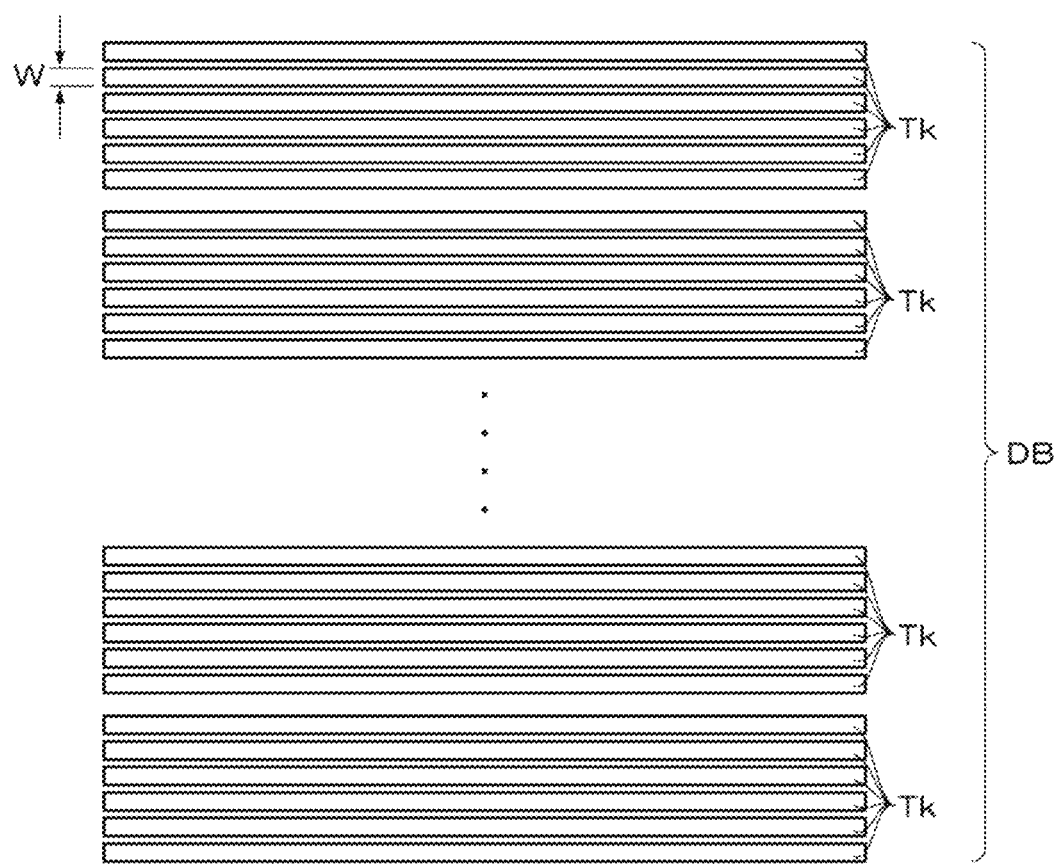
FIG. 6 is an enlarged view depicting an example of a configuration of the data band.

As depicted in FIG. 6, the magnetic layer 43 is configured such that a plurality of data tracks Tk can be formed on each of the data bands DB. An upper limit of a data track width W is preferably equal to or smaller than 2,000 nm, more preferably equal to or smaller than 1,500 nm, further more preferably equal to or smaller than 1,000 nm from the viewpoint of improving a track recording density and ensuring the high recording capacity. A lower limit of the data track width W is preferably equal to or greater than 20 nm in the light of a magnetic particle size.

The magnetic layer 43 is configured to be capable of recording data in such a manner that a minimum value L of a magnetization reversal interval is preferably equal to or smaller than 48 nm, more preferably equal to or smaller than 44 nm, further more preferably equal to or smaller than 40 nm from the viewpoint of ensuring the high recording capacity. A lower limit of the minimum value L of the magnetization reversal interval is preferably equal to or greater than 20 nm in the light of the magnetic particle size.

The magnetic layer 43 is configured to be capable of recording data in such a manner that a relation between the minimum value L of the magnetization reversal interval and the data track width W is expressed by preferably W/L≤35, more preferably W/L≤30, further more preferably W/L≤25. If the minimum value L of the magnetization reversal interval is a constant value and the relation between the minimum value L of the magnetization reversal interval and the track width W is expressed by W/L>35 (in other words, the track width W is large), there is a possibility that the sufficient recording capacity cannot be ensured since the track recording density is not increased. Furthermore, if the track width W is a constant value and the relation between the minimum value L of the magnetization reversal interval and the track width W is expressed by W/L>35 (in other words, the minimum value L of the magnetization reversal interval is small), then a bit length is reduced and a track recording density is increased, but electromagnetic conversion characteristics is possibly, greatly deteriorated due to an influence of a spacing loss. It is, therefore, preferable that W/L is in a range of W/L≤35 to suppress deterioration of the electromagnetic conversion characteristics while ensuring the recording capacity. While a lower limit of W/L is not limited to a specific value, W/L is in a range of, for example, 1≤W/L.

The data track width W is obtained as follows. The magnetic tape MT having the entire surface on which data is recorded is prepared, a data recording pattern in the data bands DB on the magnetic layer 43 is observed using a Magnetic Force Microscope (MFM), and an MFM image is obtained. As the MFM, Dimension3100 manufactured by Digital Instruments Corporation and analysis software therefor are used. It is assumed that a measurement field of the MFM image is 10 µm×10 µm, and that the measurement field of 10 µm×10 µm is divided into 512×512 (=262,144) measurement points. Measurement is carried out for three measurement fields each of 10 µm×10 µm at different locations using the MFM, that is, three MFM images are obtained. Track widths are measured at ten locations from the three obtained MFM images using the analysis software attached to Dimension3100, and an average value (simple average value) is obtained. The average value corresponds to the data track width W. It is noted that measurement conditions for the MFM include a sweep rate: 1 Hz, a tip to be used: MFMR-20, a lift height: 20 nm, and correction: Flatten order 3.

The minimum value L of the magnetization reversal interval is obtained as follows. The magnetic tape MT having the entire surface on which data is recorded is prepared, the data recording pattern in the data bands DB on the magnetic layer 43 is observed using the Magnetic Force Microscope (MFM), and an MFM image is obtained. As the MFM, Dimension3100 manufactured by Digital Instruments Corporation and the analysis software therefor are used. It is assumed that a measurement field of the MFM image is 2 µm×2 µm, and that the measurement field of 2 µm×2 µm is divided into 512×512 (=262,144) measurement points. Measurement is carried out for three measurement fields each of 2 µm×2 µm at different locations using the MFM, that is, three MFM images are obtained. 50 inter-bit distances are measured from a two-dimensional irregular chart of the recording patterns of the obtained MFM images. The inter-bit distances are measured using the analysis software attached to Dimension3100. A value that is approximately a greatest common divisor of the measured 50 inter-bit distances is determined as the minimum value L of the magnetization reversal interval. It is noted that measurement conditions for the MFM include the sweep rate: 1 Hz, the tip to be used: MFMR-20, the lift height: 20 nm, and the correction: Flatten order 3.

The servo patterns are magnetized regions and formed by magnetizing specific regions on the magnetic layer 43 in a specific direction by a servo write head at a time of manufacturing the magnetic tape. In each of the servo bands SB, a region where the servo pattern is not formed (hereinafter, referred to as "non-pattern region") may be a magnetized region where the magnetic layer 43 is magnetized or an unmagnetized region where the magnetic layer 43 is not magnetized. In a case in which the non-pattern region is the magnetized region, a servo pattern formed region and the non-pattern region are magnetized in different directions (for example, opposite directions).

Figure 7:
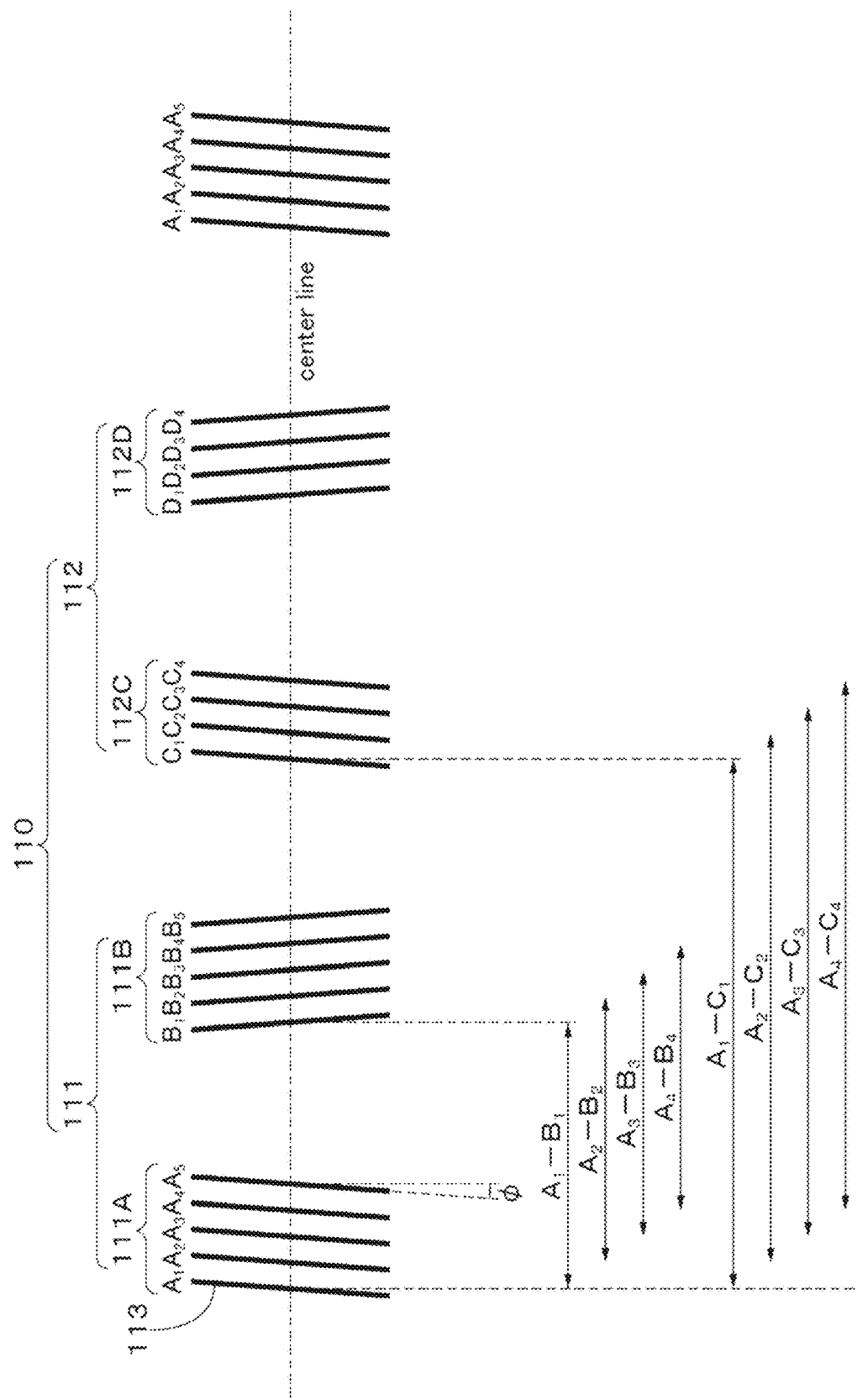
FIG. 7 is an enlarged view depicting an example of a configuration of the servo band.

In accordance with the LTO standards, in the servo bands SB, a servo pattern is formed to include a plurality of servo stripes (linear magnetized regions) 113 inclined with respect to the width direction of the magnetic tape MT, as depicted in FIG. 7.

Each of the servo bands SB includes a plurality of servo frames 110. Each servo frame 110 includes 18 servo stripes 113. Specifically, each servo frame 110 includes a servo subframe 1 (111) and a servo subframe 2 (112).

The servo subframe 1 (111) includes a burst A 111A and a burst B 111B. The burst B 111B is disposed to adjoin the burst A 111A. The burst A 111A includes five servo stripes 113 inclined at a predetermined angle φ with respect to the width direction of the magnetic tape MT and formed to be apart from each other at specified intervals. In FIG. 7, these five servo stripes 113 are depicted while signs $A_1$, $A_2$, $A_3$, $A_4$, and $A_5$ are added to the five servo stripes 113 from an EOT (End Of Tape) of the magnetic tape MT to a BOT (Beginning Of Tape) thereof. Similarly to the burst A 111A, the burst B 111B includes five servo pulses 63 inclined at the predetermined angle φ with respect to the width direction of the magnetic tape MT and formed to be apart from each other at specified intervals. In FIG. 7, these five servo stripes 113 are depicted while signs $B_1$, $B_2$, $B_3$, $B_4$, and $B_5$ are added to the five servo stripes 113 from the EOT of the magnetic tape MT to the BOT thereof. The servo stripes 113 of the burst B 111B are inclined oppositely from the servo stripes 113 of the burst A 111A. In other words, the servo stripes 113 of the burst A 111A and the servo stripes 113 of the burst B 111B are disposed in an inverted V shape.

The servo subframe2 (112) includes a burst C 112C and a burst D 112D. The burst D 112D is disposed to adjoin the burst C 112C. The burst C 112C includes four servo stripes 113 inclined at the predetermined angle φ with respect to the width direction of the magnetic tape MT and formed to be apart from each other at specified intervals. In FIG. 7, these four servo stripes 113 are depicted while signs $C_1$, $C_2$, $C_3$, and $C_4$ are added to the four servo stripes 113 from the EOT of the magnetic tape MT to the BOT thereof. Similarly to the burst C 112C, the burst D 112D includes four servo pulses 63 inclined at the predetermined angle φ with respect to the width direction of the magnetic tape MT and formed to be apart from each other at specified intervals. In FIG. 7, these four servo stripes 113 are depicted while signs $D_1$, $D_2$, $D_3$, and $D_4$ are added to the four servo stripes 113 from the EOT of the magnetic tape MT to the BOT thereof. The servo stripes 113 of the burst D 112D are inclined oppositely from the servo stripes 113 of the burst C 112C. In other words, the servo stripes 113 of the burst C 112C and the servo stripes 113 of the burst D 112D are disposed in an inverted V shape.

The predetermined angle φ of the servo stripes 113 of the burst A 111A, the burst B 111B, the burst C 112C, and the burst D 112D can be, for example, 5° to 25°, particularly 11° to 25°.

Reading the servo bands SB by the magnetic head 56 makes it possible to obtain information for acquiring a tape speed and a longitudinal position of the magnetic head. The tape speed is calculated from time between four timing signals (A1-C1, A2-C2, A3-C3, and A4-C4). The head position is calculated from the time between the four timing signals and time between other four timing signals (A1-B1, A2-B2, A3-B3, and A4-B4).

As depicted in FIG. 7, it is preferable that the servo pattern (that is, the plurality of servo stripes 113) is linearly arranged toward the longitudinal direction of the magnetic tape MT. In other words, the servo bands SB preferably have a linear shape in the longitudinal direction.

An upper limit of an average thickness $t_m$ of the magnetic layer 43 is equal to or smaller than 80 nm, preferably equal to or smaller than 70 nm, more preferably equal to or smaller than 50 nm. If the upper limit of the average thickness $t_m$ of the magnetic layer 43 is equal to or smaller than 80 nm, in a case in which a ring head is used as the recording head, it is possible to mitigate an influence of a demagnetizing field; thus, it is possible to attain further excellent electromagnetic conversion characteristics.

A lower limit of the average thickness $t_m$ of the magnetic layer 43 is preferably equal to or greater than 35 nm. If the lower limit of the average thickness $t_m$ of the magnetic layer 43 is equal to or greater than 35 nm, in a case in which an MR head is used as a reproducing head, it is possible to ensure an output; thus, it is possible to attain further excellent electromagnetic conversion characteristics.

The average thickness $t_m$ of the magnetic layer 43 is obtained as follows. First, the magnetic tape MT to be measured is processed by an FIB method or the like to slice the magnetic tape MT. In the case of using the FIB method, a carbon layer and a tungsten layer are formed as a protective film as a preprocess performed before observing a TEM image of a cross-section to be described later. The carbon layer is formed on each of a magnetic layer 43-side surface and a back layer 44-side surface of the magnetic tape MT by an evaporation method, and the tungsten layer is formed on the carbon layer formed on the magnetic layer 43-side surface by the evaporation method or a sputtering method. The slicing is performed along a length direction (longitudinal direction) of the magnetic tape MT. In other words, a cross-section in parallel to both the longitudinal direction and the thickness direction of the magnetic tape MT is formed by the slicing.

The cross-section of an obtained sliced sample is observed on the following conditions by the Transmission Electron Microscope (TEM), and a TEM image is obtained. It is noted that a magnification and an accelerating voltage may be adjusted as appropriate depending on a type of the device.

Device: TEM (H9000NAR manufactured by Hitachi, Ltd.)
Accelerating voltage: 300 kV
Magnification: 100,000×

Next, using the obtained TEM image, thicknesses of the magnetic layer 43 at positions of at least ten or more points of the magnetic tape MT in the longitudinal direction are measured. An average value obtained by simply averaging (arithmetically averaging) obtained measurement values is determined as the average thickness $t_m$ [nm] of the magnetic layer 43. It is assumed that the positions used for the measurement are selected at random from a test piece.

(Magnetic Powder)

The magnetic powder contains a plurality of magnetic particles. The magnetic particles are, for example, particles containing hexagonal ferrite (hereinafter, referred to as "hexagonal ferrite particles"), particles containing epsilon iron oxide (ε iron oxide) (hereinafter, referred to as "ε iron oxide particles"), or particles containing Co-containing spinel ferrite (hereinafter, referred to as "cobalt ferrite particles"). The magnetic powder preferably has crystalline orientation preferentially in the thickness direction (perpendicular direction) of the magnetic tape MT.

(Hexagonal Ferrite Particles)

The hexagonal ferrite particles have a plate shape, which is, for example, a hexagonal plate shape. In the present specification, it is assumed that the hexagonal plate shape includes a substantially hexagonal plate shape. Hexagonal ferrite contains preferably at least one type of Ba, Sr, Pb, or Ca, more preferably at least one type of Ba or Sr. Specifically, hexagonal ferrite may be, for example, barium ferrite or strontium ferrite. Barium ferrite may further contain at least one type of Sr, Pb, or Ca in addition to Ba. Strontium ferrite may further contain at least one type of Ba, Pb, or Ca in addition to Sr.

More specifically, hexagonal ferrite has an average composition expressed by a general formula $MFe_{12}O_{19}$. In the formula, M is at least one type of metal among, for example, Ba, Sr, Pb, and Ca, preferably at least one type of metal out of Ba and Sr. M may be a combination with one or more types of metal selected from among a group including Ba, Sr, Pb, and Ca. Alternatively, M may be a combination with one or more types of metal selected from among a group including Sr, Ba, Pb, and Ca. The other metallic element may be substituted for part of Fe in the general formula.

In a case in which the magnetic powder includes a hexagonal ferrite particle powder, an average particle size of the magnetic powder is preferably equal to or smaller than 30 nm, more preferably equal to or greater than 12 nm and equal to or smaller than 25 nm, further more preferably equal to or greater than 15 nm and equal to or smaller than 22 nm, particularly preferably equal to or greater than 15 nm and equal to or smaller than 20 nm, most preferably equal to or greater than 15 nm and equal to or smaller than 18 nm. If the average particle size of the magnetic powder is equal to or smaller than 30 nm, the high recording density magnetic tape MT can attain further excellent electromagnetic conversion characteristics (for example, SNR). On the other hand, if the average particle size of the magnetic powder is equal to or greater than 12 nm, it is possible to further improve dispersibility of the magnetic powder and attain further excellent electromagnetic conversion characteristics (for example, SNR).

An average aspect ratio of the magnetic powder is preferably equal to or higher than 1.0 and equal to or lower than 2.5, more preferably equal to or higher than 1.0 and equal to or lower than 2.1, further more preferably equal to or higher than 1.0 and equal to or lower than 1.8. If the average aspect ratio of the magnetic powder is within a range equal to or higher than 1.0 and equal to or lower than 2.5, it is possible to suppress agglomeration of the magnetic powder. It is also possible to suppress a resistance applied to the magnetic powder at a time of perpendicularly orienting the magnetic powder in a process of forming the magnetic layer 43. It is, therefore, possible to improve perpendicular orientation of the magnetic powder.

In the case in which the magnetic powder includes the hexagonal ferrite particle powder, the average particle size and the average aspect ratio of the magnetic powder are obtained as follows. First, the magnetic tape MT to be measured is processed by the FIB method or the like to slice the magnetic tape MT. In the case of using the FIB method, the carbon layer and the tungsten layer are formed as the protective film as a preprocess performed before observing the TEM image of the cross-section to be described later. The carbon layer is formed on each of the magnetic layer 43-side surface and the back layer 44-side surface of the magnetic tape MT by the evaporation method, and the tungsten layer is formed on the carbon layer formed on the magnetic layer 43-side surface by the evaporation method or the sputtering method. The slicing is performed along the length direction (longitudinal direction) of the magnetic tape MT. In other words, the cross-section in parallel to both the longitudinal direction and the thickness direction of the magnetic tape MT is formed by the slicing.

Figure 8:
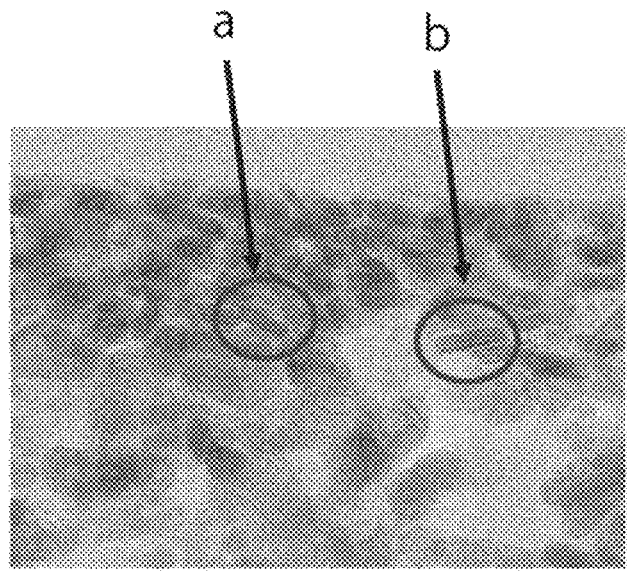
FIGS. 8A and 8B are views each depicting an example of a TEM photograph of the magnetic layer.
Figure 8:
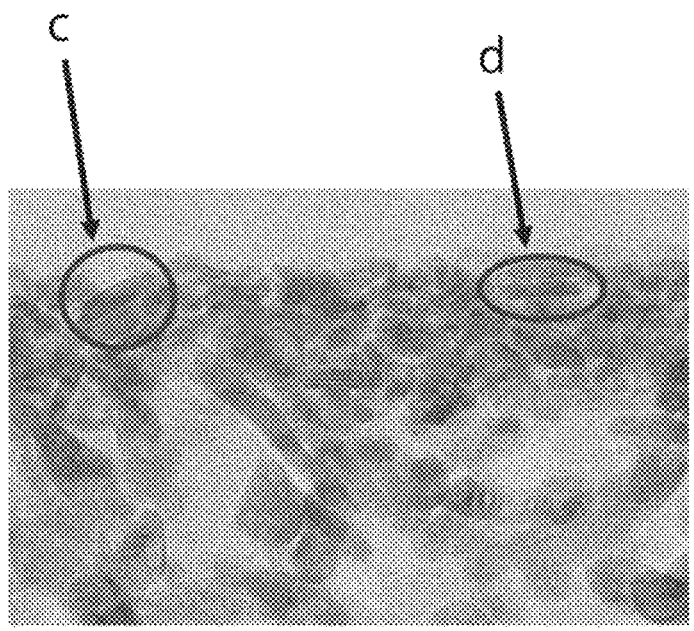

The cross-section of the obtained sliced sample is observed by a transmission electron microscope (H-9500 manufactured by Hitachi High-Technologies Corporation) in such a manner that the entire magnetic layer 43 is contained in the cross-section with respect to the thickness direction of the magnetic layer 43 on conditions that an accelerating voltage: 200 kV and a total magnification: 500,000×, and a TEM photograph is taken. Next, 50 particles that have side surfaces which face a direction of a viewing screen and that have thicknesses which can be clearly confirmed are selected from the taken TEM photograph. FIGS. 8A and 8B, for example, depict an example of the TEM photograph. In FIGS. 8A and 8B, particles indicated by, for example, arrows a and d are selected since the thicknesses of the particles can be clearly confirmed. Maximum thicknesses DA of the 50 selected particles are measured. An average maximum thickness $DA_{ave}$ is obtained by simply averaging (arithmetically averaging) the maximum thicknesses DA obtained in this way. Next, diameters DB of magnetic powders are measured. To measure the diameters DB of the particles, 50 particles the diameters that have the diameters which can be clearly confirmed are selected from the taken TEM photograph. In FIGS. 8A and 8B, particles indicated by, for example, arrows b and c are selected since the diameters of the particles can be clearly confirmed. The diameters DB of the 50 selected particles are measured. An average diameter $DB_{ave}$ is obtained by simply averaging (arithmetically averaging) the diameters DB obtained in this way. The average diameter $DB_{ave}$ corresponds to the average particle size. Furthermore, an average aspect ratio ($DB_{ave}/DA_{ave}$) of the particles is obtained from the average maximum thickness $DA_{ave}$ and the average diameter $DB_{ave}$.

In the case in which the magnetic powder includes the hexagonal ferrite particle powder, an average particle volume of the magnetic powder is preferably equal to or smaller than 5,900 $nm^3$, more preferably equal to or greater than 500 $nm^3$ and equal to or smaller than 3,400 $nm^3$, further more preferably equal to or greater than 1,000 $nm^3$ and equal to or smaller than 2,500 $nm^3$, particularly preferably equal to or greater than 1,000 $nm^3$ and equal to or smaller than 1,800 $nm^3$, most preferably equal to or greater than 1,000 $nm^3$ and equal to or smaller than 1,500 $nm^3$. If the average particle volume of the magnetic powder is equal to or smaller than 5,900 $nm^3$, a similar effect to that in the case of setting the average particle size of the magnetic powder to be equal to or smaller than 30 nm can be obtained. On the other hand, if the average particle volume of the magnetic powder is equal to or greater than 500 $nm^3$, a similar effect to that in the case of setting the average particle size of the magnetic powder to equal to or greater than 12 nm can be obtained.

The average particle volume of the magnetic powder is obtained as follows. First, as already described in relation to a method of calculating the average particle size of the magnetic powder, an average long axis length $DA_{ave}$ and the average diameter $DB_{ave}$ are obtained. Next, an average volume V of the magnetic powder is obtained by the following Equation.

$$V = \frac{3\sqrt{3}}{8} \times DA_{ave} \times DB_{ave} \times DB_{ave} \quad \text{[Math. 1]}$$

(ε Iron Oxide Particles)

The ε iron oxide particles are hard magnetic particles capable of obtaining a high coercive force even if the particles are fine particles. The ε iron oxide particles have either a spherical shape or a cubic shape. In the present specification, it is assumed that the spherical shape includes a substantially spherical shape. It is also assumed that the cubic shape includes a substantially cubic shape. Since the ε iron oxide particles have the shape described above, it is possible to reduce a contact area between the particles in the thickness direction of the magnetic tape MT and suppress the agglomeration of the particles in the case of using the ε iron oxide particles as the magnetic particles, compared with the case of using the hexagonal barium ferrite particles as the magnetic particles. It is, therefore, possible to enhance the dispersibility of the magnetic powder and attain further excellent electromagnetic conversion characteristics (for example, SNR).

The ε iron oxide particles has a core-shell structure. Specifically, the ε iron oxide particles each include a core portion and a shell portion of a two-layer structure provided around this core portion. The shell portion includes a first shell portion provided on the core portion and a second shell portion provided on the first shell portion.

The core portion contains ε iron oxide. ε iron oxide contained in the core portion has preferably a ε-$Fe_2O_3$ crystal as a main phase, more preferably has a single phase ε-$Fe_2O_3$.

The first shell portion covers at least part of surroundings of the core portion. Specifically, the first shell portion may cover the surroundings of the core portion either partially or entirely. It is preferable that the first shell portion covers an entire surface of the core portion from the viewpoint of ensuring sufficient exchange coupling between the core portion and the first shell portion and improving magnetic characteristics.

The first shell portion is a so-called soft magnetic layer and contains a soft magnetic material, which is, for example, α-Fe, a Ni—Fe alloy, or a Fe—Si—Al alloy. α-Fe may be obtained by reduction of ε iron oxide contained in the core portion.

The second shell portion is an oxide film that serves as an antioxidant layer. The second shell portion contains α iron oxide, aluminum oxide, or silicon oxide. α iron oxide includes, for example, at least one type of iron oxide among $Fe_3O_4$, $Fe_2O_3$, and FeO. In a case in which the first shell portion contains α-Fe (soft magnetic material), α iron oxide may be obtained by oxidation of α-Fe contained in the first shell portion.

Since each of the ε iron oxide particles has the first shell portion described above, it is possible to adjust a coercive force Hc of the entire ε iron oxide particles (core-shell particles) to the coercive force Hc suited for recording while a coercive force Hc of the single core portion is kept to a large value for ensuring thermal stability. Furthermore, since each of the ε iron oxide particles has the second shell portion described above, it is possible to suppress a reduction in characteristics of the ε iron oxide particles by exposure of the ε iron oxide particles into air and generation of rust or the like on a particle surface in and before a process of manufacturing the magnetic tape MT. It is, therefore, possible to suppress a degradation in the characteristics of the magnetic tape MT.

Each of the ε iron oxide particles may have a shell portion of a single-layer structure. In this case, the shell portion has a configuration similar to that of the first shell portion. It is preferable, however, that each of the ε iron oxide particles has the shell portion of the two-layer structure as described above from the viewpoint of suppressing the degradation in the characteristics of the ε iron oxide particles.

The ε iron oxide particles may each contain an additive as an alternative to the core-shell structure described above or may have the core-shell structure and contain an additive. In this case, the additive is substituted for part of Fe in the ε iron oxide particles. The coercive force Hc of the entire ε iron oxide particles can be also adjusted to the coercive force Hc suited for recording by causing each of the ε iron oxide particles to contain the additive; thus, it is possible to improve ease of recording. The additive is a metallic element other than iron, preferably a trivalent metallic element, more preferably at least one type of Al, Ga, or In, further more preferably at least one type of Al or Ga.

Specifically, ε iron oxide containing the additive is an ε-$Fe_{2-x}M_xO_3$ crystal (where M is a metallic element other than iron, preferably a trivalent metallic element, more preferably at least one type of Al, Ga, or In, further more preferably at least one type of Al or Ga, and x is, for example, 0<x<1).

An average particle size (average maximum particle size) of the magnetic powder is, for example, equal to or smaller than 22.5 nm. The average particle size (average maximum particle size) of the magnetic powder is preferably equal to or smaller than 22 nm, more preferably equal to or greater than 8 nm and equal to or smaller than 22 nm, further more preferably equal to or greater than 12 nm and equal to or smaller than 22 nm, particularly preferably equal to or greater than 12 nm and equal to or smaller than 15 nm, most preferably equal to or greater than 12 nm and equal to or smaller than 14 nm. In the magnetic tape MT, a region at a size that is half of a recording wave length corresponds to an actual magnetized region. Owing to this, setting the average particle size of the magnetic powder to be equal to or smaller than half of a smallest recording wave length makes it possible to attain the further excellent electromagnetic conversion characteristics (for example, SNR). Therefore, if the average particle size of the magnetic powder is equal to or smaller than 22 nm, the high recording density magnetic tape MT (for example, the magnetic tape MT configured to be capable of recording a signal at the smallest recording wave length equal to or smaller than 44 nm) can attain further excellent electromagnetic conversion characteristics (for example, SNR). On the other hand, if the average particle size of the magnetic powder is equal to or greater than 8 nm, it is possible to improve the dispersibility of the magnetic powder and attain further excellent electromagnetic conversion characteristics (for example, SNR).

The average aspect ratio of the magnetic powder is preferably equal to or higher than 1.0 and equal to or lower than 3.0, more preferably equal to or higher than 1.0 and equal to or lower than 2.5, further more preferably equal to or higher than 1.0 and equal to or lower than 2.1, particularly preferably equal to or higher than 1.0 and equal to or lower than 1.8. If the average aspect ratio of the magnetic powder is within the range equal to or higher than 1.0 and equal to or lower than 3.0, it is possible to suppress the agglomeration of the magnetic powder. It is also possible to suppress the resistance applied to the magnetic powder at the time of perpendicularly orienting the magnetic powder in the process of forming the magnetic layer 43. It is, therefore, possible to improve the perpendicular orientation of the magnetic powder.

In the case in which the magnetic powder includes the ε iron oxide particle powder, the average particle size and the average aspect ratio of the magnetic powder are obtained as follows. First, the magnetic tape MT to be measured is processed by the FIB (Focused Ion Beam) method or the like to slice the magnetic tape MT. In the case of using the FIB method, the carbon layer and the tungsten layer are formed as the protective film as the preprocess performed before observing the TEM image of the cross-section to be described later. The carbon layer is formed on each of the magnetic layer 43-side surface and the back layer 44-side surface of the magnetic tape MT by the evaporation method, and the tungsten layer is formed on the carbon layer formed on the magnetic layer 43-side surface by the evaporation method or the sputtering method. Slicing is performed along the length direction (longitudinal direction) of the magnetic tape MT. In other words, a cross-section in parallel to both the longitudinal direction and the thickness direction of the magnetic tape MT by the slicing.

The cross-section of the obtained sliced sample is observed by the transmission electron microscope (H-9500 manufactured by Hitachi High-Technologies Corporation) in such a manner that the entire magnetic layer 43 is contained in the cross-section with respect to the thickness direction of the magnetic layer 43 on conditions that the accelerating voltage: 200 kV and the total magnification: 500,000×, and a TEM photograph is taken. Next, 50 particles that have shapes which can be clearly confirmed are selected from the taken TEM photograph, and a long axis length DL and a short axis length DS of each particle are measured. The long axis length DL means herein a maximum distance (so-called maximum Feret diameter) among distances between two parallel lines drawn from all angles in such a manner that the lines are tangent to a profile of each particle. On the other hand, the short axis length DS means a maximum length among lengths of the particle in a direction orthogonal to the long axis (DL) of the particle. Subsequently, an average long axis length $DL_{ave}$ is obtained by simply averaging (arithmetically averaging) the measured long axis lengths DL of the 50 particles. The average long axis length $DL_{ave}$ obtained in this way is assumed as the average particle size of the magnetic powder. Furthermore, an average short axis length $DS_{ave}$ is obtained by simply averaging (arithmetically averaging) the measured short axis lengths DS of the 50 particles. In addition, an average aspect ratio ($DL_{ave}/DS_{ave}$) of the particles is obtained from the average long axis length $DL_{ave}$ and the average short axis length $DS_{ave}$.

The average particle volume of the magnetic powder is preferably equal to or smaller than 5,600 nm³, more preferably equal to or greater than 250 nm³ and equal to or smaller than 5,600 nm³, further more preferably equal to or greater than 900 nm³ and equal to or smaller than 5,600 nm³, particularly preferably equal to or greater than 900 nm³ and equal to or smaller than 1,800 nm³, most preferably equal to or greater than 900 nm³ and equal to or smaller than 1,500 nm³. Since noise of the magnetic tape MT is generally inversely proportional to a square root of the number of particles (that is, proportional to a square root of a particle volume), it is possible to attain further excellent electromagnetic conversion characteristics (for example, SNR) by making the particle volume smaller. Therefore, if the average particle volume of the magnetic powder is equal to or smaller than 5,600 nm³, it is possible to attain further excellent electromagnetic conversion characteristics (for example, SNR) similarly to the case of setting the average particle size of the magnetic powder to be equal to or smaller than 22 nm. On the other hand, if the average particle volume of the magnetic powder is equal to or greater than 250 nm³, a similar effect to that in the case of setting the average particle size of the magnetic powder to equal to or greater than 8 nm can be obtained.

In the case in which the ε iron oxide particles have the spherical shape, the average particle volume of the magnetic powder is obtained as follows. First, similarly to the method of calculating the average particle size of the magnetic powder described above, the average long axis length $DL_{ave}$ is obtained. Next, an average volume V of the magnetic powder is obtained by the following Equation.

$$V=(\pi/6) \times DL_{ave}^3$$

In the case in which the ε iron oxide particles have the cubic shape, the average particle volume of the magnetic powder is obtained as follows. First, the magnetic tape MT is processed by the FIB (Focused Ion Beam) method or the like to slice the magnetic tape MT. In the case of using the FIB method, the carbon layer and the tungsten layer are formed as the protective film as a preprocess performed before observing the TEM image of the cross-section to be described later. The carbon layer is formed on each of the magnetic layer 43-side surface and the back layer 44-side surface of the magnetic tape MT by the evaporation method, and the tungsten layer is formed on the carbon layer formed on the magnetic layer 43-side surface by the evaporation method or the sputtering method. The slicing is performed along the length direction (longitudinal direction) of the magnetic tape MT. In other words, the cross-section in parallel to both the longitudinal direction and the thickness direction of the magnetic tape MT is formed by the slicing.

The cross-section of the obtained sliced sample is observed by the transmission electron microscope (H-9500 manufactured by Hitachi High-Technologies Corporation) in such a manner that the entire magnetic layer 43 is contained in the cross-section with respect to the thickness direction of the magnetic layer 43 on conditions that the accelerating voltage: 200 kV and a total magnification: 500,000×, and a TEM photograph is taken. It is noted that the magnification and the accelerating voltage may be adjusted as appropriate depending on the type of the device. Next, 50 particles the shapes of which can be clearly confirmed are selected from the taken TEM photograph, and side lengths DC of the particles are measured. Subsequently, an average side length $DC_{ave}$ is obtained by simply averaging (arithmetically averaging) the measured side lengths DC of the 50 particles. Next, an average volume $V_{ave}$ (particle volume) of the magnetic powder is obtained using the average side length $DC_{ave}$ by the following Equation.

$$V_{ave}=DC_{ave}^3$$

(Cobalt Ferrite Particles)

Cobalt ferrite particles preferably have uniaxial crystal anisotropy. Since the cobalt ferrite particles have the uniaxial crystal anisotropy, it is possible to allow the magnetic powder to have crystalline orientation preferentially in the thickness direction (perpendicular direction) of the magnetic tape MT. The cobalt ferrite particles have, for example, a cubic shape. In the present specification, it is assumed that the cubic shape includes a substantially cubic shape. Co-containing spinel ferrite may further contain at least one type of Ni, Mn, Al, Cu, or Zn in addition to Co.

Co-containing spinel ferrite has an average composition expressed by, for example, the following formula.

$$Co_xM_yFe_2O_z$$

(In the formula, M denotes at least one type of metal among, for example, Ni, Mn, Al, Cu, and Zn. x is a value in a range of $0.4 \leq x \leq 1.0$. y is a value in a range of $0 \leq y \leq 0.3$. It is to be noted that x and y satisfy a relation of $(x+y) \leq 1.0$. z is a value in a range of $3 \leq z \leq 4$. The other metallic element may be substituted for part of Fe.)

In a case in which the magnetic powder includes a cobalt ferrite particle powder, an average particle size of the magnetic powder is preferably equal to or smaller than 25 nm, more preferably equal to or greater than 8 nm and equal to or smaller than 23 nm, further more preferably equal to or greater than 8 nm and equal to or smaller than 12 nm, and particularly preferably equal to or greater than 8 nm and equal to or smaller than 11 nm. If the average particle size of the magnetic powder is equal to or smaller than 25 nm, the high recording density magnetic tape MT can attain further excellent electromagnetic conversion characteristics (for example, SNR). On the other hand, if the average particle size of the magnetic powder is equal to or greater than 8 nm, it is possible to improve the dispersibility of the magnetic powder and attain further excellent electromagnetic conversion characteristics (for example, SNR). A method of calculating the average particle size of the magnetic powder is similar to the method of calculating the average particle size of the magnetic powder in the case in which the magnetic powder includes the ε iron oxide particle powder.

The average aspect ratio of the magnetic powder is preferably equal to or higher than 1.0 and equal to or lower than 3.0, more preferably equal to or higher than 1.0 and equal to or lower than 2.5, further more preferably equal to or higher than 1.0 and equal to or lower than 2.1, particularly preferably equal to or higher than 1.0 and equal to or lower than 1.8. If the average aspect ratio of the magnetic powder is within a range equal to or higher than 1.0 and equal to or lower than 3.0, it is possible to suppress the agglomeration of the magnetic powder. It is also possible to suppress the resistance applied to the magnetic powder at the time of perpendicularly orienting the magnetic powder in the process of forming the magnetic layer 43. It is, therefore, possible to improve the perpendicular orientation of the magnetic powder. A method of calculating the average aspect ratio of the magnetic powder is similar to the method of calculating the average aspect ratio of the magnetic powder in the case in which the magnetic powder includes the iron oxide particle powder.

The average particle volume of the magnetic powder is preferably equal to or smaller than 15,000 $nm^3$, more preferably equal to or greater than 500 $nm^3$ and equal to or smaller than 12,000 $nm^3$, particularly preferably equal to or greater than 500 $nm^3$ and equal to or smaller than 1,800 $nm^3$, most preferably equal to or greater than 500 $nm^3$ and equal to or smaller than 1,500 $nm^3$. If the average particle volume of the magnetic powder is equal to or smaller than 15,000 $nm^3$, a similar effect to that in the case of setting the average particle size of the magnetic powder to be equal to or smaller than 25 nm can be obtained. On the other hand, if the average particle volume of the magnetic powder is equal to or greater than 500 $nm^3$, a similar effect to that in the case of setting the average particle size of the magnetic powder to equal to or greater than 8 nm can be obtained. A method of calculating the average particle volume of the magnetic powder is similar to the method of calculating the average particle volume of the magnetic powder in the case in which the iron oxide particles have the cubic shape.

(Binder)

Examples of the binder include thermoplastic resins, thermosetting resins, and reactive resins. Examples of the thermoplastic resins include vinyl chloride, vinyl acetate, a vinyl chloride/vinyl acetate copolymer, a vinyl chloride/vinylidene chloride copolymer, a vinyl chloride/acrylonitrile copolymer, acrylic ester/acrylonitrile copolymer, an acrylic ester/vinyl chloride/vinylidene chloride copolymer, an acrylic ester/acrylonitrile copolymer, an acrylic ester/vinylidene chloride copolymer, a methacrylic ester/vinylidene chloride copolymer, a methacrylic ester/vinyl chloride copolymer, a methacrylic ester/ethylene copolymer, polyvinyl fluoride, a vinylidene chloride/acrylonitrile copolymer, an acrylonitrile/butadiene copolymer, polyamide resin, polyvinyl butyral, cellulose derivatives (cellulose acetate butyrate, cellulose diacetate, cellulose triacetate, cellulose propionate, and nitrocellulose), a styrene-butadiene copolymer, a polyurethane resin, a polyester resin, an amino resin, and a synthetic rubber.

Examples of the thermosetting resins include a phenol resin, an epoxy resin, a polyurethane thermosetting resin, a urea resin, a melamine resin, an alkyd resin, a silicone resin, a polyamine resin, and a urea-formaldehyde resin.

For the purpose of improving the dispersibility of the magnetic powder, a polar functional group such as $—SO_3M$, $—OSO_3M$, $—COOM$, $P═O(OM)_2$ (where M denotes a hydrogen atom or an alkali metal such as lithium, potassium, or sodium), a side chain amine having an end group represented by $—NR1R2$ or $—NR1R2R3^+X^-$, a main chain amine represented by $>NR1R2^+X^-$ (where R1, R2, and R3 each denote a hydrogen atom or a hydrocarbon group, and X— denotes a halogen ion, an inorganic ion, or an organic ion such as an ion of fluorine, chlorine, bromine, or iodine), or $—OH$, $—SH$, $—SH$, $—CN$, or an epoxy group may be introduced into each of all binders described above. An introduction amount of any of these polar functional groups into the binder is preferably $10^{-1}$ to $10^{-8}$ mol/g, more preferably $10^{-2}$ to $10^{-6}$ mol/g.

(Lubricant)

The lubricant contains at least one type selected from between, for example, fatty acid and fatty acid ester, preferably contains both fatty acid and fatty acid ester. Causing the magnetic layer 43 to contain the lubricant, particularly to contain both fatty acid and fatty acid ester can contribute to improving running stability of the magnetic tape MT. Causing the magnetic layer 43 to more particularly contain the lubricant and pores can contribute to attaining favorable running stability. A reason for improving the running stability is considered as follows. A dynamic friction coefficient of the magnetic layer 43-side surface of the magnetic tape MT is adjusted to a value suited for running of the magnetic tape MT by the lubricant.

Fatty acid may be preferably a compound represented by the following General Formula (1) or (2). For example, the lubricant may contain one of or both the compound represented by the following General Formula (1) and the compound represented by the following General Formula (2) as fatty acid.

Furthermore, fatty acid ester may be preferably a compound represented by the following General Formula (3) or (4). For example, the lubricant may contain one of or both the compound represented by the following General Formula (3) and the compound represented by the following General Formula (4) as fatty acid ester.

Causing the lubricant to contain any one of or both the compound represented by the General Formula (1) and the compound represented by the General Formula (2), and any one of or both the compound represented by the General Formula (3) and the compound represented by the General Formula (4) makes it possible to suppress an increase in the dynamic friction coefficient due to repeated recording or reproducing data to or from the magnetic tape MT.

$$CH_3(CH_2)_k COOH \quad (1)$$

(in General Formula (1), k denotes an integer selected from those in a range equal to or greater than 14 and equal to or smaller than 22, more preferably those in a range equal to or greater than 14 and equal to or smaller than 18.)

$$CH_3(CH_2)_n CH=CH(CH_2)_m COOH \quad (2)$$

(in General Formula (2), a sum of n and m is an integer selected from those in a range equal to or greater than 12 and equal to or smaller than 20, more preferably those in a range equal to or greater than 14 and equal to or smaller than 18.)

$$CH_3(CH_2)_p COO(CH_2)_q CH_3 \quad (3)$$

(in General Formula (3), p is an integer selected from those in a range equal to or greater than 14 and equal to or smaller than 22, more preferably those in a range equal to or greater than 14 and equal to or smaller than 18, and q is an integer selected from those in a range equal to or greater than 2 and equal to or smaller than 5, more preferably those in a range equal to or greater than 2 and equal to or smaller than 4.)

$$CH_3(CH_2)_r COO—(CH_2)_s CH(CH_3)_2 \quad (4)$$

(in General Formula (4), r denotes an integer selected from those in a range equal to or greater than 14 and equal to or smaller than 22, and s denotes an integer selected from those in a range equal to or greater than 1 and equal to or smaller than 3.)

(Antistatic Agent)

Examples of the antistatic agent include carbon black, a natural surfactant, a nonionic surfactant, and a cationic surfactant.

(Abrasive)

Examples of the abrasive include α-alumina at an α rate equal to or higher than 90%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle α-iron oxide obtained by dehydrating or annealing a raw material of magnetic oxide of iron, and substances obtained by performing a surface treatment on these abrasives by aluminum and/or silica.

(Curing Agent)

Examples of the curing agent include polyisocyanate. Examples of polyisocyanate include aromatic polyisocyanate such as an adduct between tolylene diisocyanate (TDI) and an active hydrogen compound, and aliphatic polyisocyanate such as an adduct between hexamethylene diisocyanate (HMDI) and an active hydrogen compound. A weight-average molecular weight of these polyisocyanates is desirably in a range from 100 to 3,000.

(Anticorrosive Agent)

Examples of the anticorrosive agent include heterocyclic compounds containing phenols, naphthols, quinones, and nitrogen atoms, heterocyclic compounds containing oxygen atoms, and heterocyclic compounds containing sulfur atoms.

(Non-Magnetic Reinforcement Particles)

Examples of the non-magnetic reinforcement particles include aluminum oxide (α, β, and γ alumina), chromium oxide, silicon oxide, diamond, garnet, emery, boron nitride, titanium carbide, silicon carbide, titanium carbide, and titanium oxide (rutile or anatase-type titanium oxide).

(Foundation Layer)

The foundation layer 42 is intended to mitigate irregularities on the surface of the substrate 41 and to adjust irregularities on the surface of the magnetic layer 43. The foundation layer 42 is a non-magnetic layer containing a non-magnetic powder, a binder, and a lubricant. The foundation layer 42 supplies the lubricant to the surface of the magnetic layer 43. The foundation layer 42 may further contain at least one type of an additive among the antistatic agent, the curing agent, and the anticorrosive agent as needed.

An average thickness of the foundation layer 42 is preferably equal to or greater than 0.3 μm and equal to or smaller than 2.0 μm, more preferably equal to or greater than 0.5 μm and equal to or smaller than 1.4 μm. It is noted that the average thickness of the foundation layer 42 is obtained similarly to the average thickness $t_m$ of the magnetic layer 43. It is to be noted, however, that the magnification of the TEM image is appropriately adjusted in response to the thickness of the foundation layer 42. If the average thickness of the foundation layer 42 is equal to or smaller than 2.0 μm, elasticity of the magnetic tape MT is further increased by an external force and it is, therefore, easier to adjust the width of the magnetic tape MT by tension adjustment.

The foundation layer 42 preferably has a plurality of hole portions. Accumulating the lubricant in the plurality of hole portions makes it possible to further suppress a reduction in a supply amount of the lubricant between the surface of the magnetic layer 43 and the magnetic head even after repeated recording or reproducing (that is, even after the magnetic head 56 is brought into contact with the surface of the magnetic tape MT to repeatedly run the magnetic head 56). It is, therefore, possible to further suppress the increase in the dynamic friction coefficient. In other words, it is possible to attain further excellent running stability.

From the viewpoint of suppressing the reduction in the dynamic friction coefficient after the repeated recording or reproducing, it is preferable that the hole portions of the foundation layer 42 are connected to the recessed portions 43A of the magnetic layer 43. It is assumed herein that connecting the hole portions of the foundation layer 42 to the recessed portions 43A of the magnetic layer 43 includes a state in which part of the plurality of hole portions of the foundation layer 42 is connected to part of the plurality of recessed portions 43A of the magnetic layer 43.

From the viewpoint of improving a performance of supplying the lubricant to the surface of the magnetic layer 43, the plurality of hole portions preferably includes hole portions extending in the perpendicular direction of the surface of the magnetic layer 43. In addition, from the viewpoint of improving the performance of supply of the lubricant to the surface of the magnetic layer 43, the hole portions of the foundation layer 42 extending in the perpendicular direction to the surface of the magnetic layer 43 are preferably connected to the recessed portions 43A of the magnetic layer 43 extending in the perpendicular direction of the surface of the magnetic layer 43.

(Non-Magnetic Powder)

The non-magnetic powder includes at least one type of, for example, an inorganic particle powder or an organic particle powder. Furthermore, the non-magnetic powder may include a carbon powder such as a carbon black powder. It is noted that one type of non-magnetic powder may be used solely or a combination two or more types of non-magnetic powders may be used. Examples of inorganic particles include particles of metal, metal oxide, metal carbonate, metal sulfate, metal nitride, metal carbide, and metal sulfide. While examples of a shape of the non-magnetic powder include various shapes such as a needle shape, a spherical shape, a cubic shape, and a plate shape, the shape of the non-magnetic powder is not limited to these shapes.

(Binder, Lubricant)

The binder and the lubricant are similar to those in the magnetic layer 43 described above.

(Additive)

The antistatic agent, the curing agent, and the anticorrosive agent are similar to those in the magnetic layer 43 described above.

(Back Layer)

The back layer 44 contains a binder and a non-magnetic powder. The back layer 44 may further contain at least one type of the additive among the lubricant, the curing agent, and the antistatic agent as needed. The binder and the non-magnetic powder are similar to those in the foundation layer 42 described above.

An average particle size of the non-magnetic powder is preferably equal to or greater than 10 nm and equal to or smaller than 150 nm, more preferably equal to or greater than 15 nm and equal to or smaller than 110 nm. The average particle size of the non-magnetic powder is obtained similarly to the average particle size of the magnetic powder described above. The non-magnetic powder may include a non-magnetic powder having two or more particle size distributions.

An upper limit of an average thickness of the back layer 44 is preferably equal to or smaller than 0.6 μm. With the upper limit of the average thickness of the back layer 44 equal to or smaller than 0.6 μm, it is possible to keep thick the foundation layer 42 and the substrate 41 even in a case in which the average thickness of the magnetic tape MT is equal to or smaller than 5.6 μm; thus, it is possible to maintain the running stability of the magnetic tape MT within the recording and reproducing device 50. While a lower limit of the average thickness of the back layer 44 is not limited to a specific value, the lower limit is, for example, equal to or greater than 0.2 μm.

The average thickness $t_b$ of the back layer 44 is obtained as follows. First, an average thickness $t_T$ of the magnetic tape MT is measured. A method of measuring the average thickness $t_T$ is described in "average thickness of magnetic tape" described below. Subsequently, a sample of the back layer 44 is removed by a solvent such as MEK (methyl ethyl ketone) or diluted hydrochloric acid. Next, thicknesses of the sample in positions of five or more points are measured using the laser hologage (LGH-110C) manufactured by Mitutoyo Corporation, measurement values in the five or more positions are simply averaged (arithmetically averaged), and an average value $t_B$ [μm] is calculated. The average thickness $t_b$ [μm] of the back layer 44 is then obtained by the following Equation. It is noted that the measurement positions are selected at random from the sample.

$$t_b\ [\mu m] = t_T\ [\mu m] - t_B\ [\mu m]$$

The back layer 44 has a surface on which a plurality of protruding portions 44A is provided. The plurality of protruding portions 44A is used to form the plurality of recessed portions 43A on the surface of the magnetic layer 43 in a state of winding up the magnetic tape MT into a roll shape. The plurality of recessed portions 43A includes, for example, a plurality of non-magnetic particles protruding from the surface of the back layer 44.

(Average Thickness of Magnetic Tape)

An upper limit of the average thickness (average overall thickness) $t_T$ of the magnetic tape MT is equal to or smaller than 5.6 μm, preferably equal to or smaller than 5.0 μm, more preferably equal to or smaller than 4.6 μm, further more preferably equal to or smaller than 4.4 μm. If the average thickness $t_T$ of the magnetic tape MT is equal to or smaller than 5.6 μm, a recording capacity with which data can be recorded in one data cartridge can be enhanced, compared with that of an ordinary magnetic tape. While a lower limit of the average thickness $t_T$ of the magnetic tape MT is not limited to a specific value, the lower limit is, for example, equal to or greater than 3.5 μm.

The average thickness $t_T$ of the magnetic tape MT is obtained as follows. First, the magnetic tape MT at a width of ½ inch is prepared and cut by a length of 250 mm, and a sample is produced. Next, thicknesses of the sample in positions of five or more points are measured using the laser hologage (LGH-110C) manufactured by Mitutoyo Corporation, measurement values in the five or more positions are simply averaged (arithmetically averaged), and the average value $t_T$ [μm] is calculated. It is noted that the measurement positions are selected at random from the sample.

(Coercive Force Hc)

An upper limit of a coercive force Hc2 of the magnetic layer 43 in the longitudinal direction of the magnetic tape MT is preferably equal to or smaller than 2,000 Oe, more preferably equal to or smaller than 1,900 Oe, further more preferably equal to or smaller than 1,800 Oe. If the coercive force Hc2 of the magnetic layer 43 in the longitudinal direction of the magnetic tape MT is equal to or smaller than 2,000 Oe, the magnetic layer 43 can exhibit sufficient electromagnetic conversion characteristics even at a high recording density.

A lower limit of the coercive force Hc2 of the magnetic layer 43 in the longitudinal direction of the magnetic tape MT is preferably equal to or greater than 1,000 Oe. If the coercive force Hc2 of the magnetic layer 43 measured in the longitudinal direction is equal to or greater than 1,000 Oe, it is possible to suppress demagnetization due to leakage flux from the recording head.

The coercive force Hc2 is obtained as follows. First, three magnetic tapes MT are built up by double-sided tapes and subjected to punching by a punch at ε of 6.39 mm, thereby producing a measurement sample. At this time, the measurement sample is marked with a non-magnetic arbitrary ink such that the longitudinal direction (running direction) of the magnetic tape MT can be recognized. An M-H loop of the measurement sample (entire magnetic tape MT) corresponding to the longitudinal direction (running direction) of the magnetic tape MT is measured using a Vibrating Sample Magnetometer (VSM). Next, coated films (foundation layer 42, magnetic layer 43, back layer 44, and the like) are wiped out using acetone, ethanol, or the like, and only the substrate 41 is left. Subsequently, three obtained substrates 41 are built up by the double-sided tapes and subjected to punching by the punch at ε of 6.39 mm, thereby producing a sample for background correction (hereinafter, simply referred to as "correction sample"). An M-H loop of the correction sample (substrate 41) corresponding to the perpendicular direction of the substrate 41 (perpendicular direction of the magnetic tape MT) is measured using the VSM.

A High Sensitivity Vibrating Sample Magnetometer "VSM-P7-15 type" manufactured by Toei Industry Co., Ltd. is used in measuring the M-H loop of the measurement sample (entire magnetic tape MT) and the M-H loop of the correction sample (substrate 41). Measurement conditions are set to include: a measurement mode: full-loop, a maximum magnetic field: 15 kOe, a magnetic field step: 40 bits, Time constant of Locking amp: 0.3 sec, Waiting time: 1 sec, and Average number of MHs: 20.

After obtaining the M-H loop of the measurement sample (entire magnetic tape MT) and the M-H loop of the correction sample (substrate 41), the M-H loop of the correction sample (substrate 41) is subtracted from the M-H loop of the measurement sample (entire magnetic tape MT), thereby performing background correction and obtaining a background-corrected M-H loop. A measurement/analysis program attached to "VSM-P 7-15 type" is used in calculating this background correction. The coercive force Hc2 is obtained from the obtained background-corrected M-H loop. It is noted that the measurement/analysis program attached to the "VSM-P7-15 type" is used in this calculation. It is assumed that the M-H loops are measured at 25° C. It is also assumed that "demagnetizing field correction" is not performed at a time of measuring the M-H loops in the longitudinal direction of the magnetic tape MT.

(Squareness Ratio)

A squareness ratio S1 of the magnetic layer 43 in the perpendicular direction (thickness direction) of the magnetic tape MT is preferably equal to or higher than 65%, more preferably equal to or higher than 70%, further more preferably equal to or higher than 75%, particularly preferably equal to or higher than 80%, most preferably equal to or higher than 85%. If the squareness ratio S1 is equal to or higher than 65%, perpendicular orientation of the magnetic powder is sufficiently high; thus, it is possible to attain further excellent electromagnetic conversion characteristics.

The squareness ratio S1 in the perpendicular direction is obtained as follows. First, three magnetic tapes MT are built up by double-sided tapes and subjected to punching by a punch at ε of 6.39 mm, thereby producing the measurement sample. At this time, the measurement sample is marked with the non-magnetic arbitrary ink such that the longitudinal direction (running direction) of the magnetic tape MT can be recognized. The M-H loop of the measurement sample (entire magnetic tape MT) corresponding to the perpendicular direction (thickness direction) of the magnetic tape MT is measured using the VSM. Next, coated films (foundation layer 12, magnetic layer 43, back layer 14, and the like) are wiped out using acetone, ethanol, or the like, and only the substrate 41 is left. Subsequently, three obtained substrates 41 are built up by the double-sided tapes and subjected to punching by the punch at ε of 6.39 mm, thereby producing the sample for background correction (hereinafter, simply referred to as "correction sample"). The M-H loop of the correction sample (substrate 41) corresponding to the perpendicular direction of the substrate 41 (perpendicular direction of the magnetic tape MT) is measured using the VSM.

The High Sensitivity Vibrating Sample Magnetometer "VSM-P7-15 type" manufactured by Toei Industry Co., Ltd. is used in measuring the M-H loop of the measurement sample (entire magnetic tape MT) and the M-H loop of the correction sample (substrate 41). Measurement conditions are set to include: the measurement mode: full-loop, the maximum magnetic field: 15 kOe, the magnetic field step: 40 bits, the Time constant of Locking amp: 0.3 sec, the Waiting time: 1 sec, and Average number of MHs: 20.

After obtaining the M-H loop of the measurement sample (entire magnetic tape MT) and the M-H loop of the correction sample (substrate 41), the M-H loop of the correction sample (substrate 41) is subtracted from the M-H loop of the measurement sample (entire magnetic tape MT), thereby performing background correction and obtaining the background-corrected M-H loop. The measurement/analysis program attached to "VSM-P7-15 type" is used in calculating this background correction.

Saturation magnetization Ms (emu) and residual magnetization Mr (emu) of the obtained background-corrected M-H loop are substituted into the following Equation to calculate the squareness ratio S1 (%). It is assumed that the M-H loops are measured at 25° C. It is also assumed that "demagnetizing field correction" is not performed at the time of measuring the M-H loops in the perpendicular direction of the magnetic tape MT. It is noted that the measurement/analysis program attached to the "VSM-P7-15 type" is used in this calculation.

Squareness ratio $S1(\%)=(Mr/Ms)\times 100$

A squareness ratio S2 of the magnetic layer 43 in the longitudinal direction (running direction) of the magnetic tape MT is preferably equal to or lower than 35%, more preferably equal to or lower than 30%, further more preferably equal to or lower than 25%, particularly preferably equal to or lower than 20%, and most preferably equal to or lower than 15%. If the squareness ratio S2 is equal to or lower than 35%, the perpendicular orientation of the magnetic powder is sufficiently high; thus, it is possible to attain further excellent electromagnetic conversion characteristics.

The squareness ratio S2 in the longitudinal direction is obtained similarly to the squareness ratio S1 except that the M-H loops are measured in the longitudinal direction (running direction) of the magnetic tape MT and the substrate 41.

(Hc2/Hc1)

A ratio Hc2/Hc1 of the coercive force Hc1 of the magnetic layer 43 in the perpendicular direction to the coercive force Hc2 of the magnetic layer 43 in the longitudinal direction satisfies a relation of Hc2/Hc1≤0.8, preferably Hc2/Hc1≤0.75, more preferably Hc2/Hc1≤0.7, further more preferably Hc2/Hc1≤0.65, particularly preferably Hc2/Hc1≤0.6. If the coercive forces Hc1 and Hc2 satisfy the relation of Hc2/Hc1≤0.8, it is possible to enhance the perpendicular orientation of the magnetic powder. It is, therefore, possible to reduce a magnetization transition width and obtain a high output signal at the time of reproducing a signal; thus, it is possible to attain further excellent electromagnetic conversion characteristics. As described above, if the coercive force Hc2 is lower, magnetization reacts to the magnetic field in the perpendicular direction from the recording head with higher sensitivity; thus, it is possible to form a favorable recording pattern.

In the case in which the ratio Hc2/Hc1 has the relation of Hc2/Hc1≤0.8, it is particularly effective to set the average thickness $t_m$ of the magnetic layer 43 to be equal to or smaller than 90 nm. If the average thickness $t_m$ of the magnetic layer 43 exceeds 90 nm, in a case in which the ring-type head is used as the recording head, then a lower region of the magnetic layer 43 (foundation layer 42-side region) is magnetized in the longitudinal direction, and there is a possibility that it is impossible to uniformly magnetize the magnetic layer 43 in the thickness direction. As a result, even if the ratio Hc2/Hc1 is set to satisfy Hc2/Hc1≤0.8 (that is, the perpendicular orientation of the magnetic powder is enhanced), there is a possibility that it is impossible to attain further excellent electromagnetic conversion characteristics.

While a lower limit of Hc2/Hc1 is not limited to a specific value, the lower limit is set to satisfy, for example, 0.5≤Hc2/Hc1. It is noted that Hc2/Hc1 represents the perpendicular orientation of the magnetic powder and lower Hc2/Hc1 indicates higher perpendicular orientation of the magnetic powder.

A method of calculating the coercive force Hc2 of the magnetic layer 43 in the longitudinal direction is described above. The coercive force Hc1 of the magnetic layer 43 in the perpendicular direction is obtained similarly to the coercive force Hc2 of the magnetic layer 43 in the longitudinal direction except that the M-H loops are measured in the perpendicular direction (thickness direction) of the magnetic tape MT and the substrate 41.

(Activation Volume $V_{act}$)

An activation volume $V_{act}$ is preferably equal to or smaller than 8,000 nm$^3$, more preferably equal to or smaller than 6,000 nm$^3$, further more preferably equal to or smaller than 5,000 nm$^3$, particularly preferably equal to or smaller than 4,000 nm$^3$, most preferably equal to or smaller than 3,000 nm$^3$. If the activation volume $V_{act}$ is equal to or smaller than 8,000 nm$^3$, the magnetic powder turns into a favorable dispersion state; thus, it is possible to make a bit inversion region sharp, and suppress degradation in a magnetization signal recorded in an adjacent track due to leakage magnetic field from the recording head. This possibly prohibits further excellent electromagnetic conversion characteristics from being attained.

The activation volume $V_{act}$ is obtained by the following Equation derived by Street & Woolley.

$$V_{act}\,(\text{nm}^3)=k_B\times T\times X_{irr}/(\mu_0\times Ms\times S)$$

(where $k_B$: Boltzmann constant (1.38×10$^{-23}$ J/K), T: temperature (K), $X_{irr}$: irreversible magnetic susceptibility, $\mu_0$: magnetic permeability in a vacuum, S: magnetic viscosity coefficient, Ms: saturation magnetization (emu/cm$^3$))

The irreversible magnetic susceptibility $X_{irr}$, the saturation magnetization Ms, and the magnetic viscosity coefficient S substituted into Equation are obtained using the VSM as follows. It is assumed that a measurement direction by the VSM is the thickness direction (perpendicular direction) of the magnetic tape MT. It is also assumed that the measurement sample cut from the long magnetic tape MT is measured by the VSM at 25° C. It is further assumed that "demagnetizing field correction" is not performed at the time of measuring the M-H loop in the thickness direction (perpendicular direction) of the magnetic tape MT.

(Irreversible Magnetic Susceptibility $X_{irr}$)

The irreversible magnetic susceptibility $X_{irr}$ is defined as an inclination near a residual coercive force Hr out of inclinations of a residual magnetization curve (DCD curve). First, a magnetic field of −1,193 kA/m (15 kOe) is applied to the entire magnetic tape MT, a magnetic field of the entire magnetic tape MT is returned to zero, and the magnetic tape MT is turned into a residual magnetization state. A magnetic field of approximately 15.9 kA/m (200 Oe) is applied again to the magnetic tape MT in an opposite direction, the magnetic field of the magnetic tape MT is returned again to zero, and an amount of residual magnetization is measured. Subsequently, measurement by similarly applying a magnetic field higher than the previous applied magnetic field by 15.9 kA/m to the magnetic tape MT and returning the magnetic field to zero is repeatedly performed, amounts of residual magnetization are plotted with respect to the applied magnetic fields, and the DCD curve is measured. A point at which the amount of magnetization is zero on the obtained DCD curve is determined as the residual coercive force Hr, the DCD curve is differentiated, and an inclination of the DCD curve for each magnetic field is obtained. Among the inclinations of the DCD curve, the inclination near the residual coercive force Hr corresponds to $X_{irr}$.

(Saturation Magnetization Ms)

First, similarly to the method of measuring the squareness ratio S1 described above, the background-corrected M-H loop is obtained. Next, Ms (emu/cm$^3$) is calculated from a value of saturation magnetization Ms (emu) of the obtained M-H loop and a volume (cm$^3$) of the magnetic layer 43 in the measurement sample. It is noted that the volume of the magnetic layer 43 is obtained by multiplying an area of the measurement sample by the average thickness $t_m$ of the magnetic layer 43. The method of calculating the average thickness $t_m$ of the magnetic layer 43 necessary to calculate the volume of the magnetic layer 43 is already described above.

(Magnetic Viscosity Coefficient S)

First, a magnetic field of −1,193 kA/m (15 kOe) is applied to the entire magnetic tape MT (measurement sample), the magnetic field of the magnetic tape MT is returned to zero, and the magnetic tape MT is turned into the residual magnetization state. Subsequently, a magnetic field equivalent to a value of the residual coercive force Hr obtained by the DCD curve is applied to the magnetic tape MT in the opposite direction. The amount of magnetization is measured continuously at constant time intervals for 1,000 seconds in a state of applying the magnetic field to the magnetic tape MT. The magnetic viscosity coefficient S is calculated by checking a relation between time t and the amount of magnetization M(t) obtained in this way with the following Equation.

$$M(t)=M0+S\times\ln(t)$$

(where M(t): amount of magnetization at time t, M0: initial amount of magnetization, S: magnetic viscosity coefficient, ln(t): natural logarithm of time)

(Surface Roughness $R_b$ of Back Surface)

A surface roughness $R_b$ of a back surface (surface roughness of the back layer 44) preferably satisfies $R_b \leq 6.0$ [nm]. If the surface roughness $R_b$ of the back surface is in the range, it is possible to attain further excellent electromagnetic conversion characteristics.

The surface roughness $R_b$ of the back surface is obtained as follows. First, a magnetic tape MT at a width of 12.65 mm is prepared, cut by a length of 100 mm, and a sample is produced. Next, the sample is put on a slide glass such that a surface to be measured (magnetic layer-side surface) of the sample faces up, and an end portion of the sample is fixed by a mending tape. A surface shape is measured using VertScan (objective lens of 50× magnification), and the surface roughness $R_b$ of the back surface is obtained on the basis of ISO 25178 Standards from the following Equation.

Device: a noncontact roughness meter using light interference (noncontact surface/layered cross sectional shape measurement system VertScan R5500GL-M100-AC manufactured by Ryoka Systems Inc.)

Objective lens: 20× magnification

Measurement field: 640×480 pixels (visual field: approximately 237 µm×178 µm visual field)

Measurement mode: phase

Wavelength filter: 520 nm

CCD: ⅓ lens

Noise removal filter: smoothing 3×3

Surface correction: correction based on approximation surface to quadratic polynomial equation Measurement software: VS-Measure Version 5.5.2

Analysis software: VS-viewer Version 5.5.5

$$S_a = \frac{1}{A}\int\int_A |Z(x, y)| dx dy \quad \text{[Math. 2]}$$

Meaning of symbols in Equation 2 are as follows.

A: Number of samples x: Lateral direction of sample y: Longitudinal direction of sample z: Height After surface roughnesses at positions of at least five or more points in the longitudinal direction are measured, An average value of arithmetic average roughnesses Sa (nm) automatically calculated from surface profiles obtained at the respective points is determined as the surface roughness $R_b$ (nm) of the back surface.

(Young's Modulus of Magnetic Tape in Longitudinal Direction)

A Young's modulus of the magnetic tape MT in the longitudinal direction is preferably equal to or lower than 8.0 GPa, more preferably equal to or lower than 7.9 GPa, further more preferably equal to or lower than 7.5 GPa, particularly preferably equal to or lower than 7.1 GPa. If the Young's modulus of the magnetic tape MT in the longitudinal direction is equal to or lower than 8.0 GPa, the elasticity of the magnetic tape MT is further increased by the external force and it is, therefore, easier to adjust the width of the magnetic tape MT by the tension adjustment. Therefore, it is possible to suppress offtrack errors more appropriately and reproduce the data recorded in the magnetic tape MT more accurately.

The Young's modulus of the magnetic tape MT in the longitudinal direction is a value that indicates difficulty to expand and contract the magnetic tape MT in the longitudinal direction by the external force. As this value is higher, the magnetic tape MT is more difficult to expand and contract in the longitudinal direction by the external force. As this value is lower, the magnetic tape MT is easier to expand and contract in the longitudinal direction by the external force.

While the Young's modulus of the magnetic tape MT in the longitudinal direction is a value related to the longitudinal direction of the magnetic tape MT, the Young's modulus also has a correlation with difficulty to expand and contract the magnetic tape MT in the width direction. In other words, as this value is higher, the magnetic tape MT is more difficult to expand and contract in the width direction by the external force. As this value is lower, the magnetic tape MT is easier to expand and contract in the width direction by the external force. From the viewpoint of the tension adjustment, it is more advantageous to set the Young's modulus of the magnetic tape MT in the longitudinal direction.

A tension tester (AG-100D manufactured by Shimadzu Corporation) is used to measure the Young's modulus. In a case in which the Young's modulus of a tape in the longitudinal direction is to be measured, the tape is cut by a length of 180 mm and a measurement sample is prepared. A jig that can make a width (½) of the tap fixed is mounted to the tension tester and upper and lower limits of the tape width are made fixed. A distance (tape length between tools of a chuck) is set to 100 mm. After the tape sample is chucked, a stress is gradually applied to the tape sample in a direction of pulling the sample. A tensile speed is set to 0.1 mm/min. The Young's modulus is calculated from a change in stress and an elongation amount at this time using the following Equation.

$$E(N/m^2) = ((\Delta N/S)/(\Delta x/L)) \times 10^6$$

ΔN: Change in stress (N)

S: Cross-sectional area of test piece (mm²)

Δx: Elongation amount (mm)

L: Distance between grip jigs (mm)

A stress range is set to a range from 0.5 N to 1.0 N, and the stress change (ΔN) and the elongation amount (Δx) at this time are used in calculation.

(Young's Modulus of Substrate in Longitudinal Direction)

A Young's modulus of the substrate 41 in the longitudinal direction is preferably equal to or lower than 7.5 GPa, more preferably equal to or lower than 7.4 GPa, further more preferably equal to or lower than 7.0 GPa, particularly preferably equal to or lower than 6.6 GPa. If the Young's modulus of the substrate 41 in the longitudinal direction is equal to or lower than 7.5 GPa, the elasticity of the magnetic tape MT is further increased by the external force and it is, therefore, easier to adjust the width of the magnetic tape MT by the tension adjustment. Therefore, it is possible to suppress offtrack errors more appropriately and reproduce the data recorded in the magnetic tape MT more accurately.

The Young's modulus of the substrate 41 in the longitudinal direction is obtained as follows. First, the foundation layer 42, the magnetic layer 43, and the back layer 44 are removed from the magnetic tape MT, and the substrate 41 is obtained. Using this substrate 41, the Young's modulus of the substrate 41 in the longitudinal direction is obtained in similar procedures to those of obtaining the Young's modulus of the magnetic tape MT in the longitudinal direction described above.

A thickness of the substrate 41 accounts for more than half of the thickness of the entire magnetic tape MT. Owing to this, the Young's modulus of the substrate 41 in the longitudinal direction has a correlation with the difficulty to expand and contract the magnetic tape MT by the external force. As this value is higher, the magnetic tape MT is more difficult to expand and contract in the width direction by the external force. As this value is lower, the magnetic tape MT is easier to expand and contract in the width direction by the external force.

While the Young's modulus of the substrate 41 in the longitudinal direction is a value related to the longitudinal direction of the magnetic tape MT, the Young's modulus also has a correlation with difficulty to expand and contract the magnetic tape MT in the width direction. In other words, as this value is higher, the magnetic tape MT is more difficult to expand and contract in the width direction by the external force. As this value is lower, the magnetic tape MT is easier to expand and contract in the width direction by the external force. From the viewpoint of the tension adjustment, therefore, it is more advantageous that the Young's modulus of the substrate 41 is lower in the longitudinal direction.

(Recessed Portions on Surface of Magnetic Layer)

As depicted in FIG. 4B, the plurality of recessed portions 43A includes a plurality of recessed portions 43B each having a depth corresponding to 20% or higher of the average thickness $t_m$ of the magnetic layer 43. Air escapes into the plurality of recessed portions 43B at the time of running the magnetic tape MT by causing the plurality of recessed portions 43A to include the plurality of recessed portions 43B; thus, it is possible to make shorter a distance between the surface of the magnetic tape MT and the head.

The number of recessed portions 43B per unit area 1,600 $\mu m^2$ of the surface of the magnetic layer 43 is equal to or greater than 20 and equal to or smaller than 200, preferably equal to or greater than 40 and equal to or smaller than 200, more preferably equal to or greater than 80 and equal to or smaller than 180. If the number of the recessed portions 43B is smaller than 20, it is impossible to stably keep the air between the head and the magnetic tape MT at the time of running the magnetic tape MT, which makes it impossible to stably keep the distance between the head and the magnetic tape MT. As a result, the electromagnetic conversion characteristics degrade. On the other hand, if the number of the recessed portions 43B exceeds 200, the head excessively, closely adheres to the magnetic tape MT at the time of running the magnetic tape MT; thus, the dynamic friction coefficient between the head and the magnetic tape MT rises. The number of the recessed portions 43B per unit area 1,600 $\mu m^2$ of the surface of the magnetic layer 43 is sometimes simply referred to as "number of the recessed portions 43B per unit area" hereinafter.

The number of recessed portions 43B per unit area is obtained as follows. The surface of the magnetic layer 43 is observed by an AFM and an AFM image of 40 $\mu m \times 40$ $\mu m$ is obtained. Measurement is performed using Dimension3100, NanoScope IIIa manufactured by Digital Instruments Corporation as the AFM as well as analysis software therefor and using a cantilever including a silicon single crystal (Note 1) at a tapping frequency turned to 200 to 400 Hz. Next, the AFM image is divided into images of 512×512 (=262,144) measurement points, heights Z(i) (i: measurement point number, i=1 to 262,144) are measured at the measurement points, and the measured heights Z(i) of the measurement points are simply averaged (arithmetically averaged), thereby obtaining an average height (reference plane) $Z_{ave}$ (=(Z(1)+Z(2)+ ... +Z(262,144))/262,144). At this time, the images subjected to a filtering process performed as an image process by Flatten order 2 and planefit order 3 XY are used as data.

Figure 9:
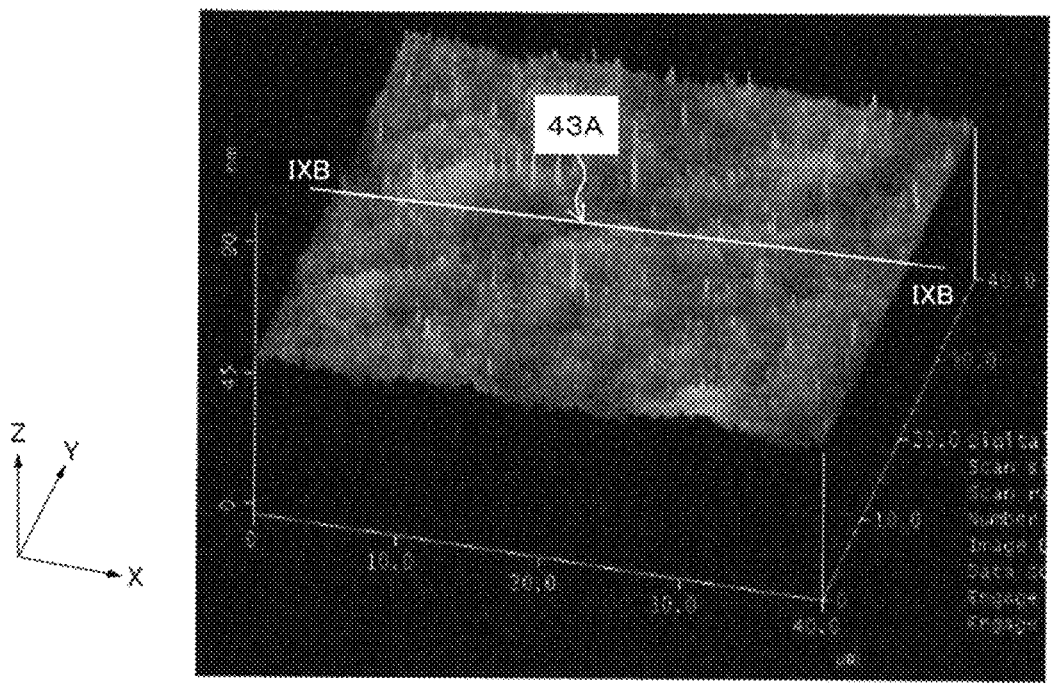
FIG. 9A is an explanatory diagram of a method of measuring the number of recessed portions.
FIG. 9B is a cross-sectional view taken along a line IXB-IXB of FIG. 9A.
Figure 9:
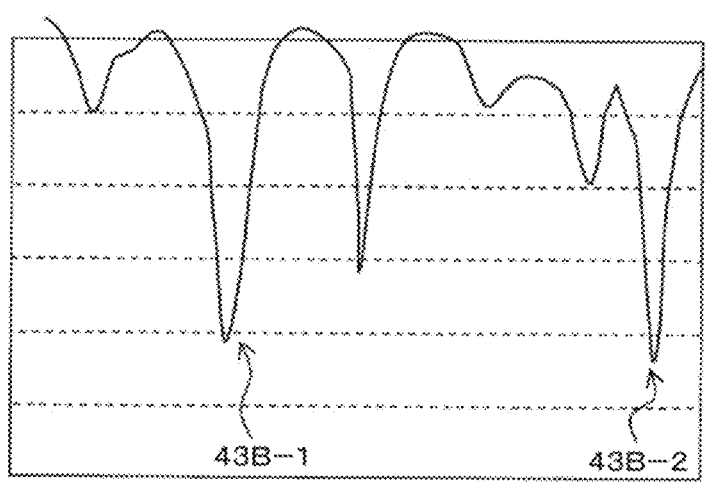
Figure 10:
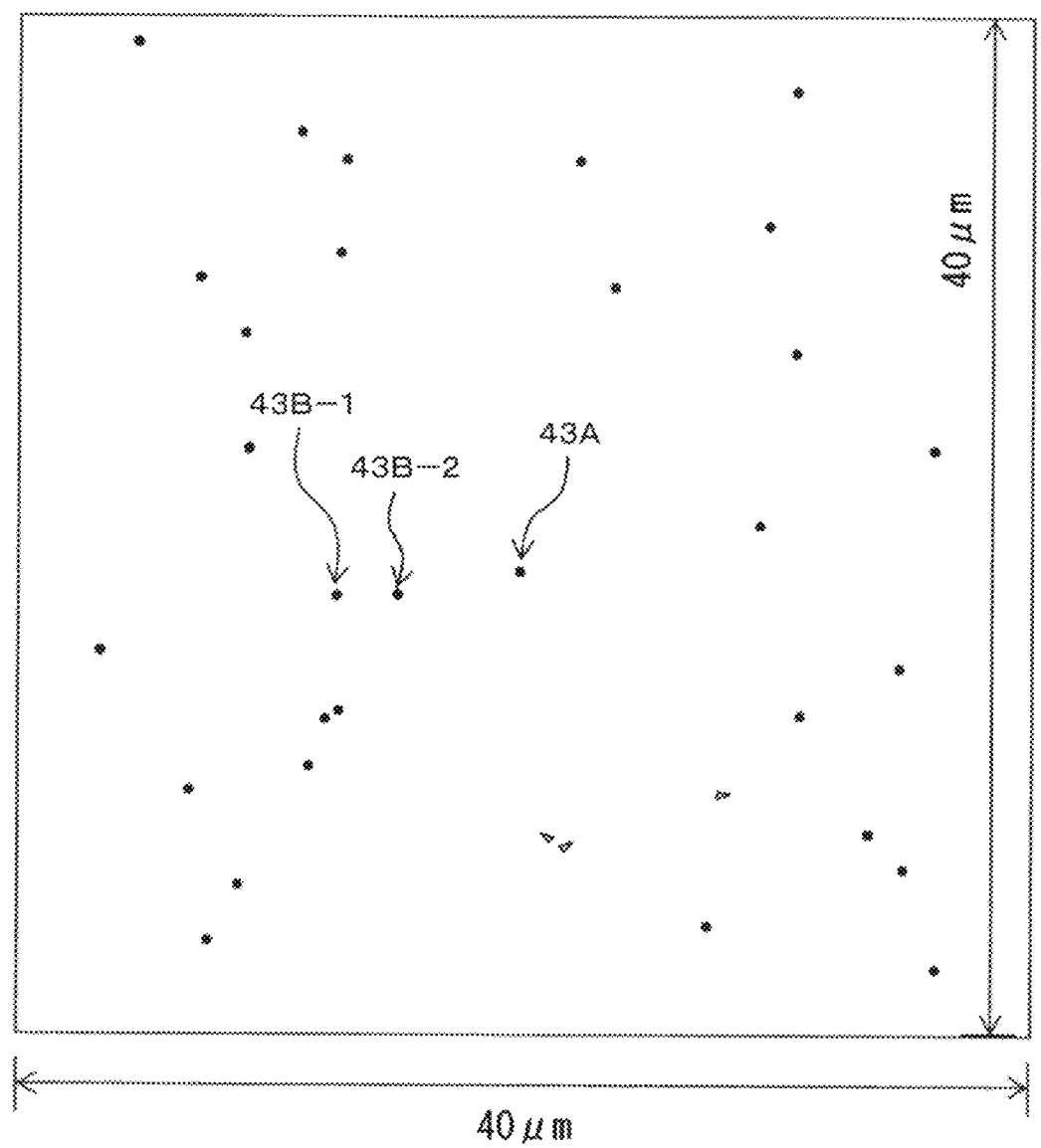
FIG. 10 is an explanatory diagram of the method of measuring the number of recessed portions.

(Note 1) SPM probe manufactured by NanoWorld AG, NCH normal type, PointProbe L (cantilever length)=125 $\mu m$ FIG. 9A is an example of the observed enlarged surface of the magnetic layer 43. In FIG. 9A, an XY plane is a region in a direction in which the surface of the magnetic layer 43 spreads and having a surface area of, for example, 40 $\mu m \times 40$ $\mu m$=1,600 $\mu m^2$. In addition, in FIG. 9A, a Z-axis represents a depth of the recessed portions 43A. The number of the recessed portions 43A having the depth from a reference plane corresponding to 20% or higher of the average thickness (for example, 70 nm) of the magnetic layer 43 is counted in the region having the surface area of 40 $\mu m \times 40$ $\mu m$=1,600 $\mu m^2$. FIG. 9B typically illustrates a distribution of the plurality of recessed portions 43A in the region having the surface area of 1,600 $\mu m^2$ depicted in FIG. 9A. Specifically, FIG. 9B represents part of a cross-section taken along a cutting-plane line IXB-IXB of FIG. 9A. In FIG. 9B, a vertical axis corresponds to the depth of the recessed portions 43A along the Z-axis, specifically represents a rate [%] of the depth of the recessed portions 43A with respect to the average thickness (for example, 70 nm) of the magnetic layer 43. In the cross-section of FIG. 9B, the recessed portions 43B having the depth corresponding to 20% or higher of the average thickness (for example, 70 nm) of the magnetic layer 43 are recessed portions 43B-1 and 43B-2, and the number of the recessed portions 43B is two. FIG. 10 typically illustrates a distribution of a plurality of recessed portions 43A in the region having the surface area of 1,600 $\mu m^2$ depicted in FIG. 9A. In the example depicted in FIG. 9, the number of the recessed portions 43B each having the depth corresponding to 20% or higher of the average thickness (for example, 70 nm) of the magnetic layer 43 is 33. It is noted that recessed portions 43A depicted in FIG. 10 correspond to the recessed portions 43A depicted in FIG. 9A, and recessed portions 43B-1 and 43B-2 depicted in FIG. 10 correspond to the recessed portions 43B-1 and 43B-2 depicted in FIG. 9B. It is noted that the method of calculating the average thickness $t_m$ of the magnetic layer 43 is already described above.

(Amount of Exudation of Lubricant)

An amount of exudation (exudation area) of the lubricant per unit region of 12.5 $\mu m \times 9.3$ $\mu m$ on the surface of the magnetic layer 43 in a vacuum is equal to or greater than 3.0 $\mu m^2$ and equal to or smaller than 6.5 $\mu m^2$, preferably equal to or greater than 3.5 $\mu m^2$ and equal to or smaller than 6.5 $\mu m^2$. The amount of exudation of the lubricant on the surface of the magnetic layer 43 in a vacuum corresponds to an amount of the lubricant by which the lubricant can be supplied at the time of running the magnetic tape MT. If the amount of exudation (area) of the lubricant is smaller than 3.0 $\mu m^2$, the amount of the lubricant present on the surface of the magnetic layer 43 is extremely small; thus, the dynamic friction coefficient increases when repeated recording or reproducing is performed. On the other hand, if the amount of exudation (area) of the lubricant exceeds 6.5 $\mu m^2$, the amount of the lubricant present on the surface of the magnetic layer 43 is excessively large; thus, a surface portion of the magnetic layer 43 is plasticized by the lubricant and the surface of the magnetic layer 43 turns into a state in which a hardness has been reduced. Therefore, the head is excessively, closely attached to the magnetic tape MT at the time of running the magnetic tape MT and the dynamic friction coefficient increases. The amount of exudation of the lubricant per unit region of 12.5 $\mu m \times 9.3$ $\mu m$ on the surface of the magnetic layer 43 in a vacuum is sometimes simply referred to as "amount of exudation of the lubricant" hereinafter.

The amount of exudation (area) of the lubricant is obtained as follows. First, the magnetic tape MT at the width of ½ inch is cut by five centimeters, the cut magnetic tape MT is bonded onto a slide glass, and the slide glass is installed in an MSP-1S type magnetron sputtering device manufactured by SHINKU DEVICE KK. The magnetic tape MT is bonded onto the slide glass with the surface of the magnetic layer 43 up. Next, an internal pressure of the sputtering device is reduced down to 4 Pa. Subsequently, a target (Θ of 51 mm, thickness of 0.1 mm, material of Pt—Pd) manufactured by SHINKU DEVICE KK is sputtered for six seconds, thereby forming a Pt—Pd alloy on the surface of the magnetic layer 43 (magnetic surface). A sputtering film is difficult to form in a part where the lubricant is present, while a sputtering film is easy to form in a part where the lubricant is not present. Owing to this, an uneven distribution is generated between the part where the lubricant is present and the part where the lubricant is not present. Next, the surface of this magnetic layer 43 is observed by a Scanning Electron Microscope (SEM) on the following conditions, and a Tif file (1,260×960 pixels) of an SEM image (black-and-white gray image) of the observed surface is obtained. It is noted that portions that appear black correspond to those where the lubricant is present in the SEM image.

Device: S-4800 manufactured by Hitachi High-Technologies Corporation

Accelerating voltage: 5 kV

Magnification: 10,000×

Figure 11:
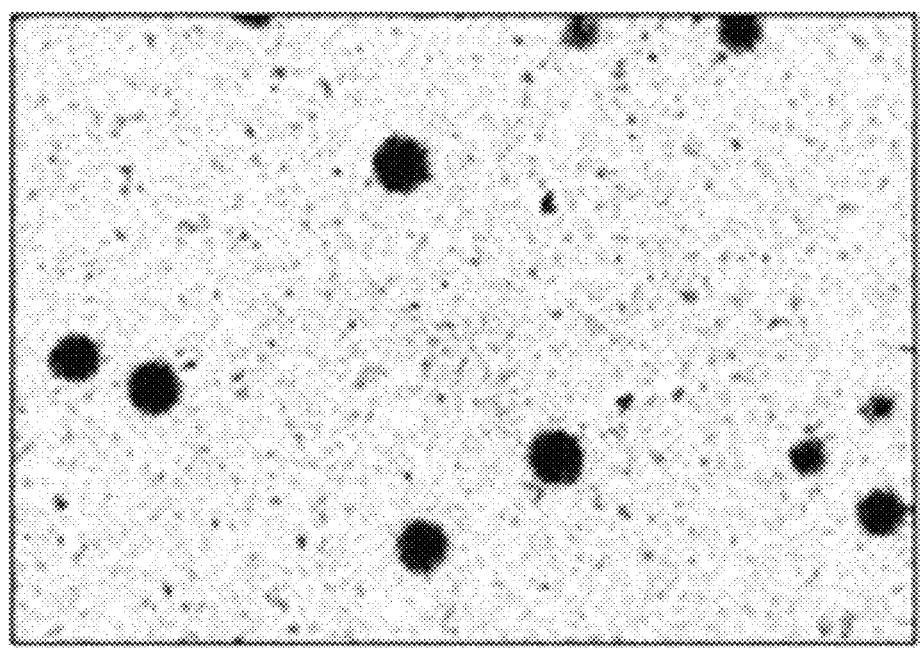
FIGS. 11A and 11B are diagrams for explaining a method of measuring an amount of exudation of a lubricant.
Figure 11:
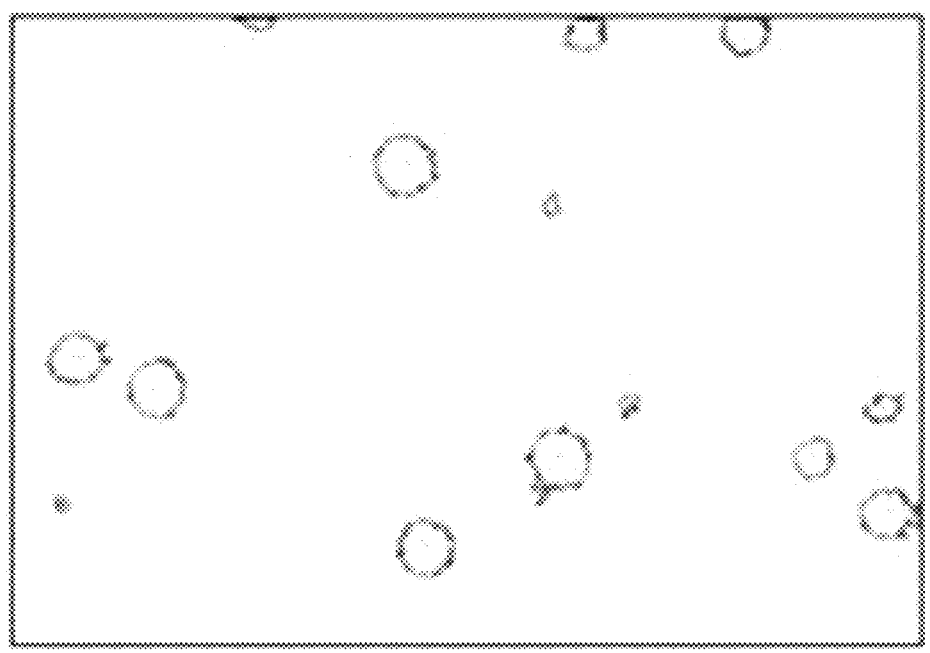

Next, the amount of exudation (area) of the lubricant is obtained from the SEM image (Tif file) of the unit region of 12.5 μm×9.3 μm obtained using image analysis software (ImageJ) as follows. First, the obtained SEM image is subjected to scaling (scaling setting conditions: distance=504, known=5, pixel=1, unit=um (micrometer)). Next, the SEM image (black-and-white gray image) after scaling is divided into images at 256 gray levels, and the SEM image is digitized with a 70th gray level set as a threshold. Specifically, if a pixel has a gray level equal to or lower than the 70th gray level, the pixel is determined as "black," and if the pixel has a gray level higher than the 70th gray level, the pixel is determined as "white." FIG. 11A depicts an example of the digitized SEM image. Portions displayed as "black" as a result of digitization correspond to the portions where the lubricant is present on the surface of the magnetic layer 43.

Next, a gross area of dots (black parts) each having an area equal to or greater than 0.02 μm² is obtained from the digitize SEM image by Analyze Particles (particle analysis) of ImageJ. Dots each having an area smaller than 0.02 μm² are excluded for the following reasons. The dots each having an area smaller than 0.02 μm² are possibly particles of carbon black or the like. In addition, even if the dots each having an area smaller than 0.02 μm² are the lubricant, the dots have less influence on a running performance. FIG. 11B depicts an example of outline images of dots each having an area smaller than 0.02 μm².

Details of setting of Analyze Particles are as follows.

Size: 0.02-Infinity

Show: Outlines

The gross areas are calculated in three locations selected at random from the slide glass, and calculation results are simply averaged (arithmetically averaged) to be determined as the amount of exudation of the lubricant.

(Arithmetic Average Roughness of Surface of Magnetic Layer)

An arithmetic average roughness Ra of the surface of the magnetic layer 43 is equal to or lower than 2.5 nm, preferably equal to or lower than 2.2 nm, more preferably equal to or lower than 1.9 nm. If the arithmetic average roughness Ra is equal to or lower than 2.5 nm, it is possible to suppress a reduction in output due to a spacing loss; thus, it is possible to attain excellent electromagnetic conversion characteristics. A lower limit of the arithmetic average roughness Ra of the surface of the magnetic layer 43 is preferably equal to or higher than 1.0 nm, more preferably equal to or higher than 1.2 nm, further more preferably equal to or higher than 1.4 nm. If the lower limit of the arithmetic average roughness Ra of the surface of the magnetic layer 43 is equal to or higher than 1.0 nm, it is possible to suppress a reduction in the running performance due to an increase in friction.

The arithmetic average roughness Ra is obtained as follows. First, the surface of the magnetic layer 43 is observed by the AFM (Atom Force Microscope), and an AFM image of 40 μm×40 μm is obtained. Measurement is performed using NanoScope IIIa D3100 manufactured by Digital Instruments Corporation as the AFM and using a cantilever including a silicon single crystal (Note 1) at the tapping frequency turned to 200 to 400 Hz. Next, the AFM image is divided into images of 512×512 (=262,144) measurement points, the heights Z(i) (i: measurement point number, i=1 to 262,144) are measured at the measurement points, and the measured heights Z(i) of the measurement points are simply averaged (arithmetically averaged), thereby obtaining the average height (average plane) $Z_{ave}$ (=(Z(1)+Z(2)+ . . . +Z(262,144))/262,144). Subsequently, deviations Z"(i) (=Z(i)–$Z_{ave}$) of the measurement points from an average center line are obtained, and the arithmetic average roughness Ra [nm] (=(Z"(1)+Z"(2)+ . . . +Z"(262,144))/262,144) is calculated. At this time, the images subjected to the filtering process performed as the image process by Flatten order2 and planefit order 3 XY are used as data.

(Note 1) SPM probe manufactured by Nano World AG, NCH normal type, PointProbe L (cantilever length)=125 μm [0163]

(Friction Coefficient)

A friction coefficient ratio ($\mu_B/\mu_A$) of a dynamic friction coefficient $\mu_B$ after performing full recording/full reproducing twice to a dynamic friction coefficient $\mu_A$ before performing the full recording/full reproducing is preferably lower than 2.0, more preferably equal to or lower than 1.5, further more preferably equal to or lower than 1.3, particularly preferably equal to or lower than 1.1. If the friction coefficient ratio ($\mu_B/\mu_A$) is lower than 2.0, it is possible to suppress occurrence of data write/read failures due to pasting or running instability during recording/reproducing third and following times. "Full recording/full reproducing" means herein continuously writing data of as much as an uncompressed maximum capacity (for example, six TB in the case of LTO7) of the cartridge 10 and reproducing all written information. It is assumed to use a drive corresponding to the magnetic tape MT as the magnetic head 56 for the "full recording/full reproducing." It is also assumed that "full recording/full reproducing" is performed at a room temperature.

Figure 12:
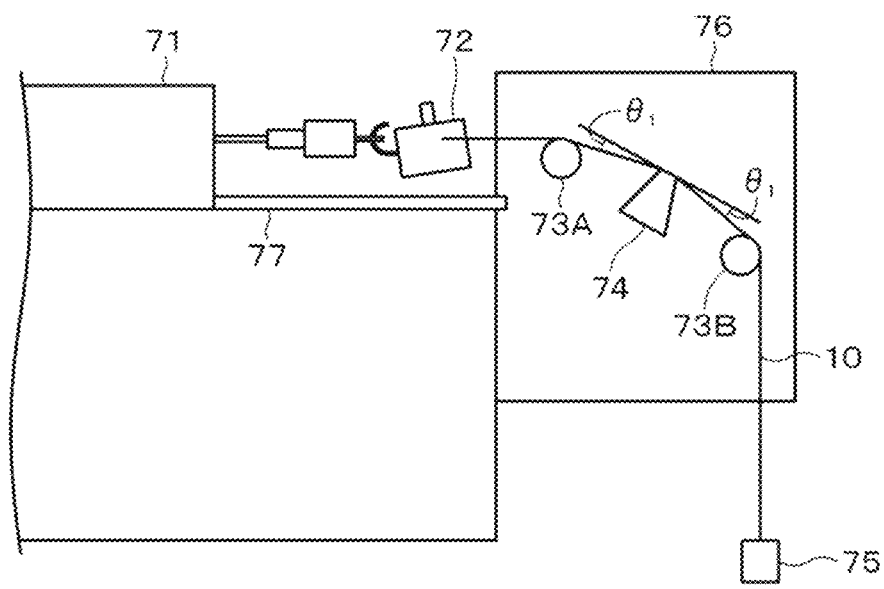
FIGS. 12A and 12B are schematic diagrams for explaining a method of measuring a friction coefficient between a magnetic surface and a magnetic head.
Figure 12:
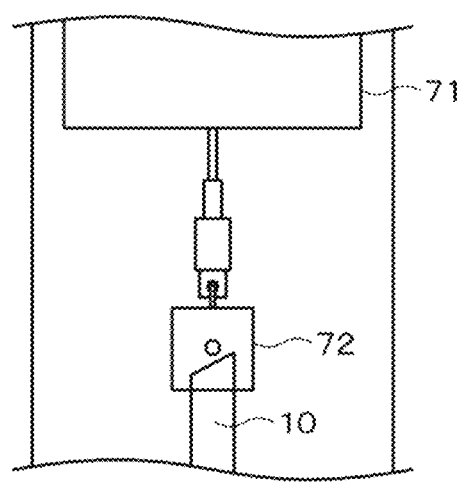

The friction coefficient ratio ($\mu_B/\mu_A$) is obtained as follows. First, after full recording/full reproducing is performed on the magnetic tape MT twice, the magnetic tape MT at the width of ½ inch is unwound from the cartridge 10. It is assumed that a part of 2 meters from a connection portion between a reader tape part and the magnetic tape MT is "part before performing full recording/full reproducing twice" (hereinafter, referred to as "non-recording/non-reproducing part"). It is also assumed that a part of 50 meters from the connection portion between the reader tape part and the magnetic tape MT is "part having been subjected to full recording/full reproducing twice" (hereinafter, referred to as "recording/reproducing part"). Next, as depicted in FIG. 12A, the unrecorded/not reproduced part of the magnetic tape MT is placed on two columnar guide rolls 73A and 73B disposed apart from each other in parallel to each other and each having a diameter of one inch in such a manner that the magnetic surface comes in contact with the guide rolls 73A and 73B. The two guide rolls 73A and 73B are fixed to a hard plate member 76 and a positional relation between the two guide rolls 73A and 73B is thereby made fixed.

Next, the magnetic tape MT is brought into contact with a head block (for recording/reproducing) 74 mounted on the LTO5 drive in such a manner that the magnetic surface comes in contact with the head block 74 and a wrap angle θ1 (°) is equal to 5.6°. The head block 74 is disposed substantially at an intermediate between the guide rolls 73A and 73B. The head block 74 is movably mounted to the plate member 76 such that the wrap angle θ1 can be changed. At the wrap angle θ1 (°) equal to 5.6°, a position of the head block 74 is fixed to the plate member 76 and a positional relation between the guide rolls 73A and 73B and the head block 74 is thereby made fixed.

One end of the magnetic tape MT is coupled to a movable strain gauge 71 via a jig 72. As depicted in FIG. 12B, the magnetic tape MT is fixed to the jig 72. The other end of the magnetic tape MT is coupled to a weight 75. The weight 75 applies a tension of 0.6N ($T_0$ [N]) to the magnetic tape MT in the longitudinal direction. The movable strain gauge 71 is fixed onto a stand 77. A positional relation between the stand 77 and the plate member 76 is also fixed; thus, a positional relation among the guide rolls 73A and 73B, the head block 74, and the movable strain gauge 71 is made fixed.

The movable strain gauge 71 slides the magnetic tape MT on the head block 74 by 60 mm toward the movable strain gauge 71 (outward path) and slides the magnetic tape MT by 60 mm to be away from the movable strain gauge (homeward path) at 10 mm/s. An output value (voltage) of the movable strain gauge 71 at a time of sliding is converted into a load T [N] on the basis of a linear relation (to be described later) between the output value and the load acquired in advance. The load T [N] is acquired 13 times since sliding start to sliding stop of sliding by 60 mm described above and 11 loads T [N] except for a total of two loads, that is, the first and last loads are simply averaged, thereby obtaining $T_{ave}$ [N]. Subsequently, the dynamic friction coefficient $\mu_A$ is obtained by the following Equation.

$$\mu_A = \frac{1}{(\theta_1[°]) \times (\pi/180)} \times \ln\left(\frac{T_{ave}[N]}{T_a[N]}\right) \qquad [\text{Math. 3}]$$

The linear relation is obtained as follows. In other words, the output values (voltages) of the movable strain gauge 71 are obtained for a case of applying a load of 0.5 N to the movable strain gauge 71 and a case of applying a load of 1.0 N thereto. The linear relation between the output value and the load is obtained from the obtained two output values and the obtained two loads. Using the linear relation, the output value (voltage) by the movable strain gauge 71 at the time of sliding is converted into T [N].

Next, a dynamic friction coefficient $\mu_B$ is obtained from the recording/reproducing part of the magnetic tape MT in similar procedures to those for obtaining the dynamic friction coefficient $\mu_A$ from the non-recording/non-reproducing part of the magnetic tape MT.

The friction coefficient ratio ($\mu_B/\mu_A$) is calculated from the dynamic friction coefficients $\mu_A$ and $\mu_B$ obtained as described above.

(Product Between Rate of Amount of Magnetization and Squareness Ratio)

Before part of the magnetic layer 43 is magnetized in a first direction containing a perpendicular component perpendicular to an upper surface of the magnetic layer 43 to record a servo signal and the servo signal is recorded in the magnetic tape MT, the magnetic layer 43 may be magnetized in a second direction opposite to the first direction containing the perpendicular component. The magnetic tape MT in which the servo signal is recorded is preferably configured such that an absolute value of a product between a rate of an amount of magnetization in the perpendicular direction when a maximum value of the amount of magnetization by which the amount of magnetization is measured by rotating the magnetic tape MT and the squareness ratio of the magnetic layer in the longitudinal direction parallel to the upper surface is equal to or greater than 500 and equal to or smaller than 2,500. It is thereby possible to obtain a reproduced waveform of a servo signal having favorable symmetry.

[Method of Manufacturing Magnetic Tape]

An example of a method of manufacturing the magnetic tape MT configured as described above will next be described.

(Coating Preparation Process)

First, a foundation layer forming coating is prepared by kneading and dispersing the non-magnetic powder, the binder, and the like into a solvent. Next, a magnetic layer forming coating is prepared by kneading and dispersing the magnetic powder, the binder, and the like into a solvent. To prepare the magnetic layer forming coating and the foundation layer forming coating, the following solvents, a dispersing device, and a kneading device, for example, can be used.

Examples of the solvent for use in preparing the coatings include ketone solvents such as acetate, methyl ethyl ketone, methyl isobutyl ketone, and cyclohexanone, alcohol solvents such as methanol, ethanol, and propanol, ester-based solvents such as methyl acetate, ethyl acetate, butyl acetate, propanol acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These solvents may be used solely or mixed as appropriate.

While examples of the kneading device for use in preparation of coatings include a continuous biaxial kneader, a continuous biaxial kneader capable of multistep dilution, and a kneading device such as a kneader, a pressurized kneader, and a roll kneader, the kneading device is not limited to a specific one of these devices. Furthermore, while examples of the dispersing device for use in preparation of coatings include dispersing devices such as a roll mill, a ball mill, a horizontal sand mill, a vertical sand mill, a spike mill, a pin mill, a tower mill, a pearl mill (for example, "DCP mill" manufactured by Maschinenfabrik gustav eirich gmbh & co kg), a homogenizer, and an ultrasonic disperser, the dispersing device is not limited to a specific one of these devices.

(Application Process)

Next, the foundation layer 42 is formed by applying the foundation layer forming coating onto one principal surface of the substrate 41 and drying the foundation layer forming coating. Subsequently, the magnetic layer 43 is formed on the foundation layer 42 by applying the magnetic layer forming coating onto this foundation layer 42 and drying the magnetic layer forming coating. At a time of drying, the magnetic field of the magnetic powder is oriented in the thickness direction of the substrate 41 by, for example, a solenoid coil. Furthermore, at the time of drying, the magnetic field of the magnetic powder may be oriented in the running direction (longitudinal direction) of the substrate 41 by, for example, a solenoid coil and then oriented in the thickness direction of the substrate 41. Performing a process for temporarily orienting the magnetic powder in the longitudinal direction in this way makes it possible to further improve the perpendicular orientation (that is, the squareness ratio S1) of the magnetic powder. After forming the magnetic layer 43, the back layer 44 is formed on the other principal surface of the substrate 41. As a result, the magnetic tape MT is obtained.

The squareness ratios S1 and S2 are set to desired values by adjusting, for example, an intensity of the magnetic field applied to a coated film with the magnetic layer forming coating, a concentration of a solid content in the magnetic layer forming coating, and drying conditions (drying temperature and drying time) of the coated film with the magnetic layer forming coating. The intensity of the magnetic field applied to the coated film is preferably equal to or higher than double and equal to or lower than triple of the coercive force of the magnetic powder. To further enhance the squareness ratio S1 (that is, to further reduce the squareness ratio S2), it is preferable to improve a dispersion state of the magnetic powder in the magnetic layer forming coating. To further enhance the squareness ratio S1, it is also effective to magnetize the magnetic powder in a step before the magnetic layer forming coating is put into an orientation device for orienting the magnetic field of the magnetic powder. It is noted that a sole method of adjusting the squareness ratios S1 and S2 may be used or a combination of two or more methods may be used.

The amount of exudation of the lubricant can be set to a specified value by adjusting the drying temperature of the coated film with the magnetic layer forming coating. To set the amount of exudation of the lubricant to be equal to or greater than 3.0 μm² and equal to or smaller than 6.5 μm², it is preferable that the drying temperature is in a range equal to or higher than 60° C. and equal to or lower than 120° C. and that the drying time is equal to or longer than five seconds and equal to or shorter than 30 seconds. It is noted that the amount of exudation of the lubricant tends to increase in proportion to an increase in the drying temperature. In addition, the amount of exudation of the lubricant tends to increase in proportion to an increase in the drying time.

(Calendar Process)

Next, a calendar treatment is performed on the obtained magnetic tape MT to smooth the surface of the magnetic layer 43.

(Transfer Process)

Next, the magnetic tape MT having been subjected to the calendar treatment is wound up into a roll shape and a heat treatment is then performed on the magnetic tape MT in this state, thereby transferring the plurality of protruding portions 44A on the surface of the back layer 44 to the surface of the magnetic layer 43. The plurality of recessed portions 43A is thereby formed on the surface of the magnetic layer 43.

A heat treatment temperature is preferably equal to or higher than 55° C. and equal to or lower than 75° C. At the heat treatment temperature equal to or higher than 55° C., it is possible to attain a favorable transfer performance. On the other hand, at the heat treatment temperature higher than 75° C., an amount of micropores excessively increases, possibly resulting in an excess of the lubricant on the surface of the magnetic layer 43. It is noted herein that the heat treatment temperature is a temperature in an atmosphere in which the magnetic tape MT is held.

Heat treatment time is preferably equal to or longer than 15 hours and equal to or shorter than 40 hours. If the heat treatment time is equal to or longer than 15 hours, it is possible to attain the favorable transfer performance. On the other hand, if the heat treatment time is equal to or shorter than 40 hours, it is possible to suppress a reduction in productivity.

(Cutting Process)

Next, the magnetic tape MT is cut to have a predetermined width (for example, ½-inch width). As a result, the magnetic tape MT is obtained.

(Demagnetization Process and Servo Pattern Writing Process)

Next, after demagnetizing the magnetic tape MT, a servo pattern may be written to the magnetic tape MT.

(Method of Adjusting Number of Recessed Portions Per Unit Area)

The number of the recessed portions 43B per unit area can be adjusted to a specified value by adjusting heights of the plurality of protruding portions 44A provided on the back layer 44, the number of the protruding portions 44A, and conditions for the calendar treatment. To set the number of the recessed portions 43B per unit area to be equal to or greater than 20 and equal to or smaller than 200, a calendar treatment temperature is preferably equal to or higher than 80° C. and equal to or lower than 130° C., and a calendar treatment pressure is equal to or higher than 70 kg/cm and equal to or lower than 130 kg/cm. The number of recessed portions 43B per unit area tends to decrease in proportion to an increase in the calendar treatment temperature. The number of recessed portions 43B per unit area tends to decrease in proportion to an increase in the calendar treatment pressure.

Heights of the plurality of protruding portions 44A provided on the back layer 44 and the number of the protruding portions 44A can be adjusted by adjusting a content of the non-magnetic powder in the back layer 44 and an average particle size of the non-magnetic powder.

[Configuration of Recording and Reproducing Device]

The recording and reproducing device 50 records and reproduces data in and from the magnetic tape MT configured as described above. The recording and reproducing device 50 is configured to be capable of adjusting the tension applied to the magnetic tape MT in the longitudinal direction. The recording and reproducing device 50 is also configured to be capable of loading the cartridge 10. To facilitate explanation herein, a case in which the recording and reproducing device 50 is configured to be capable of loading one cartridge 10 is described; however, the recording and reproducing device 50 may be configured to be capable of loading a plurality of cartridges 10.

The recording and reproducing device 50 is connected to information processing devices such as servers 61 and personal computers (hereinafter, referred to as "PCs") 62 via the network 60, and is configured to be capable of recording data supplied from these information processing devices in the cartridge 10. In addition, the recording and reproducing device 50 is configured to be capable of reproducing data from the cartridge 10 and supplying the data to these information processing devices in response to requests from these information processing devices. The shortest recording wave length of the recording and reproducing device 50 is preferably equal to or smaller than 96 nm, more preferably equal to or smaller than 88 nm, further more preferably equal to or smaller than 80 nm.

As depicted in FIG. 1, the recording and reproducing device 50 includes a spindle 51, a recording and reproducing device 50-side reel 52, a spindle drive device 53, a reel drive device 54, a plurality of guide rollers 55, the magnetic head (head unit) 56, the reader-writer 57 serving as a communication section, a communication interface (hereinafter, "I/F") 58, and a control device 59.

The spindle 51 is configured in such a manner that the cartridge 10 can be attached to the spindle 51. The servo pattern in the inverted V shape is recorded in the magnetic tape MT as a servo signal. The reel 52 is configured to be capable of fixing a tip end (reader pin 20) of the magnetic tape MT pulled out from the cartridge 10 via a tape loading mechanism (not depicted).

The spindle drive device 53 rotates the spindle 51 in response to an instruction from the control device 59. The reel drive device 54 rotates the reel 52 in response to an instruction from the control device 59. The plurality of guide rollers 55 guides running of the magnetic tape MT such that a tape path formed between the cartridge 10 and the reel 52 has a predetermined relative positional relation with the magnetic head 56.

At a time of recording data in the magnetic tape MT or at a time of reproducing data from the magnetic tape MT, the spindle drive device 53 and the reel drive device 54 drive the spindle 51 and the reel 52 to rotate to run the magnetic tape MT. The running direction of the magnetic tape MT is set to be capable of reciprocating in a forward direction (direction from the cartridge 10 to the reel 52) and a backward direction (direction from the reel 52 to the cartridge 10).

In the present embodiment, it is possible to adjust the tension applied to the magnetic tape MT in the longitudinal direction at the time of recording data or reproducing data by control of the spindle drive device 53 over rotation of the spindle 51 and control of the reel drive device 54 over rotation of the reel 52. It is noted that the tension applied to the magnetic tape MT may be adjusted by control over movement of the guide rollers 55 as an alternative to or in addition to the control over the rotation of the spindle 51 and the reel 52.

The reader-writer 57 is configured to be capable of writing the first information and the second information to the cartridge memory 11 in response to an instruction from the control device 59. In addition, the reader-writer 57 is configured to be capable of reading the first information and the second information from the cartridge memory 11 in response to an instruction from the control device 59. As a communication scheme between the reader-writer 57 and the cartridge memory 11, ISO14443 scheme, for example, is adopted. The second information contains the tension adjustment information. The tension adjustment information is an example of information at the time of recording data.

The control device 59 includes, for example, a control section, a storage section, and a communication section. The control section includes, for example, a Central Processing Unit (CPU), and controls the sections in the recording and reproducing device 50 in accordance with a program stored in the storage section. For example, the control device 59 records a data signal supplied from the information processing device such as any of the servers 61 and the PCs 62 in the magnetic tape MT using the magnetic head 56 in response to a request from the information processing device. Furthermore, the control device 59 reproduces data recorded in the magnetic tape MT using the magnetic head 56 and supplies the data signal to the information processing device such as any of the servers 61 and the PCs 62 in response to a request from the information processing device.

The storage section includes a nonvolatile memory storing therein various data and various programs and a volatile memory used as a work area for the control section. The various programs may be read from a portable recording medium such as an optical disk or a portable storage device such as a semiconductor memory, or may be downloaded from a server device on a network.

The control device 59 reads the servo signals recorded in the two adjacent servo bands SB using the magnetic head 56 at the time of recording data in the magnetic tape MT or reproducing data from the magnetic tape MT. The control device 59 controls a position of the magnetic head 56 such that the magnetic head 56 follows up a servo pattern using the servo signals read from the two servo bands SB.

The control device 59 obtains a distance d1 between the two adjacent servo bands SB (distance in the width direction of the magnetic tape MT) from reproduced waveforms of the servo signals read from the two adjacent servo bands SB at the time of recording data in the magnetic tape MT. The control device 59 then writes the obtained distance to the memory 36 using the reader-writer 57.

The control device 59 obtains a distance d2 between the two adjacent servo bands SB (distance in the width direction of the magnetic tape MT) from reproduced waveforms of the servo signals read from the two adjacent servo bands SB at the time of reproducing data from the magnetic tape MT. In addition, the control device 59 reads the distance d1 between the two adjacent servo bands SB obtained at the time of recording data in the magnetic tape MT from the memory 36 using the reader-writer 57. The control device 59 causes the spindle drive device 53 and the reel drive device 54 to exercise control over the rotation such that a difference Δd between the distance d1 between the servo bands SB obtained at the time of recording data in the magnetic tape MT and the distance d2 between the servo bands SB obtained at the time of reproducing data from the magnetic tape MT falls in a specified range, and adjusts the tension applied to the magnetic tape MT in the longitudinal direction. The control over this tension adjustment is exercised by, for example, feedback control.

The magnetic head 56 is configured to be capable of recording data in the magnetic tape MT in contrast to a command from the control device 59. The magnetic head 56 is also configured to be capable of reproducing data recorded in the magnetic tape MT in response to a command from the control device 59. The magnetic head 56 has, for example, the two servo read heads 56A and 56B and a plurality of data write/read heads.

The servo read heads 56A and 56B are each configured to be capable of reproducing the servo signal recorded in the magnetic tape MT by reading a magnetic field generated from the servo signal by a Magneto Resistive (MR) element or the like. An interval between the two servo read heads 56A and 56B in the width direction is set substantially identical to the distance between the two adjacent servo bands SB.

The data write/read heads are disposed at positions held between the two servo read heads 56A and 56B equidistantly along a direction from one of the servo read heads 56A and 56B to the other servo read head 56A or 56B. The data write/read heads are each configured to be capable of recording data in the magnetic tape MT by a magnetic field generated from a magnetic gap. The data write/read heads are also each configured to be capable of reproducing data by reading the magnetic field generated from the data recorded in the magnetic tape MT by the MR element or the like.

The communication I/F 58 is used to communicate with the information processing devices such as the servers 61 and the PCs 62, and connected to the network 60.

[Operation Performed By Recording and Reproducing Device at Time of Recording Data]

Figure 13:
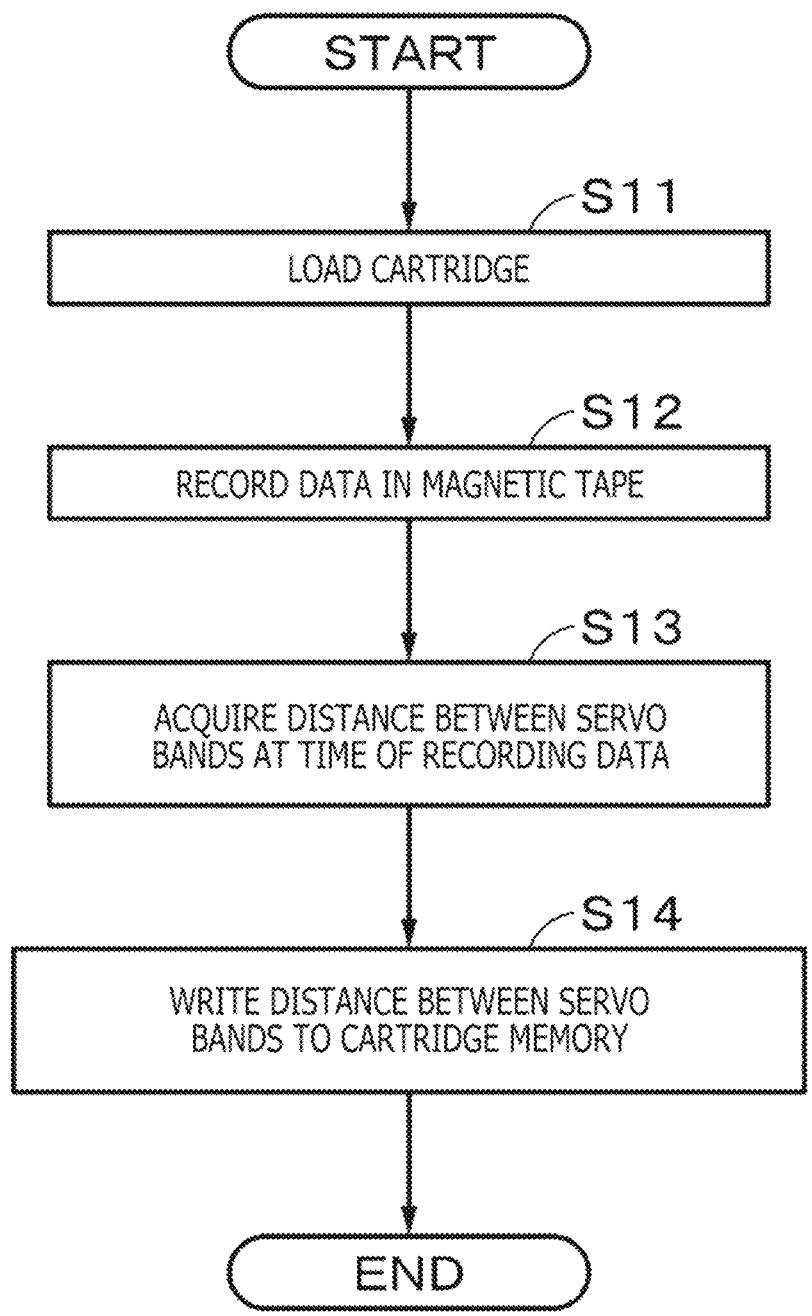
FIG. 13 is a flowchart for explaining an example of an operation performed by a recording and reproducing device at a time of recording data.

An example of an operation performed by the recording and reproducing device 50 at the time of recording data will be described hereinafter with reference to FIG. 13.

First, the control device 59 loads the cartridge 10 into the recording and reproducing device 50 (Step S11). Next, the control device 59 controls the rotation of the spindle 51 and the reel 52, and runs the magnetic tape MT while applying a specified tension to the magnetic tape MT in the longitudinal direction. The control device 59 then reads the servo signals by the servo read heads 56A and 56B of the magnetic head 56, and records data in the magnetic tape MT by the data write/read heads of the magnetic head 56 (Step S12).

At this time, the magnetic head 56 records data in the data bands DB using the data write/read heads of the magnetic head 56 while causing the two servo read heads 56A and 56B of the magnetic head 56 to trace the two adjacent servo bands SB.

Next, the control device 59 obtains the distance d1 between the two adjacent servo bands SB at the time of recording data from the reproduced waveforms of the servo signals read by the servo read heads 56A and 56B of the magnetic head 56 (Step S13). Next, the control device 59 writes the distance d1 between the servo bands SB at the time of recording data in the cartridge memory 11 using the reader-writer 57 (Step S14). The control device 59 may continuously measure the distance d1 between the servo bands SB and write the distance d1 in the cartridge memory 11, or measures the distance d1 between the servo bands at constant intervals and write the distance d1 in the cartridge memory 11. In the case of measuring the distance d1 between the servo bands SB at constant intervals and writing the distance d1 in the cartridge memory 11, it is possible to reduce an amount of information written to the memory 36.

[Operation Performed By Recording and Reproducing Device at Time of Reproducing Data]

Figure 14:
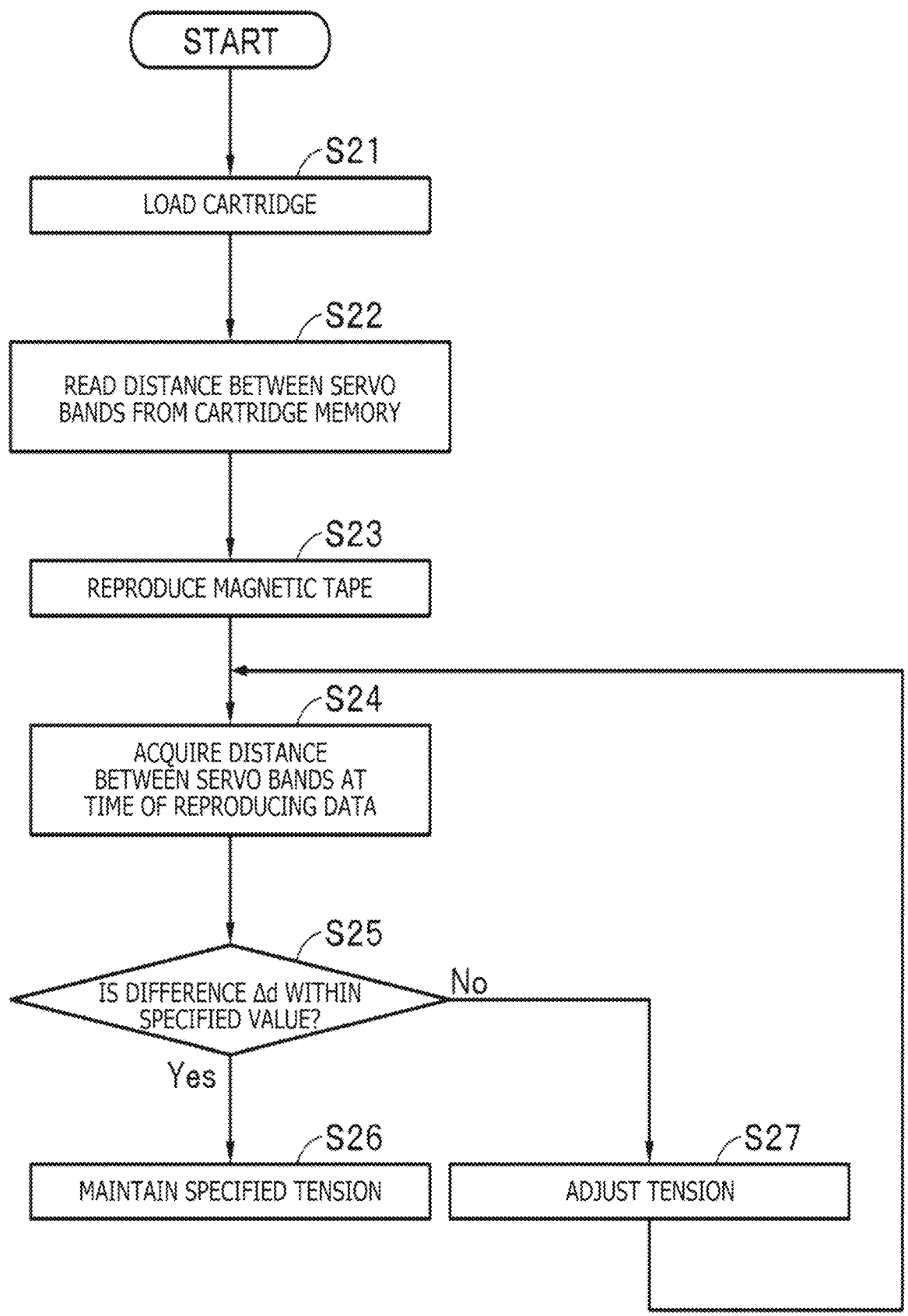
FIG. 14 is a flowchart for explaining an example of an operation performed by the recording and reproducing device at a time of reproducing data.

An example of an operation performed by the recording and reproducing device 50 at the time of reproducing data will be described hereinafter with reference to FIG. 14.

First, the control device 59 loads the cartridge 10 into the recording and reproducing device 50 (Step S21). Next, the control device 59 reads the distance d1 between the servo bands at the time of recording from the cartridge memory 11 using the reader-writer 57 (Step S22).

Next, the control device 59 controls the rotation of the spindle 51 and the reel 52, and runs the magnetic tape MT while applying a specified tension to the magnetic tape MT in the longitudinal direction. The control device 59 then reads the servo signals by the servo read heads 56A and 56B of the magnetic head 56, and reproduces data from the magnetic tape MT by the data write/read heads of the magnetic head 56 (Step S23).

Next, the control device 59 calculates the distance d2 between the two adjacent servo bands SB at the time of reproducing data from the reproduced waveforms of the servo signals read by the servo read heads 56A and 56B of the magnetic head 56 (Step S24).

Next, the control device 59 determines whether or not the difference Ad between the distance d1 between the servo bands SB read in Step S22 and the distance d2 between the servo bands SB calculated in Step S24 is within a specified value (Step S25).

In the case of determining in Step S25 that the difference Ad is within the specified value, the control device 59 controls the rotation of the spindle 51 and the reel 52 in such a manner as to maintain a specified tension (Step S26).

On the other hand, in the case of determining in Step S25 that the difference Ad is not within the specified value, the control device 59 controls the rotation of the spindle 51 and the reel 52 in such a manner as to reduce the difference Ad, adjusts the tension applied to the running magnetic tape MT, and returns the process to Step S24 (Step S27).

[Effects]

As described so far, in the magnetic tape MT according to the first embodiment, the plurality of recessed portions 43B each having a depth corresponding to 20% or higher of the average thickness $t_m$ of the magnetic layer 43 is provided on the surface of the magnetic layer 43, and the number of the recessed portions 43B per unit area of 1,600 $\mu m^2$ of the surface of the magnetic layer 43 is equal to or greater than 20 and equal to or smaller than 200. Furthermore, the amount of exudation (area) of the lubricant per 12.5 $\mu m \times 9.3$ $\mu m$ on the surface of the magnetic layer 43 in a vacuum is equal to or greater than 3.0 $\mu m^2$ and equal to or smaller than 6.5 $\mu m^2$. Moreover, the squareness ratio S1 in a perpendicular direction is equal to or higher than 65%. It is thereby possible to attain favorable electromagnetic conversion characteristics and suppress an increase in the dynamic friction coefficient even after repeated recording or reproducing.

Moreover, in the magnetic tape MT according to the first embodiment, it is possible to keep the width of the magnetic tape MT either constant or substantially constant by adjusting the tension applied to the magnetic tape MT in the longitudinal direction during running by the recording and reproducing device 50 in a case in which the width of the magnetic tape MT changes with a change in an environmental temperature or a humidity around the magnetic tape MT (cartridge 10). It is, therefore, possible to suppress offtrack errors resulting from the change in the environmental temperature or the humidity.

2 Second Embodiment

[Configuration of Recording and Reproducing Device]

Figure 15:
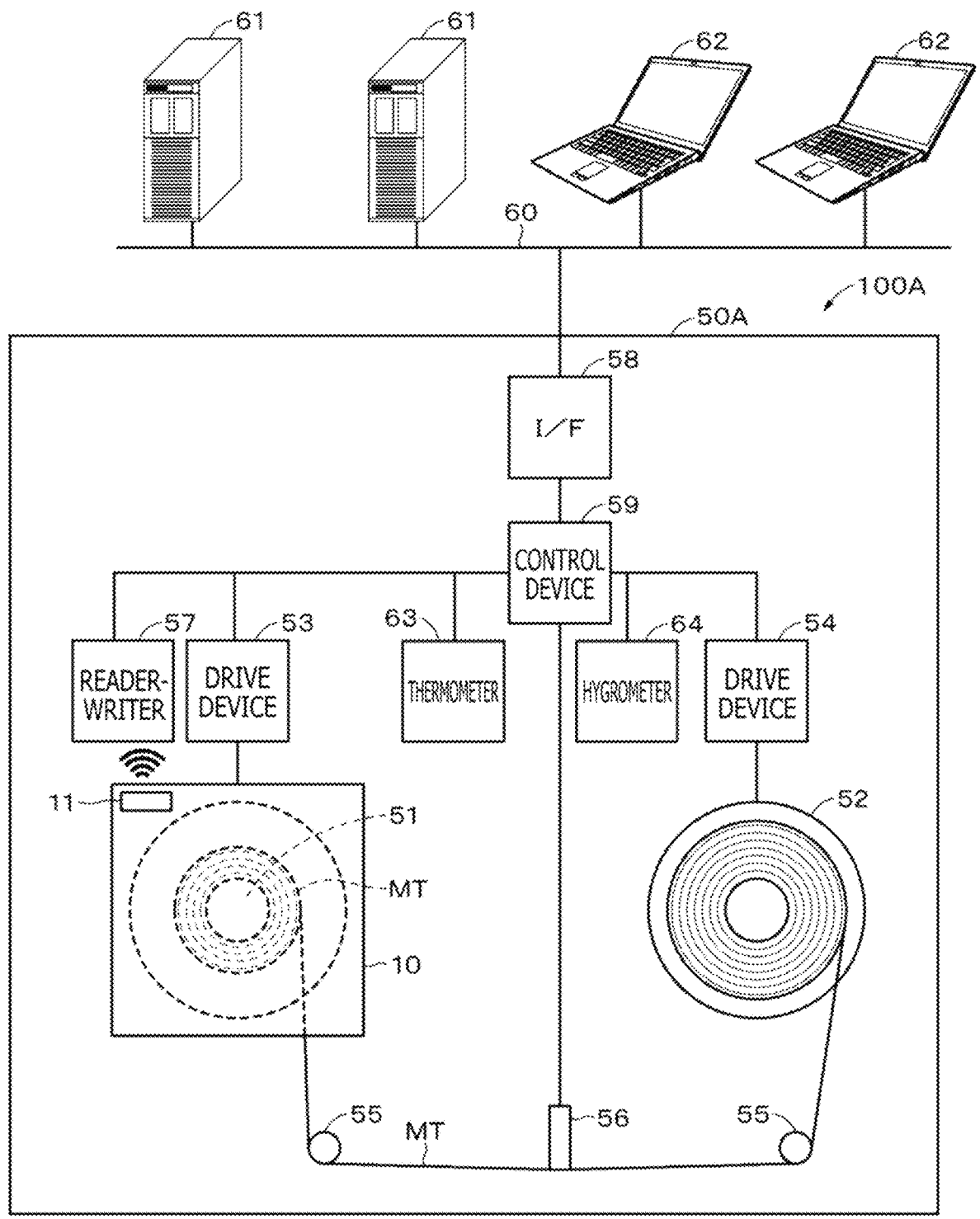
FIG. 15 is a schematic diagram depicting an example of a configuration of a recording and reproducing system according to a second embodiment of the present disclosure.

FIG. 15 is a schematic diagram depicting an example of a configuration of a recording and reproducing system 100A according to a second embodiment of the present disclosure. The recording and reproducing system 100A includes the cartridge 10 and a recording and reproducing device 50A.

The recording and reproducing device 50A further includes a thermometer 63 and a hygrometer 64. The thermometer 63 measures a temperature around the magnetic tape MT (cartridge 10) and outputs the temperature to the control device 59. In addition, the hygrometer 64 measures a humidity around the magnetic tape MT (cartridge 10) and outputs the humidity to the control device 59.

The control device 59 measures a temperature Tm1 and a humidity H1 around the magnetic tape MT (cartridge 10) by the thermometer 63 and the hygrometer 64 and writes the temperature Tm1 and the humidity H1 to the cartridge memory 11 via the reader-writer 57 at the time of recording data in the magnetic tape MT. The temperature Tm1 and the humidity H1 are an example of surrounding environment information regarding the magnetic tape MT.

The control device 59 obtains a tension Tn1 applied to the magnetic tape MT in the longitudinal direction on the basis of drive data regarding the spindle 51 and the reel 52, and writes the tension Tn1 to the cartridge memory 11 via the reader-writer 57 at the time of recording data in the magnetic tape MT.

The control device 59 obtains the distance d1 between the two adjacent servo bands SB from reproduced waveforms of servo signals read from the two adjacent servo bands SB at the time of recording data in the magnetic tape MT. In addition, the control device 59 calculates a width W1 of the magnetic tape MT at the time of recording data on the basis of this distance d1, and writes the width W1 to the memory 36 by the reader-writer 57.

The control device 59 measures a temperature Tm2 and a humidity H2 around the magnetic tape MT (cartridge 10) by the thermometer 63 and the hygrometer 64 at the time of reproducing data from the magnetic tape MT.

At the time of reproducing data from the magnetic tape MT, the control device 59 obtains a tension Tn2 applied to the magnetic tape MT in the longitudinal direction on the basis of drive data regarding the spindle 51 and the reel 52.

The control device 59 obtains the distance d2 between the two adjacent servo bands SB from the reproduced waveforms of the servo signals read from the two adjacent servo bands SB at the time of reproducing data from the magnetic tape MT. In addition, the control device 59 calculates a width W2 of the magnetic tape MT at the time of reproducing data on the basis of this distance d2.

At the time of reproducing data from the magnetic tape MT, the control device 59 reads the temperature Tm1, the humidity H1, the tension Tn1, and the width W1 written at the time of recording data from the cartridge memory 11 via the reader-writer 57. In addition, the control device 59 controls a tension applied to the magnetic tape MT using the temperature Tm1, the humidity H1, the tension Tn1, and the width W1 at the time of recording data, and the temperature Tm2, the humidity H2, the tension Tn2, and the width W2 at the time of reproducing data such that the width W2 of the magnetic tape MT at the time of reproducing data is either equal to or substantially equal to the width W1 of the magnetic tape MT at the time of recording data.

The controller 35 of the cartridge memory 11 stores the temperature Tm1, the humidity H1, the tension Tn1, and the width W1 received from the recording and reproducing device 50A via the antenna coil 31 in the second storage region 36B of the memory 36. The controller 35 of the cartridge memory 11 reads the temperature Tm1, the humidity H1, the tension Tn1, and the width W1 from the memory 36 in response to a request from the recording and reproducing device 50A, and transmits the temperature Tm1, the humidity H1, the tension Tn1, and the width W1 to the recording and reproducing device 50A via the antenna coil 31.

[Operation Performed By Recording and Reproducing Device at Time of Recording Data]

Figure 16:
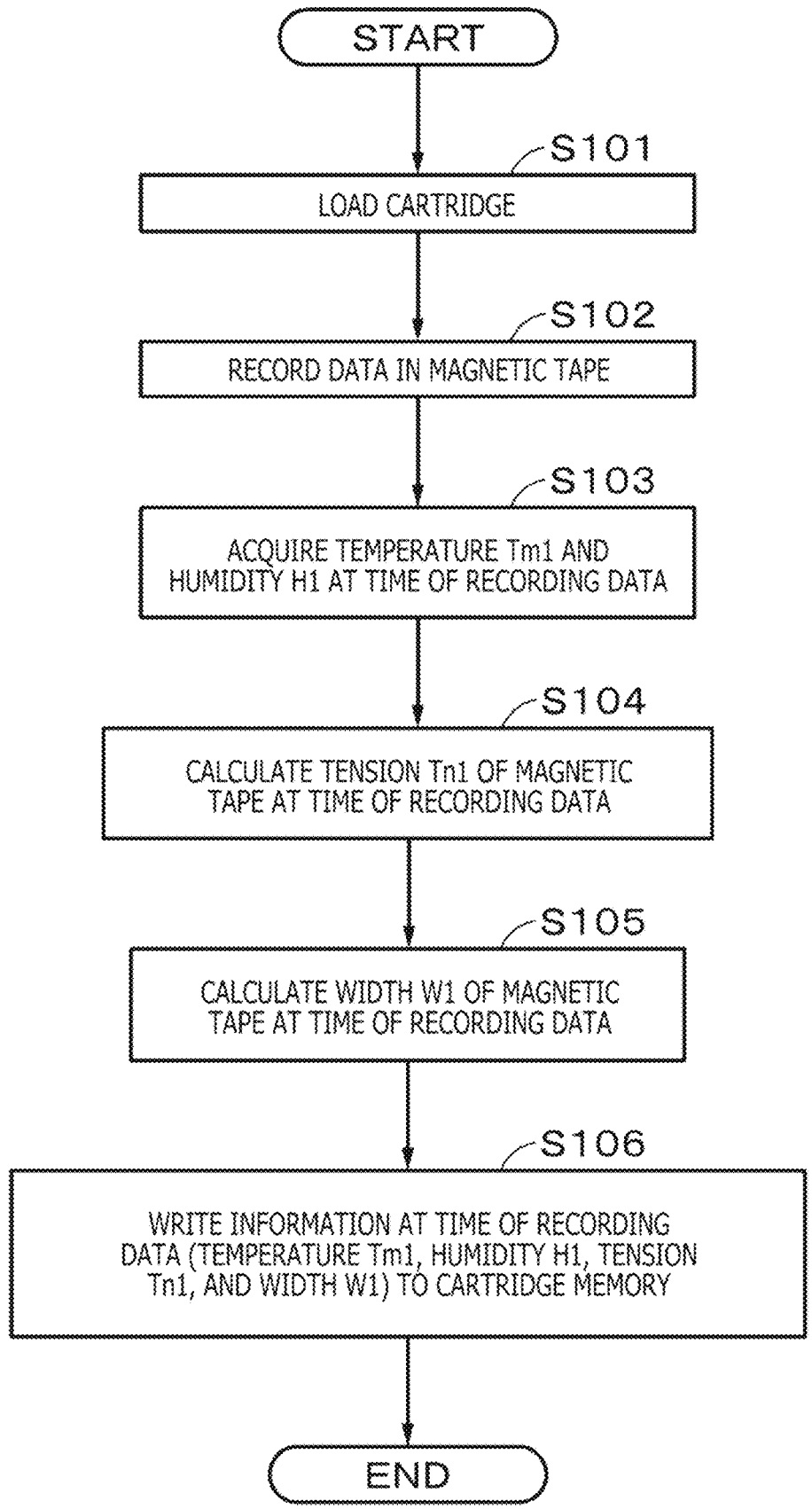
FIG. 16 is a flowchart for explaining an example of an operation performed by a recording and reproducing device at a time of recording data.

An example of an operation performed by the recording and reproducing device 50A at the time of recording data will be described hereinafter with reference to FIG. 16.

First, the control device 59 loads the cartridge 10 into the recording and reproducing device 50A (Step S101). Next, the control device 59 controls the rotation of the spindle 51 and the reel 52, and runs the magnetic tape MT while applying a specified tension to the magnetic tape MT in the longitudinal direction. The control device 59 then records data in the magnetic tape MT by the magnetic head 56 (Step S102).

Next, the control device 59 acquires the temperature Tm1 and the humidity H1 around the magnetic tape MT (environment information) at the time of recording data from the thermometer 63 and the hygrometer 64 (Step S103).

Next, the control device 59 calculates the tension Tn1 applied to the magnetic tape MT in the longitudinal direction at the time of recording data on the basis of the drive data regarding the spindle 51 and the reel 52 at the time of recording data (Step S104).

Next, the control device 59 obtains the distance d1 between the two adjacent servo bands SB from the reproduced waveforms of the servo signals read by the servo read heads 56A and 56B of the magnetic head 56. Next, the control device 59 calculates the width W1 of the magnetic tape MT at the time of recording data on the basis of this distance d1 (Step S105).

Next, the control device 59 writes the temperature Tm1, the humidity H1, the tension Tn1, and the width W1 of the magnetic tape MT to the cartridge memory 11 as information at the time of recording data by the reader-writer 57 (Step S106).

[Operation Performed By Recording and Reproducing Device at Time of Reproducing Data]

Figure 17:
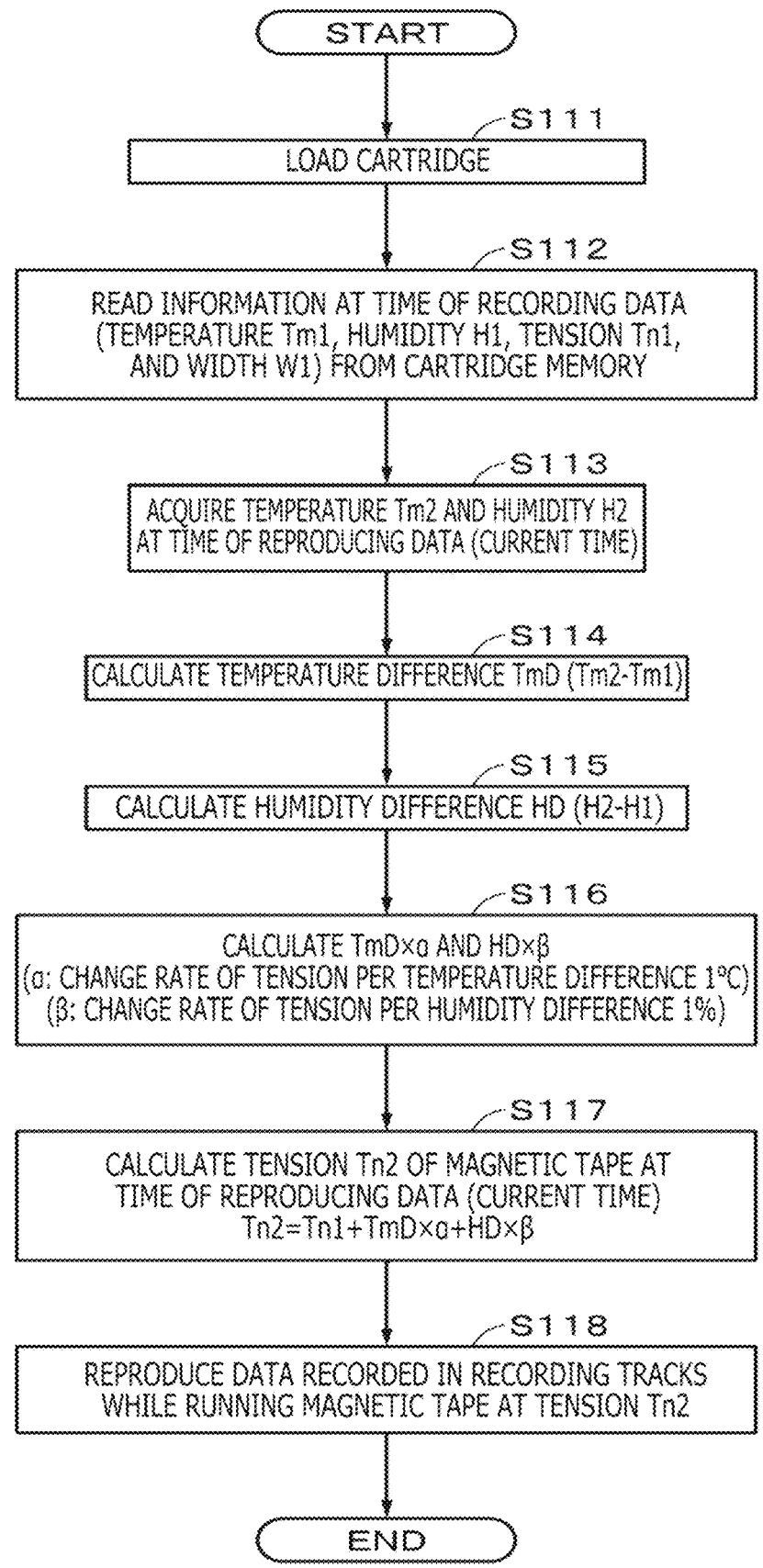
FIG. 17 is a flowchart for explaining an example of an operation performed by the recording and reproducing device at a time of reproducing data.

An example of an operation performed by the recording and reproducing device 50A at the time of reproducing data will be described hereinafter with reference to FIG. 17.

First, the control device 59 loads the cartridge 10 into the recording and reproducing device 50A (Step S111). Next, the control device 59 reads the information at the time of recording data (the temperature Tm1, the humidity H1, the tension Tn1, and the width W1 of the magnetic tape MT) written to the cartridge memory 11 from the cartridge memory 11 by the reader-writer 57, and acquires the information at the time of recording data (Step S112). Next, the control device 59 acquires information regarding the temperature Tm2 and the humidity H2 around the magnetic tape MT at the time of reproducing data by the thermometer 63 and the hygrometer 64 (Step S113).

Next, the control device 59 calculates a temperature difference TmD (TmD=Tm2−Tm1) between the temperature Tm1 at the time of recording data and the temperature Tm2 at the time of reproducing data (Step S114). In addition, the control device 59 calculates a humidity difference HD (HD=H2−H1) between the humidity H1 at the time of recording data and the humidity H2 at the time of reproducing data (Step S115).

Next, the control device 59 multiplies the temperature difference TmD by a coefficient α (TmD×α), and multiplies the humidity difference HD by a coefficient β (HD×β) (Step S116). The coefficient α is a value indicating how much the tension applied to the magnetic tape MT is to be changed per temperature difference 1° C., compared with the tension Tn1 at the time of recording data. The coefficient β is a value indicating how much the tension applied to the magnetic tape MT is to be changed per humidity difference 1%, compared with the tension Tn1 at the time of recording data.

Next, the control device 59 calculates the tension Tn2 to be applied to the magnetic tape MT in the longitudinal direction at the time of reproducing data (current time) by adding a value of TmD×α and a value of HD×β to the tension Tn1 at the time of recoding data (Step S117).

$$Tn2 = Tn1 + TmD \times \alpha + HD \times \beta$$

After determining the tension Tn2 applied to the magnetic tape MT at the time of reproducing data, the control device 59 controls the rotation of the spindle 51 and the reel 52, and controls the running of the magnetic tape MT such that the magnetic tape MT is run at the tension Tn2. The control device 59 then reproduces the data recorded in the data tracks Tk by the data write/read heads of the magnetic head 56 while reading the servo signals of the servo bands SB by the servo read heads 56A and 56B of the magnetic head 56 (Step S118).

At this time, the width of the magnetic tape MT is adapted to the width at the time of recording data by adjustment of the tension applied to the magnetic tape MT; thus, the data write/read heads of the magnetic head 56 can be accurately positioned with respect to the data tracks Tk. It is thereby possible to accurately reproduce data recorded in the magnetic tape MT even in a case in which the width of the magnetic tape MT varies due to a cause of some sort (for example, variations in temperature and humidity).

It is noted that a value of the tension Tn2 to be applied to the magnetic tape MT at the time of reproducing data (current time) becomes higher if the temperature at the time of reproducing data is higher than the temperature at the time of recording data. Owing to this, in a case in which the temperature rises and the width of the magnetic tape MT is larger than that at the time of recording data, it is possible to realize the same width as that at the time of reproducing data by narrowing the width of the magnetic tape MT.

Conversely, the value of the tension Tn2 to be applied to the magnetic tape MT at the time of reproducing data (current time) becomes lower if the temperature at the time of reproducing data is lower than the temperature at the time of recording data. Owing to this, in a case in which the temperature falls and the width of the magnetic tape MT becomes smaller than that at the time of recording data, it is possible to realize the same width as that at the time of reproducing data by increasing the width of the magnetic tape MT.

Furthermore, the value of the tension Tn2 to be applied to the magnetic tape MT at the time of reproducing data (current time) becomes higher if the humidity at the time of reproducing data is higher than the humidity at the time of recording data. Owing to this, in the case in which the humidity rises and the width of the magnetic tape MT becomes larger than that at the time of recording data, it is possible to realize the same width as that at the time of reproducing data by narrowing the width of the magnetic tape MT.

Conversely, the value of the tension Tn2 to be applied to the magnetic tape MT at the time of reproducing data (current time) becomes lower if the humidity at the time of reproducing data is lower than the humidity at the time of recording data. Owing to this, in a case in which the humidity falls and the width of the magnetic tape MT is smaller than that at the time of recording data, it is possible to realize the same width as that at the time of reproducing data by increasing the width of the magnetic tape MT.

It is noted herein that, to obtain the tension Tn2 to be applied to the magnetic tape MT at the time of reproducing data, information regarding the width W1 of the magnetic tape MT at the time of recording data may be used in addition to the temperature Tm1, the humidity H1, the tension Tn1 of the magnetic tape MT at the time of recording data (or as an alternative to the tension Tn1).

In this case, the control device 59 similarly calculates the temperature difference TmD (TmD=Tm2−Tm1) and the humidity difference HD (HD=H2−H1). The control device 59 then multiplies the temperature difference TmD by a coefficient $\gamma$ (TmD×$\gamma$), and multiplies the humidity difference HD by a coefficient $\delta$ (HD×$\delta$) (Step S116).

The coefficient $\gamma$ herein is a value indicating how much the width of the magnetic tape MT varies per temperature difference 1° C. (value indicating a coefficient of expansion per unit length (in the width direction) based on the temperature). In addition, the coefficient of expansion $\delta$ is a value indicating how much the width of the magnetic tape MT varies per humidity difference 1% (value indicating a coefficient of expansion per unit length (in the width direction) based on the humidity).

Next, the control device 59 predicts a current width w2 of the magnetic tape MT at the time of reproducing data by the following Equation on the basis of the previous width W1 of the magnetic tape MT at the time of recording data.

$$W2=W1(1+TmD\times\gamma+HD2\times\delta)$$

Next, the control device 59 calculates a difference WD between the current width w2 of the magnetic tape MT at the time of reproducing data and the previous width W1 of the magnetic tape MT at the time of recording data (WD=W2−W1=W1(TmD×$\gamma$+HD2×$\delta$)).

The control device 59 then adds a value obtained by multiplying the width difference WD by a coefficient $\varepsilon$ to the tension Tn1 of the magnetic tape MT at the time of recording data, and calculates the tension Tn2 applied to the magnetic tape MT at the time of reproducing data.

$$Tn2=Tn1+WD\times\varepsilon$$

In Equation, the coefficient $\varepsilon$ is a value representing a tension applied to the magnetic tape MT in the longitudinal direction and necessary to change the width of the magnetic tape MT by a unit distance.

After determining the tension Tn2 applied to the magnetic tape MT at the time of reproducing data, the control device 59 controls the rotation of the spindle 51 and the reel 52, and controls the running of the magnetic tape MT such that the magnetic tape MT is run at the tension Tn2. The control device 59 then reproduces the data recorded in the data tracks Tk by the data write/read heads of the magnetic head 56 while reading the servo signals of the servo bands SB by the servo read heads 56A and 56B of the magnetic head 56.

It is possible to accurately reproduce data recorded in the magnetic tape MT even in a case in which the tension Tn2 is determined by a method described above and in a case in which the width of the magnetic tape MT varies due to a cause of some sort (for example, variation in temperature and humidity).

[Effects]

As described so far, in the second embodiment, the information regarding the magnetic tape MT at the time of recording data is stored in the cartridge memory 11; thus, it is possible to appropriately adjust the width of the magnetic tape MT by utilizing this information at the time of reproducing data. Therefore, even in the case in which the width of the magnetic tape MT varies for a reason of some sort, the data recorded in the magnetic tape MT can be accurately reproduced.

Furthermore, in the present embodiment, the temperature Tm1 and the humidity H1 around the magnetic tape MT (environment information) at the time of recording data are written as the information at the time of recording data. It is, therefore, possible to appropriately handle variations in the width of the magnetic tape MT and the width of the data track Tk due to the variations in temperature and humidity.

3 Modifications (First Modification)

While the case in which the tension adjustment information is stored in the cartridge memory 11 has been described in the first and second embodiments, the tension adjustment information may be stored in the control device 59 of the recording and reproducing device 50 or 50A. In this case, the control device 59 controls the rotation of the spindle drive device 53 and the reel drive device 54 by the tension adjustment information stored in the control device 59, and adjusts the tension applied to the magnetic tape MT in the longitudinal direction.

(Second Modification)

The magnetic tape MT may be used in a library device. In this case, the library device is configured to be capable of adjusting the tension applied to the magnetic tape MT in the longitudinal direction, and may include a plurality of the recording and reproducing devices 50 according to the first embodiment or a plurality of the recording and reproducing devices 50A according to the second embodiment.

(Third Modification)

The width of the magnetic tape MT may be kept either constant or substantially constant by causing a servo writer to adjust the tension applied to the magnetic tape MT in the longitudinal direction at the time of recording the servo signal or the like. In this case, the servo writer may include a detection device that detects the width of the magnetic tape MT, and adjust the tension applied to the magnetic tape MT in the longitudinal direction on the basis of a detection result of this detection device.

(Fourth Modification)

The magnetic tape MT is not limited to the vertical recording type magnetic tape but may be a horizontal recording type magnetic tape. In this case, a needle magnetic powder such as metal magnetic powder may be used as the magnetic powder.

(Fifth Modification)

While the case of using the distance between the servo bands SB as width related information related to the magnetic tape MT at the time of recording data has been described in the first embodiment, the width of the magnetic tape MT may be used.

In this case, the control device 59 calculates the width W1 of the magnetic tape MT from the distance d1 between the servo bands SB at a time of recording data and writes this width W1 to the cartridge memory 11 by the reader-writer 57.

The control device 59 reads from the cartridge memory 11 the width W1 of the magnetic tape MT at the time of recording data from the cartridge memory 11 at the time of reproducing data, and calculates the width W2 of the magnetic tape MT at the time of reproducing data from the distance d2 between the servo bands SB at the time of reproducing data. The control device 59 then calculates a difference ΔW between the width W1 of the magnetic tape MT at the time of recording data and the width W2 of the magnetic tape MT at the time of reproducing data, and determines whether or not the difference ΔW is within a specified value.

In a case in which the difference Ad is within the specified value, the control device 59 exercises control to drive the rotation of the spindle 51 and the reel 52 to rotate in such a manner as to maintain a specified tension. On the other hand, in a case in which the difference Ad is not within the specified value, the control device 59 exercises control to drive the rotation of the spindle 51 and the reel 52 to rotate in such a manner that the difference Ad is within the specified value and adjusts the tension applied to the magnetic tape MT that is being run.

(Sixth Modification)

In the second embodiment, the case of using all the temperatures Tm1 and Tm2, the humidities H1 and H2, the tensions Tn1 and Tn2, and the widths W1 and W2 as the information at the time of recording data has been described. However, the information at the time of recording data may be any one of the temperatures Tm1 and Tm2, the humidities H1 and H2, the tensions Tn1 and Tn2, and the widths W1 and W2 or may be a combination of two or three arbitrary items.

Not only the information at the time of recording data (the temperature Tm1, the humidity H1, the tension Tn1, and the width W1) but also the information at the time of reproducing data (the temperature Tm2, the humidity H2, the tension Tn2, and the width W2) may be stored in the cartridge memory 11. This information at the time of reproducing data is used, for example, after data is reproduced and when the data in the magnetic tape MT is reproduced on yet other occasion.

(Seventh Modification)

In the first and second embodiments, the case of forming the plurality of recessed portions 43A on the surface of the magnetic layer 43 by transferring the plurality of protruding portions 44A provided on the surface of the back layer 44 onto the surface of the magnetic layer 43 has been described. However, a method of forming the plurality of recessed portions 43A is not limited to this case. For example, the plurality of recessed portions 43A may be formed on the surface of the magnetic layer 43 by adjusting a type of the solvent contained in the magnetic layer forming coating, the drying conditions for the magnetic layer forming coating, and the like.

EXAMPLES

While the present disclosure is specifically described by referring to examples, the present disclosure is not limited to these examples.

In the following examples and comparisons, the number of the recessed portions per unit area, the amount of exudation of the lubricant, the arithmetic average roughness Ra of the surface of the magnetic layer, the average thickness of the magnetic tape, the squareness ratio S1 of the magnetic layer in the perpendicular direction, the squareness ratio S2 of the magnetic layer in the longitudinal direction, the amount of magnetization in the perpendicular direction, and the product between the squareness ratio and the amount of magnetization in the perpendicular direction take on the values obtained by the measurement methods described in the preceding first embodiment.

Furthermore, in the following examples and comparisons, the number of the recessed portions per unit area and the amount of exudation of the lubricant mean values measured in the finally obtained magnetic tape (magnetic tape after the calendar process and the transfer process.)

First Example (Process of Preparing Magnetic Layer Forming Coating)

The magnetic layer forming coating was prepared as follows. First, a first composition having the following blending was kneaded by an extruder. Next, the kneaded first composition and a second composition having the following blending were added up to preliminarily mix the first and second compositions. Subsequently, sand mill mixture was further performed, a filter treatment was performed, and the magnetic layer forming coating was prepared.

(First Composition)

Barium ferrite ($BaFe_{12}O_{19}$) particle powder (a hexagonal plate shape, an average aspect ratio of 2.8, and an average particle volume of 1,600 $nm^3$): 100 parts by mass Vinyl chloride resin (30 mass % of a cyclohexanone solution): 65 parts by mass (including the solution)

(degree of polymerization=300, Mn=10,000, containing, as a polar group, $OSO_3K$=0.07 mmol/g, secondary OH=0.3 mmol/g)

Aluminum oxide powder: 5 parts by mass ($\alpha$-$Al_2O_3$, an average particle diameter of 0.2 μm)

(Second Composition)

Vinyl chloride resin: 1.1 parts by mass
(resin solution: 30 mass % of a resin content, 70 mass % of cyclohexanone)
n-butyl stearate: 2 parts by mass
Methyl ethyl ketone: 121.3 parts by mass
Toluene: 121.3 parts by mass
Cyclohexanone: 60.7 parts by mass
Carbon black: 2 parts by mass
(manufactured by TOKAI CARBON CO., LTD., product name: SEAST TA)

Finally, polyisocyanate (product name: Coronate L, manufactured by TOSOH CORPORATION): 4 parts by mass as the curing agent and stearic acid: 2 parts by mass as the lubricant were added to the magnetic layer forming coating prepared as described above.

(Process of Preparing Foundation Layer Forming Coating)

The foundation layer forming coating was prepared as follows. First, a third composition having the following blending was kneaded by the extruder. Next, the kneaded third composition and a fourth composition having the following blending were added to an agitation tank equipped with a disper to preliminarily mix the third composition and the fourth composition. Subsequently, sand mill mixture was further performed, the filter treatment was performed, and the foundation layer forming coating was prepared.

(Third Composition)

Needle iron oxide powder: 100 parts by mass
($\alpha$-$Fe_2O_3$, an average long axis length of 0.15 μm)
Vinyl chloride resin: 55.6 parts by mass
(resin solution: 30 mass % of a resin content, 70 mass % of cyclohexanone)
Carbon black: 10 parts by mass
(average particle diameter of 20 nm)

(Fourth Composition)

Polyurethane resin UR8200 (manufactured by TOYOBO CO., LTD): 18.5 parts by mass
n-butyl stearate: 2 parts by mass
Methyl ethyl ketone: 108.2 parts by mass
Toluene: 108.2 parts by mass
Cyclohexanone: 18.5 parts by mass Finally, polyisocyanate (product name: Coronate L, manufactured by TOSOH CORPORATION): 4 parts by mass as the curing agent and stearic acid: 2 parts by mass as the lubricant were added to the foundation layer forming coating prepared as described above.

(Process of Preparing Back Layer Forming Coating)

The back layer forming coating was prepared as follows. The following raw materials were mixed up in the agitation tank equipped with the disper, and subjected to the filter treatment, thereby preparing the back layer forming coating.

Small particle diameter carbon black powder (average particle diameter (D50) of 20 nm): 100 parts by mass
Polyester polyurethane: 100 parts by mass
(manufactured by Nippon Polyurethane Industry Co., Ltd., product name: N-2304)
Methyl ethyl ketone: 500 parts by mass
Toluene: 400 parts by mass
Cyclohexanone: 100 parts by mass (Application Process)

Using the magnetic layer forming coating and the foundation layer forming coating prepared as described above, a foundation layer and a magnetic body were formed on one principal surface of a long polyethylene naphthalate film (hereinafter, referred to as "PEN film"), which was a non-magnetic support medium, at an average thickness of 3.6 μm, as follows. First, the foundation layer was formed by applying the foundation layer forming coating onto one principal surface of the PEN film and drying the foundation layer forming coating such that the average thickness of the foundation layer was 1.1 μm after the calendar treatment. Next, the magnetic layer was formed by applying the magnetic layer forming coating onto the foundation layer and drying the magnetic layer forming coating such that the average thickness of the foundation layer was 85 nm after the calendar treatment. It is noted that the magnetic field of the magnetic powder was oriented in the thickness direction of the film by a solenoid coil at a time of drying the magnetic layer forming coating. Furthermore, the amount of exudation of the lubricant was set to 3.6 μm$^2$, the squareness ratio S1 of the magnetic tape in the perpendicular direction (thickness direction) was set to 65%, and the squareness ratio S2 of the magnetic tape in the longitudinal direction was set to 38% by adjusting the drying conditions (drying temperature and drying time) for the magnetic layer forming coating. Subsequently, a back layer was formed by applying the back layer forming coating onto the other principal surface of the PEN film and drying the back layer forming coating such that the average thickness of the back layer was 0.4 μm after the calendar treatment. As a result, the magnetic tape was obtained.

(Calendar Process)

The calendar treatment was performed to smooth the surface of the magnetic layer. At this time, the number of recessed portions per unit area was set to 20 and the arithmetic average roughness Ra of the surface of the magnetic layer was set to 1.7 nm by adjusting a pressure and a temperature of the calendar treatment.

(Transfer Process)

First, the magnetic tape was wound up into a roll shape, and a first heat treatment was performed on the magnetic tape in this state at 60° C. for 10 hours. Subsequently, the magnetic tape was rewound into the roll shape such that an end portion located on an inner circumferential side was located on an opposite outer circumferential side, and a second heat treatment was performed on the magnetic tape in this state at 60° C. for 10 hours. As a result, a plurality of protruding portions on the surface of the back layer was transferred onto the surface of the magnetic layer, and a plurality of recessed portions each having a depth corresponding to 20% or higher of the average thickness of the magnetic layer was formed on the surface of the magnetic layer. The number of the recessed portions per unit area of 1,600 μm$^2$ of the surface of the magnetic layer was 20.

(Cutting Process)

The magnetic tape obtained as described above was cut to have a width of ½ inch (12.65 mm). As a result, a long magnetic tape at the average thickness of 5.2 μm was obtained.

(Demagnetization Process)

The magnetic tape obtained as described above was demagnetized. At this time, an angle formed between a demagnetizing magnet and the magnetic tape was set to 40 degrees.

(Servo Pattern Writing Process)

Five servo bands were formed by writing a servo pattern to the magnetic tape obtained as described above using the servo writer. The servo pattern was compliant with LTO-8 Standards.

Second Example

A magnetic tape was obtained similarly to the first example except that the number of recessed portions per unit area was set to 40 by adjusting a calendar treatment temperature in the calendar process. Next, the magnetic tape to which the servo pattern was written was obtained by performing the demagnetization process and the servo pattern writing process similar to those in the first example.

Third Example

First, a magnetic tape was obtained similarly to the first example except that the arithmetic average roughness Ra of the surface of the magnetic layer was set to 1.8 nm and the number of recessed portions per unit area was set to 80 by preparing the back layer forming coating using the following raw materials in a process of preparing the back layer forming coating.

Small particle diameter carbon black powder (average particle diameter (D50) of 20 nm): 95 parts by mass Large particle diameter carbon black powder (average particle diameter (D50) of 300 nm): 5 parts by mass Polyester polyurethane: 100 parts by mass (manufactured by Nippon Polyurethane Industry Co., Ltd., product name: N-2304)

Methyl ethyl ketone: 500 parts by mass

Toluene: 400 parts by mass

Cyclohexanone: 100 parts by mass

Next, the magnetic tape to which a servo pattern was written was obtained by performing the demagnetization process and the servo pattern writing process similar to those in the first example.

Fourth Example

First, a magnetic tape was obtained similarly to the third example except that the number of recessed portions per unit area was set to 100 by adjusting the calendar treatment temperature in the calendar process. Next, the magnetic tape to which a servo pattern was written was obtained by performing the demagnetization process and the servo pattern writing process similar to those in the first example.

Fifth Example

First, a magnetic tape was obtained similarly to the first example except that the arithmetic average roughness Ra of the surface of the magnetic layer was set to 2.0 nm and the number of recessed portions per unit area was set to 150 by preparing the back layer forming coating using the following raw materials in the process of preparing the back layer forming coating.

Small particle diameter carbon black powder (average particle diameter (D50) of 20 nm): 90 parts by mass Large particle diameter carbon black powder (average particle diameter (D50) of 300 nm): 10 parts by mass Polyester polyurethane: 100 parts by mass (manufactured by Nippon Polyurethane Industry Co., Ltd., product name: N-2304)

Methyl ethyl ketone: 500 parts by mass

Toluene: 400 parts by mass

Cyclohexanone: 100 parts by mass

Next, the magnetic tape to which a servo pattern was written was obtained by performing the demagnetization process and the servo pattern writing process similar to those in the first example.

Sixth Example

First, a magnetic tape was obtained similarly to the fifth example except that the number of recessed portions per unit area was set to 180 by adjusting the calendar treatment temperature in the calendar process. Next, the magnetic tape to which a servo pattern was written was obtained by performing the demagnetization process and the servo pattern writing process similar to those in the first example.

Seventh Example

First, a magnetic tape was obtained similarly to the fifth example except that the number of recessed portions per unit area was set to 200 by adjusting the calendar treatment temperature in the calendar process. Next, the magnetic tape to which a servo pattern was written was obtained by performing the demagnetization process and the servo pattern writing process similar to those in the first example.

Eighth to Twelfth Examples

First, magnetic tapes were obtained similarly to the fourth example except that the amount of exudation of the lubricant was changed depending on a sample by adjusting the drying conditions (drying temperature) of the magnetic layer forming coating per sample and set to 3.0 $\mu m^2$, 4.1 $\mu m^2$, 4.8 $\mu m^2$, 5.6 $\mu m^2$, and 6.5 $\mu m^2$ (refer to Table 1) in the application process. Next, the magnetic tape to which a servo pattern was written was obtained by performing the demagnetization process and the servo pattern writing process similar to those in the first example.

Thirteenth Example

First, a magnetic tape was obtained similarly to the fourth example except that a strontium ferrite ($SrFe_{12}O_{19}$) particle powder (a hexagonal shape, an aspect ratio of 2.8, and a particle volume of 1,600 $nm^3$) was used as an alternative to the barium ferrite ($BaFe_{12}O_{19}$) particle powder as the magnetic powder in the process of preparing the magnetic layer forming coating. Next, the magnetic tape to which a servo pattern was written was obtained by performing the demagnetization process and the servo pattern writing process similar to those in the first example.

Fourteenth Example

First, a magnetic tape was obtained similarly to the fourth example except that an c iron oxide particle powder (a spherical shape, an aspect ratio of 1.0, and a particle volume of 1,800 $nm^3$) was used aspect ratio the barium ferrite ($BaFe_{12}O_{19}$) particle powder as the magnetic powder in the process of preparing the magnetic layer forming coating. Next, the magnetic tape to which a servo pattern was written was obtained by performing the demagnetization process and the servo pattern writing process similar to those in the first example.

Fifteenth Example

First, a magnetic tape was obtained similarly to the fourth example except that a cobalt ferrite particle powder (a cubic shape, an aspect ratio of 1.7, a particle volume of 2000 $nm^3$) was used as an alternative to the barium ferrite ($BaFe_{12}O_{19}$) particle powder as the magnetic powder in the process of preparing the magnetic layer forming coating. Next, the magnetic tape to which a servo pattern was written was obtained by performing the demagnetization process and the servo pattern writing process similar to those in the first example.

Sixteenth Example

First, a magnetic tape was obtained similarly to the first example except that the angle between the demagnetizing magnet and the magnetic tape was set to 90 degrees in the demagnetization process. Next, the magnetic tape to which a servo pattern was written was obtained by performing the demagnetization process and the servo pattern writing process similar to those in the first example.

Seventeenth Example

First, a magnetic tape was obtained similarly to the first example except that the angle between the demagnetizing magnet and the magnetic tape was set to five degrees in the demagnetization process. Next, the magnetic tape to which a servo pattern was written was obtained by performing the demagnetization process and the servo pattern writing process similar to those in the first example.

[First Comparison]

A magnetic tape was obtained similarly to the first example except that the number of recessed portions per unit area was set to 15 by adjusting the calendar treatment temperature in the calendar process. Next, the magnetic tape to which a servo pattern was written was obtained by performing the demagnetization process and the servo pattern writing process similar to those in the first example.

[Second Comparison]

A magnetic tape was obtained similarly to the first example except that the arithmetic average roughness Ra of the surface of the magnetic layer was set to 2.3 nm and the number of recessed portions per unit area was set to 230 by preparing the back layer forming coating using the following raw materials in the process of preparing the back layer forming coating and by adjusting the calendar treatment temperature in the calendar process.

Small particle diameter carbon black powder (average particle diameter (D50) of 20 nm): 80 parts by mass Large particle diameter carbon black powder (average particle diameter (D50) of 300 nm): 20 parts by mass Polyester polyurethane: 100 parts by mass
(manufactured by Nippon Polyurethane Industry Co., Ltd., product name: N-2304)

Methyl ethyl ketone: 500 parts by mass
Toluene: 400 parts by mass
Cyclohexanone: 100 parts by mass Next, the magnetic tape to which a servo pattern was written was obtained by performing the demagnetization process and the servo pattern writing process similar to those in the first example.

[Third to Fifth Comparisons]

Magnetic tapes were obtained similarly to the fourth example except that the amount of exudation of the lubricant was changed depending on a sample by adjusting the drying conditions (drying temperature) for the magnetic layer forming coating per sample and set to 1.5 μm$^2$, 2.8 μm$^2$, and 7.0 μm$^2$ (refer to Table 1) in the application process. Next, the magnetic tape to which a servo pattern was written was obtained by performing the demagnetization process and the servo pattern writing process similar to those in the first example.

[Sixth Comparison]

First, a magnetic tape was obtained similarly to the fourth example except that the squareness ratio S1 of the magnetic tape in the perpendicular direction was set to 60% and the squareness ratio S2 of the magnetic tape in the longitudinal direction was set to 45% by not performing a magnetic field orientation process by the solenoid coil in the application process. Next, the magnetic tape to which a servo pattern was written was obtained by performing the demagnetization process and the servo pattern writing process similar to those in the first example.

[Evaluation]

The magnetic tapes obtained as described above were evaluated as follows.

(SNR (Signal-to-Noise Ratio))

Using a ½-inch tape transport device to which recording/reproducing heads and recording/reproducing amplifiers were mounted (MTS Transport manufactured by Mountain Engineering II, Inc.), SNR (electromagnetic conversion characteristics) of each magnetic tape in a 25° C. environment was measured. A ring head at a gap length of 0.2 μm was used as the recording head, and a GMR head was at an inter-shield distance of 0.1 μm was used as the reproducing head. A relative speed was set to 6 m/s, a recording clock frequency was set to 160 MHz, and a recording track width was set to 2.0 μm. Furthermore, the SNR was calculated on the basis of a method described in the following document. Results are depicted in Table 1 as relative values to the SNR in the first example assumed as 0 dB.

Y. Okazaki: "An Error Rate Emulation System.", IEEE Trans. Man., 31, pp. 3093-3095 (1995)

(Friction Coefficient Ratio)

The friction coefficient ratio ($\mu_B/\mu_A$) of each magnetic tape was evaluated by the evaluation method described in the first embodiment.

(Difference Between +Side and −Side Wave Height Values)

It was determined whether a reproduced waveform displayed on a screen had appropriate symmetry. It was determined that the reproduced waveform had symmetry if a difference between a maximum voltage value Vmax of the reproduced waveform and a minimum voltage value Vmin (absolute value) is within a range of 5% with respect to an amplitude of the reproduced waveform.

Table 1 illustrates configurations and evaluation results of the magnetic tapes in first to seventeenth examples and first to sixth comparisons.

TABLE 1

| | Number of recessed portions | Amount of exudation of lubricant [μm$^2$] | Type of magnetic powder | Arithmetic average roughness Ra [nm] | Perpendicular orientation | Back layer carbon composition ratio (20 nm/300 nm) | Tape average thickness [μm] | Room temperature SNR [dB] |
|---|---|---|---|---|---|---|---|---|
| First example | 20 | 3.6 | BaFe$_{12}$O$_{19}$ | 1.7 | Present | 100/0 | 5.2 | 0 |

TABLE 1-continued

| | | | | | | | | |
|---|---|---|---|---|---|---|---|---|
| Second example | 40 | 3.6 | BaFe$_{12}$O$_{19}$ | 1.7 | Present | 100/0 | 5.2 | 0.2 |
| Third example | 80 | 3.6 | BaFe$_{12}$O$_{19}$ | 1.8 | Present | 95/5 | 5.2 | 0.4 |
| Fourth example | 100 | 3.6 | BaFe$_{12}$O$_{19}$ | 1.8 | Present | 95/5 | 5.2 | 0.5 |
| Fifth example | 150 | 3.6 | BaFe$_{12}$O$_{19}$ | 2.0 | Present | 90/10 | 5.2 | 0.8 |
| Sixth example | 180 | 3.6 | BaFe$_{12}$O$_{19}$ | 2.0 | Present | 90/10 | 5.2 | 0.7 |
| Seventh example | 200 | 3.6 | BaFe$_{12}$O$_{19}$ | 2.0 | Present | 90/10 | 5.2 | 0.3 |
| Eighth example | 100 | 3.0 | BaFe$_{12}$O$_{19}$ | 1.8 | Present | 95/5 | 5.2 | 0.5 |
| Ninth example | 100 | 4.1 | BaFe$_{12}$O$_{19}$ | 1.8 | Present | 95/5 | 5.2 | 0.5 |
| Tenth example | 100 | 4.8 | BaFe$_{12}$O$_{19}$ | 1.8 | Present | 95/5 | 5.2 | 0.5 |
| Eleventh example | 100 | 5.6 | BaFe$_{12}$O$_{19}$ | 1.8 | Present | 95/5 | 5.2 | 0.5 |
| Twelfth example | 100 | 6.5 | BaFe$_{12}$O$_{19}$ | 1.8 | Present | 95/5 | 5.2 | 0.5 |
| Thirteenth example | 100 | 3.6 | SrFe$_{12}$O$_{19}$ | 1.8 | Present | 95/5 | 5.2 | 0.5 |
| Fourteenth example | 100 | 3.5 | ε iron oxide | 1.8 | Present | 95/5 | 5.2 | 0.5 |
| Fifteenth example | 100 | 3.5 | Cobalt ferrite | 1.8 | Present | 95/5 | 5.2 | 0.5 |
| Sixteenth example | 100 | 3.6 | BaFe$_{12}$O$_{19}$ | 1.8 | Present | 95/5 | 5.2 | 0.5 |
| Seventeenth example | 100 | 3.6 | BaFe$_{12}$O$_{19}$ | 1.8 | Present | 95/5 | 5.2 | 0.5 |
| First comparison | 15 | 3.5 | BaFe$_{12}$O$_{19}$ | 1.7 | Present | 100/0 | 5.2 | −1 |
| Second comparison | 230 | 3.5 | BaFe$_{12}$O$_{19}$ | 2.3 | Present | 80/20 | 5.2 | −0.5 |
| Third comparison | 100 | 1.5 | BaFe$_{12}$O$_{19}$ | 1.8 | Present | 95/5 | 5.2 | 0.5 |
| Fourth comparison | 100 | 2.8 | BaFe$_{12}$O$_{19}$ | 1.8 | Present | 95/5 | 5.2 | 0.5 |
| Fifth comparison | 100 | 7.0 | BaFe$_{12}$O$_{19}$ | 1.8 | Present | 95/5 | 5.2 | 0.2 |
| Sixth comparison | 100 | 3.6 | BaFe$_{12}$O$_{19}$ | 1.8 | Not present | 95/5 | 5.2 | −0.7 |

| | Friction coefficient ratio ($\mu$B/$\mu$A) | Perpendicular squareness ratio S1 [%] | Longitudinal squareness ratio S2 [%] | Perpendicular magnetization amount [%] | Product between squareness ratio and perpendicular magnetization amount | Angle of demagnetizing magnet before servo recording [degree] | Difference between + side and − side wave height values [%] |
|---|---|---|---|---|---|---|---|
| First example | 1.2 | 65 | 38 | 62 | 2356 | 40 | 2 |
| Second example | 1.2 | 65 | 38 | 62 | 2356 | 40 | 2 |
| Third example | 1.2 | 65 | 38 | 62 | 2356 | 40 | 2 |
| Fourth example | 1.3 | 65 | 38 | 62 | 2356 | 40 | 2 |
| Fifth example | 1.3 | 65 | 38 | 62 | 2356 | 40 | 2 |
| Sixth example | 1.4 | 65 | 38 | 62 | 2356 | 40 | 2 |
| Seventh example | 1.5 | 65 | 38 | 62 | 2356 | 40 | 2 |
| Eighth example | 1.3 | 65 | 38 | 62 | 2356 | 40 | 2 |
| Ninth example | 1.2 | 65 | 38 | 62 | 2356 | 40 | 2 |
| Tenth example | 1.1 | 65 | 38 | 62 | 2356 | 40 | 2 |
| Eleventh example | 1.1 | 65 | 38 | 62 | 2356 | 40 | 2 |
| Twelfth example | 1.4 | 65 | 38 | 62 | 2356 | 40 | 2 |
| Thirteenth example | 1.2 | 65 | 38 | 62 | 2356 | 40 | 2 |

TABLE 1-continued

| | | | | | | | |
|---|---|---|---|---|---|---|---|
| Fourteenth example | 1.2 | 65 | 38 | 62 | 2356 | 40 | 2 |
| Fifteenth example | 1.2 | 65 | 38 | 62 | 2356 | 40 | 2 |
| Sixteenth example | 1.3 | 65 | 38 | 98 | 3724 | 90 | 25 |
| Seventeenth example | 1.3 | 65 | 38 | 10 | 380 | 5 | 25 |
| First comparison | 1.2 | 65 | 38 | 62 | 2356 | 40 | 2 |
| Second comparison | 2.0 | 65 | 38 | 62 | 2356 | 40 | 2 |
| Third comparison | 2.5 | 65 | 38 | 62 | 2356 | 40 | 2 |
| Fourth comparison | 2.1 | 65 | 38 | 62 | 2356 | 40 | 2 |
| Fifth comparison | 2.0 | 65 | 38 | 62 | 2356 | 40 | 2 |
| Sixth comparison | 1.3 | 60 | 45 | 60 | 2700 | 30 | 8 |

It can be understood from the evaluation results that (1) a plurality of recessed portions each having the depth corresponding to 20% or higher of the average thickness of the magnetic layer is provided on the surface of the magnetic layer, and the number of the recessed portions per unit area of 1,600 $\mu m^2$ of the surface of the magnetic layer is equal to or greater than 20 and equal to or smaller than 200; (2) the amount (area) of exudation of the lubricant per unit region of 12.5 $\mu m \times 9.3$ $\mu m$ on the surface of the magnetic layer in a vacuum is equal to or greater than 3.0 $\mu m^2$ and equal to or smaller than 6.5 $\mu m^2$, and (3) since the squareness ratio in the perpendicular direction is equal to or higher than 65%, it is possible to attain favorable electromagnetic conversion characteristics and suppress an increase in the dynamic friction coefficient even after repeated recording or reproducing.

While the embodiments and the modifications of the present disclosure have been specifically described, the present disclosure is not limited to the embodiments and the modifications described above and various changes and modifications based on a technical concept of the present disclosure can be made. For example, the configurations, the methods, the processes, the shapes, the materials, the numerical values, and the like mentioned in the embodiments and the modifications are given as an example only, and configurations, methods, processes, shapes, materials, numerical values, and the like may be used as needed. The configurations, the methods, the processes, the shapes, the materials, the numerical values, and the like in the embodiments and the modifications may be mutually combined without departure of the spirit of the present disclosure.

The chemical formulas of compounds and the like exemplarily illustrated in the embodiments and the modifications are typical chemical formulas and the present disclosure is not limited to described valences and the like if the same compound is indicated by a generic name. The upper limit or lower limit of a numerical range in one step may be replaced by the upper limit or lower limit of a numerical range in another step in the numerical ranges described step by step in the embodiments and the modifications. The materials exemplarily illustrated in the embodiments and the modifications may be used solely or in combinations of two or more types unless specified others.

Furthermore, the present disclosure can be configured as follows.

(1) A magnetic recording medium in a form of a tape, including:
a substrate;
a foundation layer provided on the substrate; and
a magnetic layer provided on the foundation layer and containing a magnetic powder, in which
the foundation layer and the magnetic layer each contain a lubricant,
a squareness ratio of the magnetic layer in a perpendicular direction is equal to or higher than 65%,
an average thickness of the magnetic recording medium is equal to or smaller than 5.6 $\mu m$,
a plurality of recessed portions each having a depth corresponding to 20% or higher of the average thickness of the magnetic layer is provided on a surface of the magnetic layer, and the number of the recessed portions per unit area of 1,600 $\mu m^2$ of the surface of the magnetic layer is equal to or greater than 20 and equal to or smaller than 200, and
an amount of exudation of the lubricant per unit region of 12.5 $\mu m \times 9.3$ $\mu m$ on the surface of the magnetic layer in a vacuum is equal to or greater than 3.0 $\mu m^2$ and equal to or smaller than 6.5 $\mu m^2$.

(2) The magnetic recording medium according to (1), in which
the lubricant contains a fatty acid and a fatty acid ester.

(3) The magnetic recording medium according to (1) or (2), in which
an arithmetic average roughness Ra of the surface of the magnetic layer is equal to or lower than 2.5 nm.

(4) The magnetic recording medium according to any one of (1) to (3), in which
the substrate contains polyester.

(5) The magnetic recording medium according to any one of (1) to (4), in which
the number of the recessed portions per surface area of 1,600 $\mu m^2$ of the magnetic layer is equal to or greater than 80 and equal to or smaller than 180.

(6) The magnetic recording medium according to any one of (1) to (5), in which
the amount of exudation of the lubricant per unit region of 12.5 $\mu m \times 9.3$ $\mu m$ on the surface of the magnetic layer in a vacuum is equal to or greater than 3.5 $\mu m^2$ and equal to or smaller than 6.5 $\mu m^2$.

(7) The magnetic recording medium according to any one of (1) to (6), in which a friction coefficient ratio ($\mu_B/\mu_A$) of a dynamic friction coefficient $\mu_B$ after performing full recording/full reproducing twice to a dynamic friction coefficient $\mu_A$ before performing the full recording/full reproducing is lower than 2.0.

(8) The magnetic recording medium according to any one of (1) to (7), in which the squareness ratio is equal to or higher than 70%.

(9) The magnetic recording medium according to any one of (1) to (8), in which part of the magnetic layer is magnetized in a first direction containing a perpendicular component perpendicular to an upper surface of the magnetic layer and a servo signal is recorded, before the servo signal is recorded, the magnetic layer is magnetized in a second direction opposite to the first direction containing the perpendicular component, and the magnetic recording medium on which the servo signal is recorded is configured such that an absolute value of a product between a rate of an amount of magnetization in the perpendicular direction with reference to a maximum value of the amount of magnetization when the amount of magnetization is measured by rotating the magnetic recording medium and the squareness ratio of the magnetic layer in a longitudinal direction parallel to the upper surface is equal to or greater than 500 and equal to or smaller than 2,500.

(10) The magnetic recording medium according to any one of (1) to (9), in which an average thickness of the magnetic layer is equal to or smaller than 80 nm.

(11) The magnetic recording medium according to any one of (1) to (10), in which the magnetic layer has five or more servo bands.

(12) The magnetic recording medium according to (11), in which a rate of a gross area of the servo bands to an area of the surface is equal to or lower than 4.0%.

(13) The magnetic recording medium according to (11) or (12), in which a width of each of the servo bands is equal to or smaller than 95 μm.

(14) The magnetic recording medium according to any one of (1) to (13), in which the magnetic layer is configured such that a plurality of data tracks can be formed on the magnetic layer, and a width of each of the data tracks is equal to or smaller than 2,000 nm.

(15) The magnetic recording medium according to any one of (1) to (14), in which the magnetic layer is configured to be capable of recording data in such a manner that a minimum value of a magnetization reversal interval L is equal to or smaller than 48 nm.

(16) The magnetic recording medium according to any one of (1) to (15), in which an average thickness of the substrate is equal to or smaller than 4.2 μm.

(17) The magnetic recording medium according to any one of (1) to (16), in which the magnetic layer contains the magnetic powder, and the magnetic powder contains hexagonal ferrite, ε iron oxide, or Co-containing spinel ferrite.

(18) A cartridge including:

the magnetic recording medium according to any one of (1) to (17).

(19) The cartridge according to (18), further including:

a storage section having a region to which adjustment information for adjusting a tension applied to the magnetic recording medium in a longitudinal direction is written.

(20) A recording and reproducing device recording and reproducing data in and from the magnetic recording medium according to any one of (1) to (17).

REFERENCE SIGNS LIST

10: Cartridge
11: Cartridge memory
31: Antenna coil
32: Rectifier/power supply circuit
33: Clock circuit
34: Detector/modulation circuit
35: Controller
36: Memory
36A: First storage region
36B: Second storage region
41: Substrate
42: Foundation layer
43: Magnetic layer
43A, 43B: Recessed portion
44: Back layer
44A: Protruding portion
50, 50A: Recording and reproducing device
51: Spindle 51
52: Reel 52
53: Spindle drive device
54: Reel drive device
55: Guide roller
56: Magnetic head
57: Reader-writer
58: communication interface
59: Control device
63: Thermometer
64: Hygrometer
100, 100A: Recording and reproducing system
110: Servo frame
111: Servo subframe 1
111A: Burst A
111B: Burst B
112: Servo subframe 2
112C: Burst C
113: Servo stripe
MT: Magnetic tape
SB: Servo band
DB: Data band

The invention claimed is:

1. A magnetic recording medium in a form of a tape, comprising:

a substrate;

a foundation layer provided on the substrate; and a magnetic layer provided on the foundation layer and containing a magnetic powder, wherein the magnetic recording medium contains a lubricant, a squareness ratio of the magnetic layer in a perpendicular direction of the magnetic recording medium is equal to or higher than 65%, an average thickness of the magnetic recording medium is equal to or smaller than 5.6 μm, a plurality of recessed portions each having a depth corresponding to 20% to less than 100% of an average thickness of the magnetic layer is provided on a surface of the magnetic layer, and the number of the recessed portions per unit area of 1,600 μm² of the surface of the magnetic layer is equal to or greater than 20 and equal to or smaller than 200, and an amount of exudation of the lubricant per unit region of 12.5 μm×9.3 μm on the surface of the magnetic layer in a vacuum is equal to or greater than 3.0 μm² and equal to or smaller than 6.5 μm².

2. The magnetic recording medium according to claim 1, wherein the lubricant contains a fatty acid and a fatty acid ester.

3. The magnetic recording medium according to claim 1, wherein an arithmetic average roughness Ra of the surface of the magnetic layer is equal to or lower than 2.5 nm.

4. The magnetic recording medium according to claim 1, wherein the substrate contains polyester.

5. The magnetic recording medium according to claim 1, wherein the number of the recessed portions per surface area of 1,600 μm² of the magnetic layer is equal to or greater than 80 and equal to or smaller than 180.

6. The magnetic recording medium according to claim 1, wherein the amount of exudation of the lubricant per unit region of 12.5 μm×9.3 μm on the surface of the magnetic layer in a vacuum is equal to or greater than 3.5 μm² and equal to or smaller than 6.5 μm².

7. The magnetic recording medium according to claim 1, wherein a friction coefficient ratio ($\mu_B/\mu_A$) of a dynamic friction coefficient $\mu_B$ after performing full recording/full reproducing on the magnetic recording medium twice to a dynamic friction coefficient μA before performing the full recording/full reproducing is lower than 2.0.

8. The magnetic recording medium according to claim 1, wherein the squareness ratio is equal to or higher than 70%.

9. The magnetic recording medium according to claim 1, wherein the average thickness of the magnetic layer is equal to or smaller than 80 nm.

10. The magnetic recording medium according to claim 1, wherein the magnetic layer has five or more servo bands.

11. The magnetic recording medium according to claim 10, wherein a rate of a gross area of the servo bands to an area of the surface is equal to or lower than 4.0%.

12. The magnetic recording medium according to claim 10, wherein a width of each of the servo bands is equal to or smaller than 95 μm.

13. The magnetic recording medium according to claim 1, wherein the magnetic layer is configured such that a plurality of data tracks can be formed on the magnetic layer, and a width of each of the data tracks is equal to or smaller than 2,000 nm.

14. The magnetic recording medium according to claim 1, wherein the magnetic layer is configured to be capable of recording data in such a manner that a minimum value of a magnetization reversal interval L is equal to or smaller than 48 nm.

15. The magnetic recording medium according to claim 1, wherein an average thickness of the substrate is equal to or smaller than 4.2 μm.

16. The magnetic recording medium according to claim 1, wherein the magnetic powder contains hexagonal ferrite, ε iron oxide, or Co-containing spinel ferrite.

17. A cartridge comprising:

the magnetic recording medium according to claim 1.

18. The cartridge according to claim 17, further comprising:

a storage section having a region to which adjustment information for adjusting a tension applied to the magnetic recording medium in a longitudinal direction is written.

19. A recording and reproducing device that records and reproduces data in and from the magnetic recording medium according to claim 1.

* * * * *